United States Patent [19]
Tisdale et al.

[11] Patent Number: 5,850,602
[45] Date of Patent: Dec. 15, 1998

[54] COMMUNICATION PROTOCOL FOR MOBILE EARTH TERMINAL COMMUNICATION DEVICE USED IN MOBILE SATELLITE COMMUNICATION SYSTEM

[76] Inventors: William R. Tisdale; Gary G. Churan; Charles Kittiver, all of 10802 Parkridge Blvd., Reston, Va. 22091

[21] Appl. No.: 654,198

[22] Filed: May 28, 1996

Related U.S. Application Data

[60] Provisional application No. 60/002,374 Aug. 15, 1995.
[51] Int. Cl.$^6$ ................................................ H04B 7/185
[52] U.S. Cl. ........................ 455/430; 455/428; 455/12.1
[58] Field of Search ........................... 455/3.2, 5.1, 12.1, 455/13.1, 427, 426, 428, 430; 370/316, 319, 321, 322, 326, 343, 436, 442–444, 522, 524

[56] References Cited

U.S. PATENT DOCUMENTS

| | | | |
|---|---|---|---|
| 5,303,286 | 4/1994 | Wiedeman | 455/430 |
| 5,343,512 | 8/1994 | Wang et al. | 455/429 |
| 5,526,404 | 6/1996 | Wiedeman et al. | |
| 5,586,165 | 12/1996 | Wiedeman | |
| 5,590,395 | 12/1996 | Diekelman | |
| 5,594,740 | 1/1997 | Ladue | |
| 5,594,780 | 1/1997 | Wiedeman et al. | |
| 5,655,005 | 8/1997 | Wiedeman et al. | 455/430 |

OTHER PUBLICATIONS

"Feederlink Earth Station to Provide Mobile Satellite Services in North America", Robert H. McCauley, et al., American Institute of Aeronautics and Astronautics, Jan./Feb. 1994, pp. 1–9.

"Radio Transmission in the American Mobile Satellite System", Charles Kittiver, American Institute of Aeronautics and Astronautics, Inc., pp. 280–294.

"Summary of the AMSC Mobile Telephone System", Gary A. Johanson, et al., American Institute of Aeronautics and Astronautics, Inc., pp. 1–11.

"Implementation of a System to Provide Mobile Satellite Services in North America", Gary A. Johanson, et al., presented at International Mobile Satellite Conference '93, Jun. 16–18, 1993.

"The American Mobile Satellite Corporation Space Segment", David J. Whalen, et al., pp. 394–404.

"North American Mobile Satellite System Signaling Architecture", Lawrence White et al., American Institute of Aeronautics and Astronautics, Inc., pp. 427–439.

(List continued on next page.)

*Primary Examiner*—Edward F. Urban
*Attorney, Agent, or Firm*—Pepper Hamilton

[57] ABSTRACT

In a mobile satellite system, a method of performing a call setup procedure from a call initiated by a mobile communication system (MCS) to a destination served by a public switched telephone network, includes the steps of initiating the call by the MCS, the MCS formatting and transmitting an access request message via a random access channel, and receiving by the central controller the access request message, and transmitting frequency assignments to the MCS and to the SCSO. The method also includes receiving by the MCS the frequency assignment, transmitting a scrambling vector message to the SCSO, and verifying by the SCSO the identity of the MET responsive to the scrambling vector. Upon successful verification, the method includes the steps of switching by the SCSO and the MCS from call setup mode to voice mode, transmitting by the SCSO voices frames to the MCS and disabling voice activation in the MCS for at least 3 super frames, and transmitting a destination number to the PSTN. The method also includes the steps of re-enabling voice activation by the MCS, and establishing voice communication between the PSTN and the MCS.

18 Claims, 32 Drawing Sheets

OTHER PUBLICATIONS

"The AMSC/TMI Mobile Satellite Service (MSS) System Ground Segment Architecture", J. Lunsford, et al., American Institute of Aeronautics and Astronautics, Inc., pp. 405–426.

"Call Control in the AMSC Mobile Satellite Service System", William R.H. Tisdale, et al., Pre–Publication Review Copy, American Institute of Aeronautics and Astronautics, Mar. 1, 1994, pp. 1–13.

"Westinghouse MSAT Mobile Terminal Channel Emulator", A. Fasulo et al., American Institute of Aeronautics and Astronautics, Inc., pp. 256–260.

"MSAT Network Communications Controller and Network Operations Center", Tony Harvey et al., American Institute of Aeronautics and Astronautics, Inc., pp. 270–279.

"MSAT and Cellular Hybrid Networking", Patrick W. Baranowsky II, Westinghouse Electric Corpration.

| PARAMETER | REQUIREMENT |
|---|---|
| L-BAND AEIRP | 56.6 dBW AT NOISE POWER RATIO OF 18 dB |
| Ku-BAND AEIRP | 36.7 dBW |
| L-BAND RECEIVE G/T | +2.7 dB/°K |
| Ku-BAND RECEIVE G/T | -3.6 dB/°K |
| L-BAND FREQUENCIES | 1530 TO 1559 MHz (TRANSMIT)<br>1631.5 TO 1660.5 MHz (RECEIVE) |
| Ku-BAND FREQUENCIES | 10,750 - 10,950 MHz (CENTRAL SATELLITE TRANSMIT)<br>13,000 - 13,150 MHz &<br>13,200 - 13,250 MHz (CENTRAL SATELLITE RECEIVE)<br>11,700 - 11,900 MHz (WING SATELLITE TRANSMIT)<br>14,000 - 14,200 MHz (WING SATELLITE RECEIVE) |

FIG. 2

| MODES/FUNCTIONS | | |
|---|---|---|
| MODE | REGISTRATION | OPERATION |
| SATELLITE ONLY | POWER ON REGISTRATION IN MSS ONLY, IF AVAILABLE. SYSTEM MAY NOT RE-REGISTER IS PRIOR REGISTRATION WAS IN MSS. | MET USES MSS ONLY. IF SATELLITE COVERAGE IS UNAVAILABLE, SERVICE IS DISALLOWED. NO REQUIREMENT FOR HANDOFF. |
| AUTOMATIC ROAMING, SATELLITE PRIORITY | POWER ON REGISTRATION IN MSS, UNLESS UNAVAILABLE, IN WHICH CASE MET REGISTERS IN CMC SYSTEM. MOBILE WILL RETURN REGISTRATION TO MSS WHENEVER POSSIBLE. | MET USES MSS IF AVAILABLE. CELLULAR COMMUNICATION IS USED AS LAST RESORT. LIVE CALL HANDOFF FROM SERVING CMC IS TO ADJACENT CMC IF POSSIBLE, OTHERWISE TO MSS. HANDOFF FROM MSS TO CELLULAR IS NOT SUPPORTED. |
| AUTOMATIC ROAMING, CELLULAR PRIORITY | POWER ON REGISTRATION IN CMC SYSTEM, EITHER HOMED OR AS VISITOR. IF CELLULAR COVERAGE IS UNAVAILABLE., MET WILL REGISTER IN MSS. MET WILL RETURN REGISTRATION TO CMC WHENEVER POSSIBLE. | MET USES CELLULAR CARRIER IF AVAILABLE. SATELLITE COMMUNICATION IS USED AS LAST RESORT. LIVE CALL HANDOFF FROM SERVING CMC IS TO ADJACENT CMC IS POSSIBLE, OTHERWISE TO MSS. HANDOFF FROM MSS TO CELLULAR IS NOT SUPPORTED |
| AUTOMATIC ROAMING, CELLULAR PRIORITY, HOME CMC ONLY | POWER ON REGISTRATION IN CMC SYSTEM, IF AVAILABLE. IF HOME CELLULAR COVERAGE IS UNAVAILABLE, MET WILL REGISTER AS A ROAMER IN MSS. MET WILL RETURN REGISTRATION TO HOME CMC WHENEVER POSSIBLE. | MET USES HOME CELLULAR CARRIER IF AVAILABLE, AND ROAMS ONLY TO MSS. LIVE CALL HANDOFF FROM SERVING CMC IS TO ADJACENT CMC IF POSSIBLE, OTHERWISE TO MSS. HANDOFF FROM MSS TO CELLULAR IS NOT SUPPORTED. |
| CELLULAR ONLY | POWER ON REGISTRATION IN HOME CMC IF AVAILABLE, OR AS ROAMER IN VISITED CMC. REGISTRATION FOLLOWS NORMAL CELLULAR PROCEDURES. REGISTRATION AS ROAMER IN MSS IS DISALLOWED. | MET USES HOME CELLULAR CARRIER IF AVAILABLE, AND ROAMS ONLY TO OTHER CMCs. LIVE CALL HANDOFF FROM SERVING CMC IS TO ADJACENT CMC IF POSSIBLE. HANDOFF TO MSS IS DISALLOWED. |

FIG. 21

NOTATION USED IN EVENT TREES

KEY

FLOW ON ALL VERTICAL SEGMENTS GOES FROM TOP TO BOTTOM ONLY.

  BOLD LINES REPRESENT THE NORMAL PATH.

  OTHER PATHS ARE REPRESENTED BY LIGHTER LINES.

  CIRCLED NUMBERS REPRESENT THE STARTING POINT OR THE DESTINATION POINT OF A GO TO.

▽    LETTERS IN TRIANGLES REPRESENT CONTINUATION POINTS BETWEEN PAGES.

*GC-FES CHANNEL ASSIGNMENT*    ALL SIGNALING UNITS ARE DEPICTED IN ITALICS.

*GC-MET\* ADDITIONAL DIGITS REQUEST*    MGSP COMMANDS ARE DENOTED BY ONE\*.

*GC-MET\*\* CHANNEL ASSIGNMENT*    MGSP RESPONSES ARE DENOTED BY TWO \*S.

*GC-MET\*\*\* CHANNEL ASSIGNMENT*    UNACKNOWLEDGED MGSP MESSAGES ARE DENOTED BY THREE \*S.

  THIS SYMBOL, WHEN REACHED, INDICATES THAT THE PROCESS HAS ENDED FOR THAT PARTICULAR ENTITY.

FIG. 34

COMMUNICATION PROTOCOL FOR MOBILE EARTH TERMINAL COMMUNICATION DEVICE USED IN MOBILE SATELLITE COMMUNICATION SYSTEM

RELATED APPLICATIONS

This application claims priority from provisional patent application Ser. No. 60/002,374, filed Aug. 15, 1995, entitled "IMPROVED MOBILE EARTH TERMINAL, now abandoned."

TECHNICAL FIELD

The present invention relates generally to a communication protocol, and more particularly, to a communication protocol for mobile earth terminal communication device used in mobile satellite communication system. The mobile earth terminal device provides voice, data, and facsimile transmission between mobile earth terminals and feederlink earth stations (FESs) that act as gateways to public networks or base stations associated with private networks.

BACKGROUND ART

An overview of the satellite network system is illustrated in FIG. 1. The satellite network system design provides the capability for METs and FESs to access one or more multiple beam satellites located in geostationary orbit to obtain communications services.

The heart of the satellite network system for each of the networks is the Network Control System (NCS) which monitors and controls each of the networks. The principal function of the NCS is to manage the overall satellite network system, to manage access to the satellite network system, to assign satellite circuits to meet the requirements of mobile customers and to provide network management and network administrative and call accounting functions.

The satellites each transmit and receive signals to and from METs at L-band frequencies and to and from Network Communications Controllers (NCCs) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation. A single beam generally covers the service area.

The satellite network system provides the capability for mobile earth terminals to access one or more multiple beam satellites located in geostationary orbit for the purposes of providing mobile communications services. The satellite network system is desired to provide the following general categories of service:

Mobile Telephone Service (MTS). This service provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

Mobile Radio Service (MRS). This service provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

Mobile Telephone Cellular Roaming Service (MTCRS). This service provides Mobile Telephone Service to mobile subscribers who are also equipped with cellular radio telephones. Then the mobile terminal is within range of the cellular system, calls are serviced by the cellular system. When the mobile terminal is not in range of the cellular system, the MTCRS is selected to handle the call and appears to the user to be a part of the cellular system. When the mobile terminal is not in range of the cellular system, the MTCRS is selected to handle the call and appears to the user to be a part of the cellular system. It is possible for calls to be originated either from the MET or the PSTN. Mobile terminal-to-mobile terminal calls are also supported.

NET Radio (NR). This service provides point-to-multipoint circuit switched connections between mobile terminal subscriber stations and a central base station. Mobile users are able to listen to two-way conversations and to transmit using a push-to-talk mode of operation.

Mobile Data Service (MDS). This service provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signalling and network management purposes between FESs and NCCs. The aggregate effective isotropic radiated power (AEIRP) is defined as that satellite e.i.r.p. that would result if the total available communications power of the communications subsystem was applied to the beam that covers that part of the service area. Some of the key performance parameters of the satellite are listed in FIG. 2.

The satellite network system interfaces to a number of entities which are required to access it for various purposes. FIG. 3 is a context diagram of the satellite network system illustrating these entities and their respective interfaces. Three major classes of entities are defined as user of communications services, external organizations requiring coordination, and network management system.

The users of satellite network communications services are MET users who access the satellite network system either via terrestrial networks (PSTN, PSDN, or Private Networks) or via METs for the purpose of using the services provided by the system. FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information System within the Network Management System.

The satellite network system interfaces to, and performs transactions with, the external organizations described below:

Satellite Operations Center (SOC): The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

NOC: The satellite network system interfaces with the satellites located therein via the NOC for a variety of operational reasons including message delivery and coordination.

Independent NOCs: The satellite network system interfaces with outside organizations which lease resources on satellite network satellites and which are responsible for managing and allocating these resources in a manner suited to their own needs.

Other System NOCs: This external entity represents outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering are as follows:

Customer Management Information System: This entity provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

Network Engineering: This entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

System Engineering: This entity engineers the subsystems, equipment and software which is needed to expand capacity to meet increases in traffic demands and to provide new features and services which become marketable to subscribers.

The satellite network system comprises a number of system elements and their interconnecting communications links as illustrated in FIG. 4. The system elements are the NOC, the NCC, the FES, the MET, the Remote Monitor Station (RMS), and the System Test Station (STS). The interconnecting communications links are the satellite network Internetwork, terrestrial links, the MET signaling channels, the Interstation signaling channels, and the MET-FES communications channels. The major functions of each of the system elements are as follows:

NOC

The NOC manages and controls the resources of the satellite network system and carries out the administrative functions associated with the management of the total satellite network system. The NOC communicates with the various internal and external entities via a local area network (LAN)/wide area network (WAN) based satellite network Internetwork and dial-up lines.

NCC

The NCC manages the real time allocation of circuits between METs and FESs for the purposes of supporting communications. The available circuits are held in circuit pools managed by Group Controllers (GCs) within the NCC. The NCC communicates with the NOC via the satellite network Internetwork, with FESs via Ku-to-Ku band interstation signaling channels or terrestrial links, and with mobile terminals via Ku-to-L band signaling channels.

FES

The FES supports communications links between METs, the PSTN, private networks, and other METs. Once a channel is established with an MET, call completion and service feature management is accomplished via In-Band signaling over the communication channel. Two types of FESs have been defined for the satellite network system; Gateway FESs and Base FESs. Gateway FESs provide MTS and MTCRS services. Base FESs provide MRS and NR services.

MET

The MET provides the mobile user access to the communications channels and services provided by the satellite network system. A range of terminal types has been defined for the satellite network system.

RMS

The RMS monitors L-band RF spectrum and transmission performance in specific L-band beams. An RMS is nominally located in each L-band beam. Each RMS interfaces with the NOC via either a satellite or terrestrial link.

STS

The STS provides an L-band network access capability to support FES commissioning tests and network service diagnostic tests. The STS is collocated with, and interfaced to, the NOC.

Communications channels transport voice transmissions between METs and FESs via the satellite. Connectivity for MET-to-MET calls is accomplished by double hopping the communications channels via specially equipped FESs. Signaling channels are used to set up and tear down communications circuits, to monitor and control FES and MET operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, D.C. (March 1992), incorporated herein by reference.

The satellite network Internetwork provides interconnection among the major satellite network ground system elements such as the NOCs, NCCs, and Data Hubs, as well as external entities. Various leased and dial-up lines are used for specific applications within the satellite network system such as backup interstation links between the NCC and FESs and interconnection of RMSs with the NOC.

The primary function of the NOC is to manage and control the resources of the satellite network system. FIG. 5 is a basic block diagram of the NOC and its interface. The NOC computer is shown with network connections, peripheral disks, fault tolerant features, and expansion capabilities to accommodate future growth. The NOC software is represented as two major layers, a functional layer and a support layer. The functional layer represents the application specific portion of the NOC software. The support layer represents software subsystems which provide a general class of services and are used by the subsystems in the functional layer.

The application specific functions performed by the NOC are organized according to five categories: fault management, accounting management, configuration management, performance management, and security management. The general NCC Terminal Equipment (NCCTE) configuration showing constituent equipment includes: processing equipment, communications equipment, mass storage equipment, man-machine interface equipment, and optional secure MET Access Security Key (ASK) storage equipment. The Processing Equipment consists of one or more digital processors that provide overall NCC control, NCS call processing, network access processing and internetwork communications processing.

The Communications Equipment consists of satellite signaling and communications channel units and FES terrestrial communication link interface units. The Mass Storage Equipment provides NCC network configuration database storage, call record spool buffering an executable program storage. The Man-Machine Interface Equipment provides operator command, display and hard copy facilities, and operator access to the computer operating systems. The MET ASK storage Equipment provides a physically secure facility for protecting and distributing MET Access Security Keys.

The NCCTE comprises three functional subsystems: NCCTE Common Equipment Subsystem, Group Controller Subsystem, and Network Access Subsystem. The NCCTE Common Equipment subsystem comprises an NCC Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES and Group Controller call accounting data, transfer of transaction information to the Off-line NCC and control and monitoring of FESs.

The Mass Storage element provides NCC network configuration database storage, call accounting data spool buffering, and NCCTE executable program storage. The Man-machine Interface provides Operator command and display facilities for control and monitoring of NCC operation and includes hard copy facilities for logging events and alarms. A Group Controller (GC) is the physical NCC entity consisting of hardware and software processing resources that provides real time control according to the CG database received from the NOC.

The Group Controller Subsystem may incorporate one to four Group Controllers. Each Group Controller maintains state machines for every call in progress within the Control Group. It allocates and de-allocates circuits for FES-MET calls within each beam of the system, manages virtual network call processing, MET authentication, and provides certain elements of call accounting. When required, it provides satellite bandwidth resources to the NOC for AMS (R)S resource provisioning. The Group Controller monitors the performance of call processing and satellite circuit pool utilization. It also performs MET management, commissioning and periodic performance verification testing.

The Network Access Subsystem consists of satellite interface channel equipment for Out-of-Band signaling and Interstation Signaling which are used to respond to MET and FES requests for communications services. The Network Access Processor also includes MET communications interfaces that are used to perform MET commission testing. In addition, the subsystem includes terrestrial data link equipment for selected FES Interstation Signaling.

The principal function of the FES is to provide the required circuit switched connections between the satellite radio channels, which provide communications links to the mobile earth terminals, and either the PSTN or PN. FESs will be configured as Gateway Stations (GS) to provide MTS and MTCRS services or Base Stations to provide MRS and Net Radio services. Gateway and Base functions can be combined in a single station.

The FES operates under the real time control of the Network Communications Controller (NCC) to implement the call set-up and take-down procedures of the communications channels to and from the METs. Control of the FES by the NCC is provided via the interstation signaling channels. An FES will support multiple Control Groups and Virtual Networks. The FES is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-convert these to Ku-Band for transmission to the satellite via the antenna. In the receive direction, signals received from the satellite are down-converted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES and to connect the METs to the appropriate PSTN or PN port. Under control of the NCC, the FES assigns communications channel units to handle calls initiated by MET or PSTN subscribers. The FES-TE also performs alarm reporting, call detail record recording, and provision of operator interfaces.

For operational convenience, an FES may in some cases be collocated with the NCC. In this event, the NCC RF Equipment will be shared by the two system elements arid the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs or an analog interconnect for FESs equipped with only a limited number of channels may be employed.

FIGS. 6 and 7 are proposed call setup diagrams for MET and PSTN initiated calls. As illustrated in FIG. 6, the MET initiates a call by transmitting an access request to the GC. The GC determines a channel for the MET to transmit and receive on and transmits the channel assignment to the MET and FES functioning as the gateway to the PSTN. Once the channel assignment is received by the MET, the MET generates a scrambling vector and transmits same to the FES in the call setup mode. The FES transmits voice frames to the MET in the call setup mode prompting the MET to provide destination information regarding the MET originated call. The MET responds to the FES with voice frames in the voice mode indicating the destination number and the FES dials same to the PSTN for connection to the destination.

The PSTN provides ringing tones to the FES indicating that the call is being placed to the destination, and the FES in turn transmits the ringing tones to the MET. When the destination telephone answers the MET originated call, an off-hook signal is transmitted from the PSTN to the FES, and the FES in turn transmits same to the MET indicating that the call has been answered by a user connected to the PSTN. Voice communication between the MET and the PSTN destination via the FES is then commenced until either party terminates the MET originated call.

FIG. 7 illustrates a proposed call setup procedure for a PSTN originated call to be connected to a MET. In FIG. 7, the PSTN transmits an incoming call signal to the FES, and the FES in turn issues a channel request to the GC. The GC issues a call announcement to the MET indicating that an incoming call is to be connected to the MET. The acknowledges receipt of the call announcement to the Go, and the GC issues a channel assignment for voice communication to the MET and FES prior to the in-band signalling mode.

The MET then transmits a scrambling vector to the FES during the in-band signalling mode, and the FES responds with a ring command to inform the MET user of the incoming call. The MET acknowledges receipt of same to the FES, and the FES issues a ringing signal to the PSTN in the signalling mode. The FES also transmits a signal to the GC indicating that the call setup is complete, thereby completing the signalling mode. The MET user then answers the call by taking the phone off-hook in the voice mode, and transmits the off-hook signal via voice frames to the FES. The FES in turn transmits the off-hook signal to the PSTN, and voice communication is then commenced until either party terminates the PSTN originated call.

There is a general need for an integrated mobile telephone that can be used to transmit to, and receive from, a satellite in a satellite communication system in a secure manner. It is also desirable for the satellite communication system to be able to detect the presence of an unauthorized mobile telephone in an efficient manner. This will prevent unauthorized access to the satellite communication system and also prevent unauthorized access to a communication in progress.

It is further desirable to provide an efficient, reliable and effective communication protocol used between the MET and a destination, such as another MET or a PSTN.

It is also desirable to provide a communication protocol that is designed to compensate for inherent communication delays in the satellite communication network that are not present under other circumstances.

It is further desirable to provide a communication protocol that is sufficiently robust to recognize and manage communication delays.

SUMMARY OF THE INVENTION

It is a feature and advantage of the satellite communication system to be able to detect the presence of an unauthorized mobile telephone in an efficient manner.

It is another feature and advantage of the satellite communication system to provide an efficient, reliable and effective communication protocol used between the MET and a destination, such as another MET or a PSTN.

It is another feature and advantage of the satellite communication system to provide a communication protocol that is designed to compensate for inherent communication delays in the satellite communication network that are not present under other circumstances.

It is another feature and advantage of the satellite communication system to provide a communication protocol that is sufficiently robust to recognize and manage communication delays.

The present invention is based, in part, on the identification of the problem of irregular and unpredictable delays in the satellite communication system that are not generally present in other communication systems as well as identification of inherent limitations of the MET during call setup for MET or PSTN originated calls. In accordance with the features of the present invention, controls are introduced to eliminate protocol problems arising from delays in the satellite communication system.

To achieve these and other features and advantages of the present invention, a fraud detection and user validation system for a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the vehicle via the satellite and the satellite interface system. The mobile communication system includes a user interface system providing a user interface through which a user has access to services supported by the mobile satellite system, and an antenna system providing an interface between the mobile communication system and the mobile satellite system via the satellite interface system, and receiving a first satellite message from the satellite and transmitting a second satellite message to the satellite. The antenna system includes an antenna including one of a directional and an omnidirectional configuration, a diplexer, a low noise amplifier, a beam steering unit when the antenna is of the directional configuration, and at least one of a compass and sensor to determine vehicle orientation. The mobile communication system also includes a transceiver system, operatively connected to the antenna system, including a receiver and a transmitter. The transmitter converts the second satellite message including at least one of voice, data, fax and signaling signals into a modulated signal, and transmits the modulated signal to the antenna system. The transmitter includes an amplifier, a first converter and associated first frequency synthesizer, a modulator, an encoder, diplexer, scrambler and frame formatter for at least one of voice, fax, and data. The receiver accepts the first satellite message from the antenna system and. converts the first satellite message into at least one of voice, data, fax and signaling signals, at least one of the voice, data and fax signals routed to the user interface system. The receiver includes a second converter with an associated second frequency synthesizer, a demodulator, a decoder, demultiplexer, descrambler and frame unformatter for at least one of voice, fax, and data. The mobile communication system also includes a logic and signaling system, operatively connected to the transceiver, controlling initialization of the mobile communication system, obtaining an assigned outbound signaling channel from which updated system information and commands and messages are received. The logic and signaling system configures the transceiver for reception and transmission of at least one of voice, data, fax and signaling messages, and controls protocols between the mobile communication system and the mobile satellite system, and validating a received signalling messages and generating codes for a signaling message to be transmitted.

In one embodiment of the invention, a method of performing a call setup procedure in a mobile satellite system from a call initiated by a mobile communication system (MCS) to a destination served by a public switched telephone network, includes the steps of initiating the call by the MCS, the MCS formatting and transmitting an access request message via a random access channel, and receiving by the central controller the access request message, and transmitting frequency assignments to the MCS and to the SCSO. The method also includes receiving by the MCS the frequency assignment, transmitting a scrambling vector message to the SCSO, and verifying by the SCSO the identity of the MET responsive to the scrambling vector. Upon successful verification, the method includes the steps of switching by the SCSO and the MCS from call setup mode to voice mode, transmitting by the SCSO voices frames to the MCS including a voice activation disable signal to disable a voice activation timer in the MCS for at least 3 super frames, and transmitting a destination number to the PSTN. The method also includes the steps of transmitting by the SCSO an enable signal to the MCS to re-enable the call activation timer in the MCS, and establishing voice communication between the PSTN and the MCS.

In another embodiment of the invention, a method of performing a call setup procedure in a mobile satellite system from a call initiated by a destination served by a public switched telephone network (PST) to a mobile communication system (MCS). The method includes the steps of receiving by the SCSO a call from the destination served by the PSTN, transmitting by the SCSO to the central controller a channel request using interstation signaling, determining by the central controller an identity of the MCS responsive to the destination number, and transmitting a call announcement via a random access channel. The method also includes the steps of acknowledging by the MCS the call announcement via the random access channel to the central controller, transmitting frequency assignments to the MCS via the random access channel and to the SCSO via an interstation signaling channel, and transmitting an access security check field used to verify the MCS's identity. The method also includes the steps of receiving by the MCS the frequency assignment, and transmitting a scrambling vector message to the SCSO, verifying by the SCSO the identity of the MET responsive to the scrambling vector, and upon successful verification, transmitting by the SCSO a ring command to the MCS. The method also includes the steps of receiving by the MCS of the ring command, generating a ringing signal to a MET user, and transmitting a ring command acknowledgement to the SCSO. The method also includes the steps of receiving by the SCSO the ring command acknowledgement from the MCS, and once the call setup is complete, transmitting by the MCS voice frames to the SCSO including a voice activation disable signal to disable a voice activation timer in the MCS for at least 3 super frames. The method further includes the steps of upon detection of the MCS switching to a voice frame mode, switching by the SCSO to the voice mode, and transmitting a voice activation enable signal to the MCS to re-enable the call activation timer in the MCS, and establishing voice communication between the PSTN and the MCS.

In another embodiment of the invention, a method of performing a call setup procedure in a mobile satellite system from a call between first and second MCSs is provided. The method includes the steps of originating by the first MCS the call in accordance with the method of call setup used for a call initiated by an MCS to a destination served by a PSTN, and receiving by the first MCS the call initiated by the second MCS in accordance with the method of call setup used for a call initiated by the PSTN to an MCS.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 2 is a diagram illustrating key performance parameters of the satellite used in the satellite network system;

FIG. 21 is a diagram of the multiple operating modes, of the mobile earth terminal;

FIG. 34 is a diagram of the notation used in the event trees.

BEST MODE FOR CARRYING OUT THE INVENTION

Figure 1:
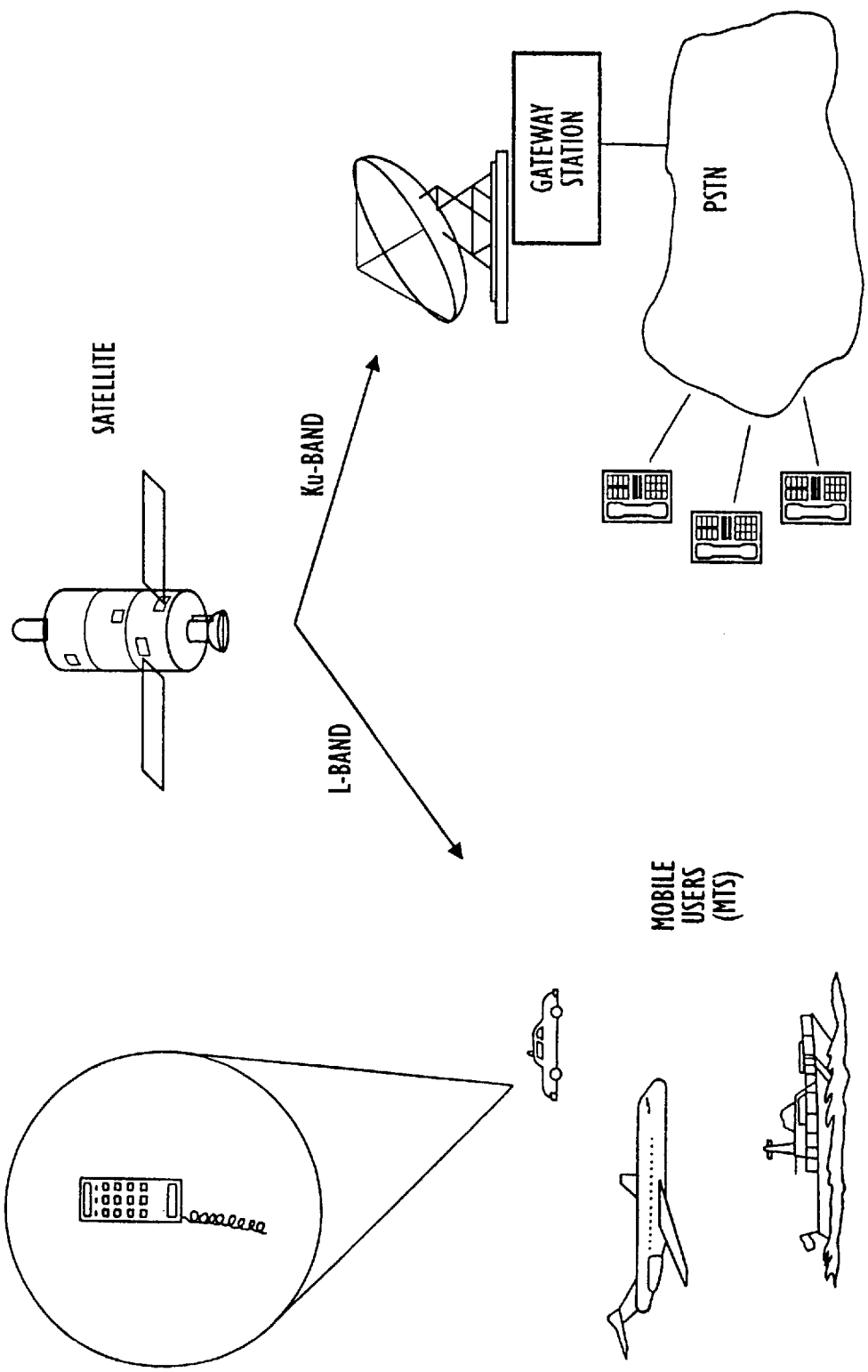
FIG. 1 is a diagram illustrating an overview of the satellite network system.
Figure 3:
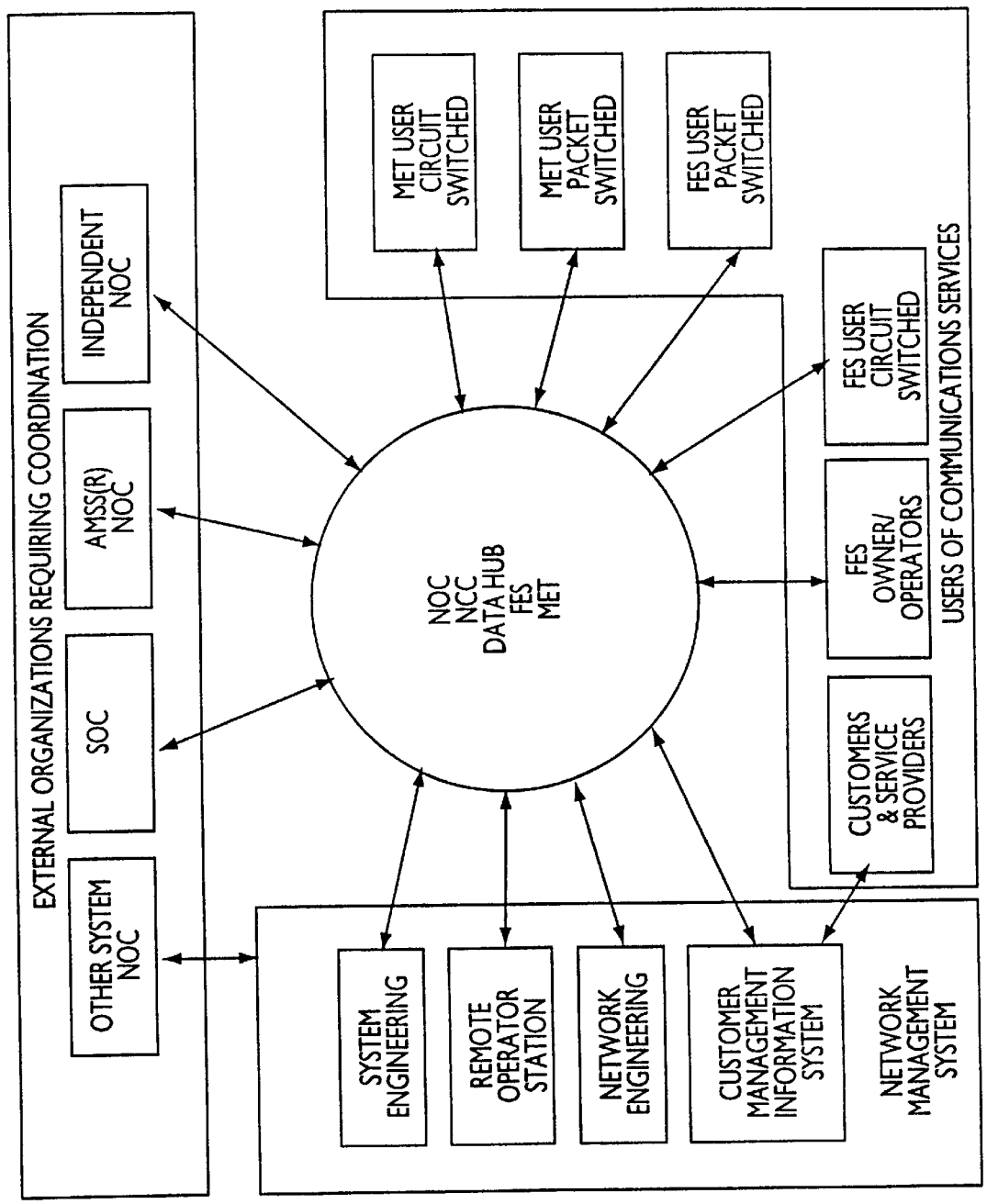
FIG. 3 is a diagram of the satellite network system illustrating components and respective interfaces.
Figure 4:
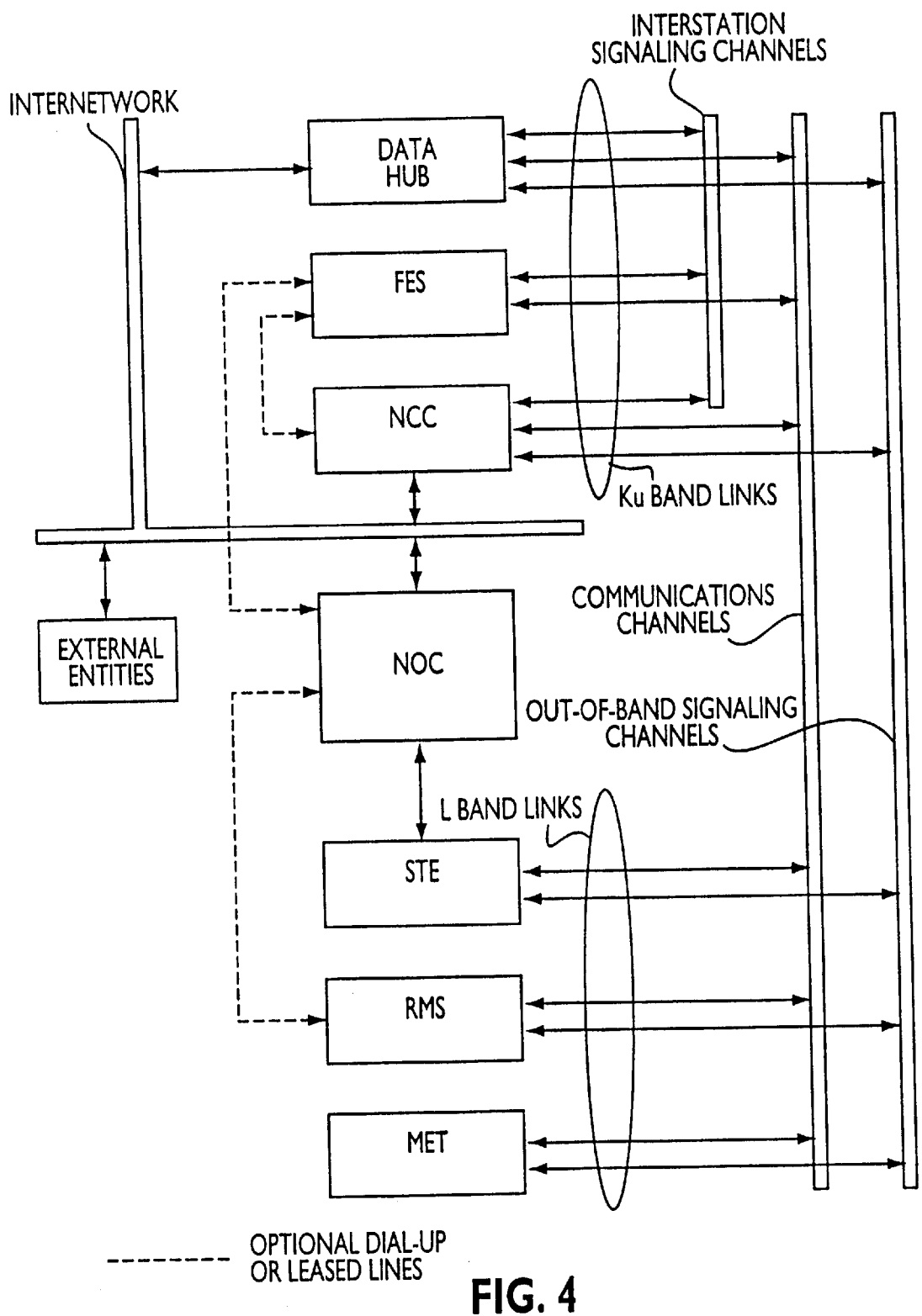
FIG. 4 is a diagram of a satellite network system illustrating a number of system elements and their interconnecting communications links.
Figure 5:
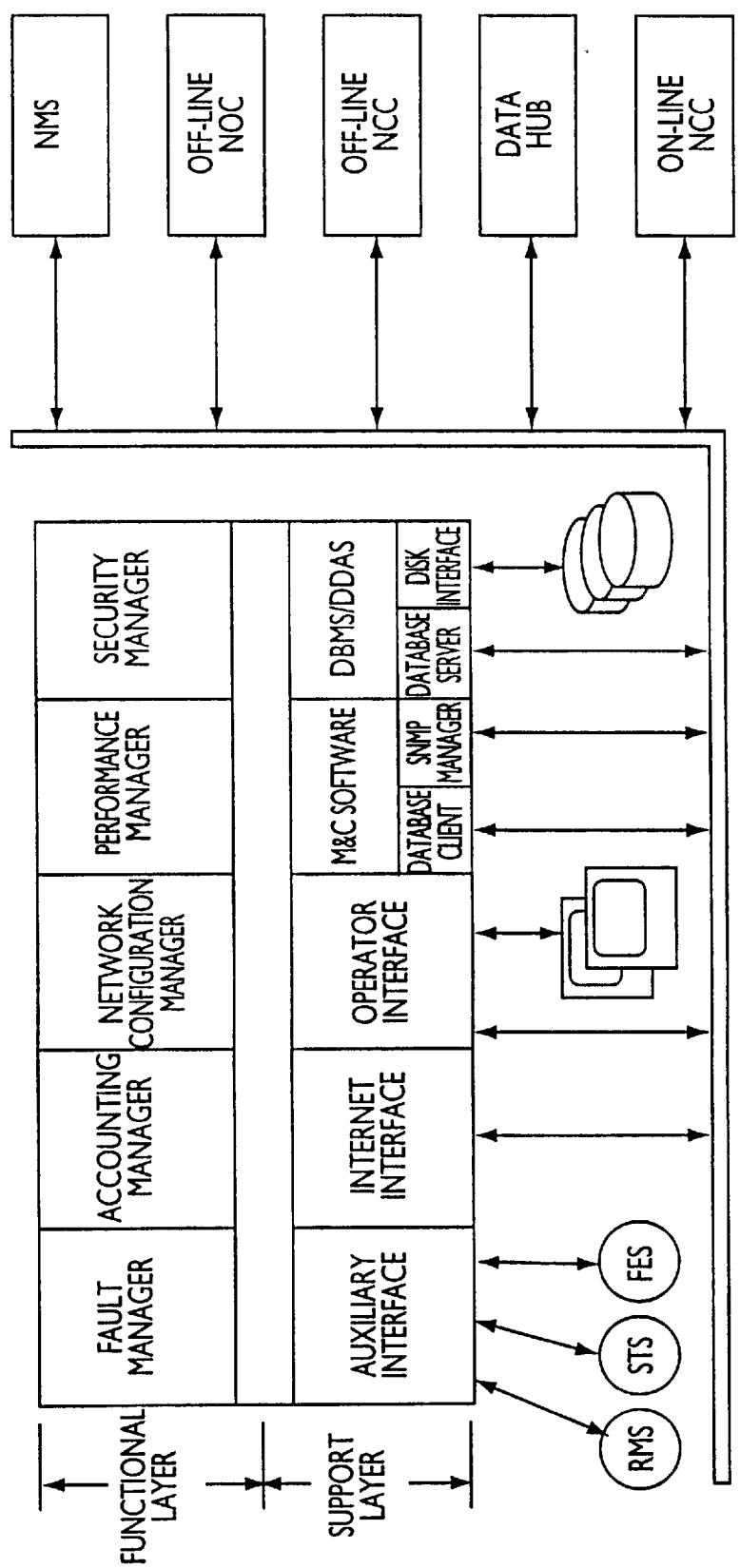
FIG. 5 is a basic block diagram of the NOC and its interfaces.
Figure 6:
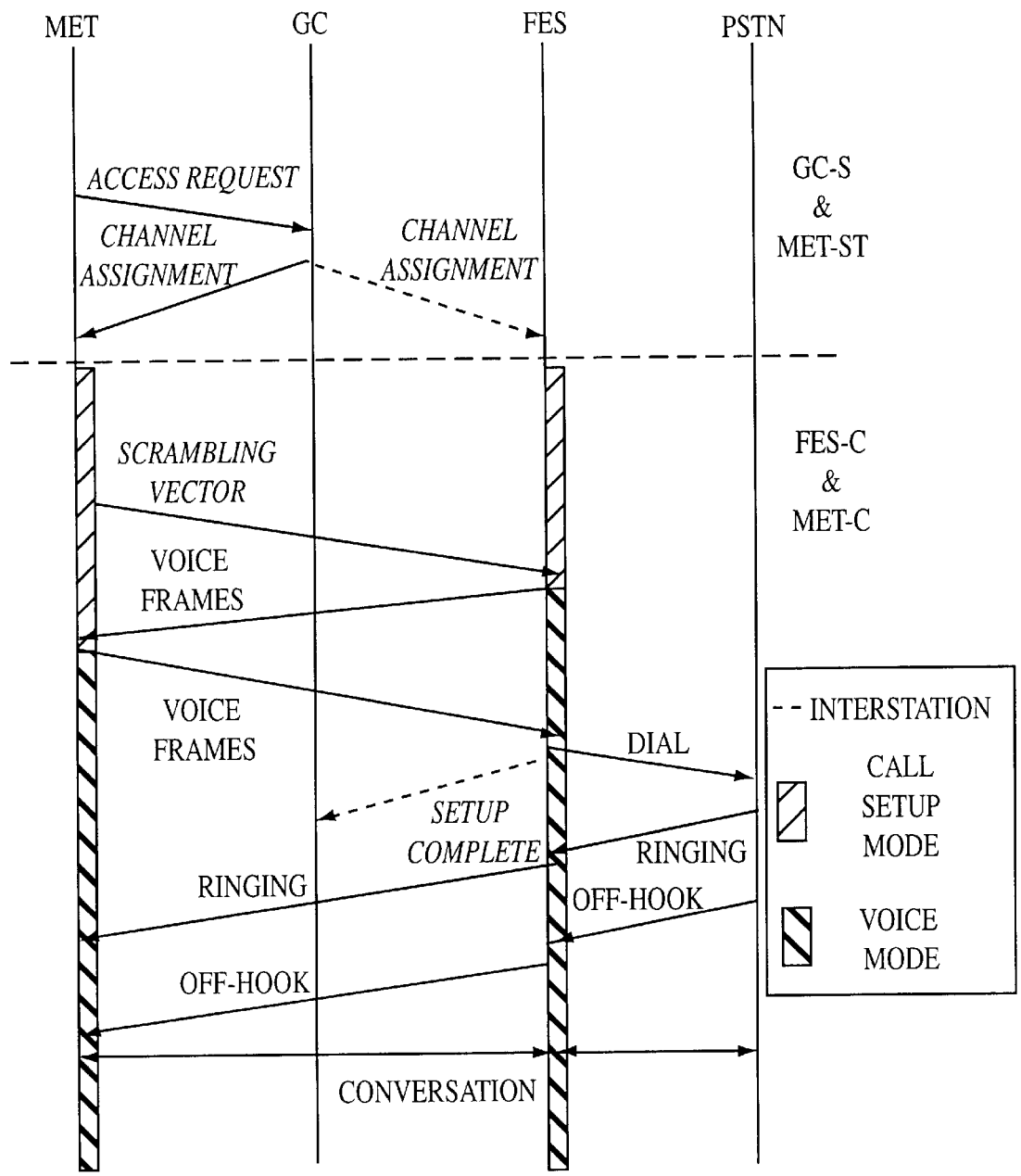
FIGS. 6 and 7 are proposed call setup diagrams for MET and PSTN initiated calls.
Figure 7:
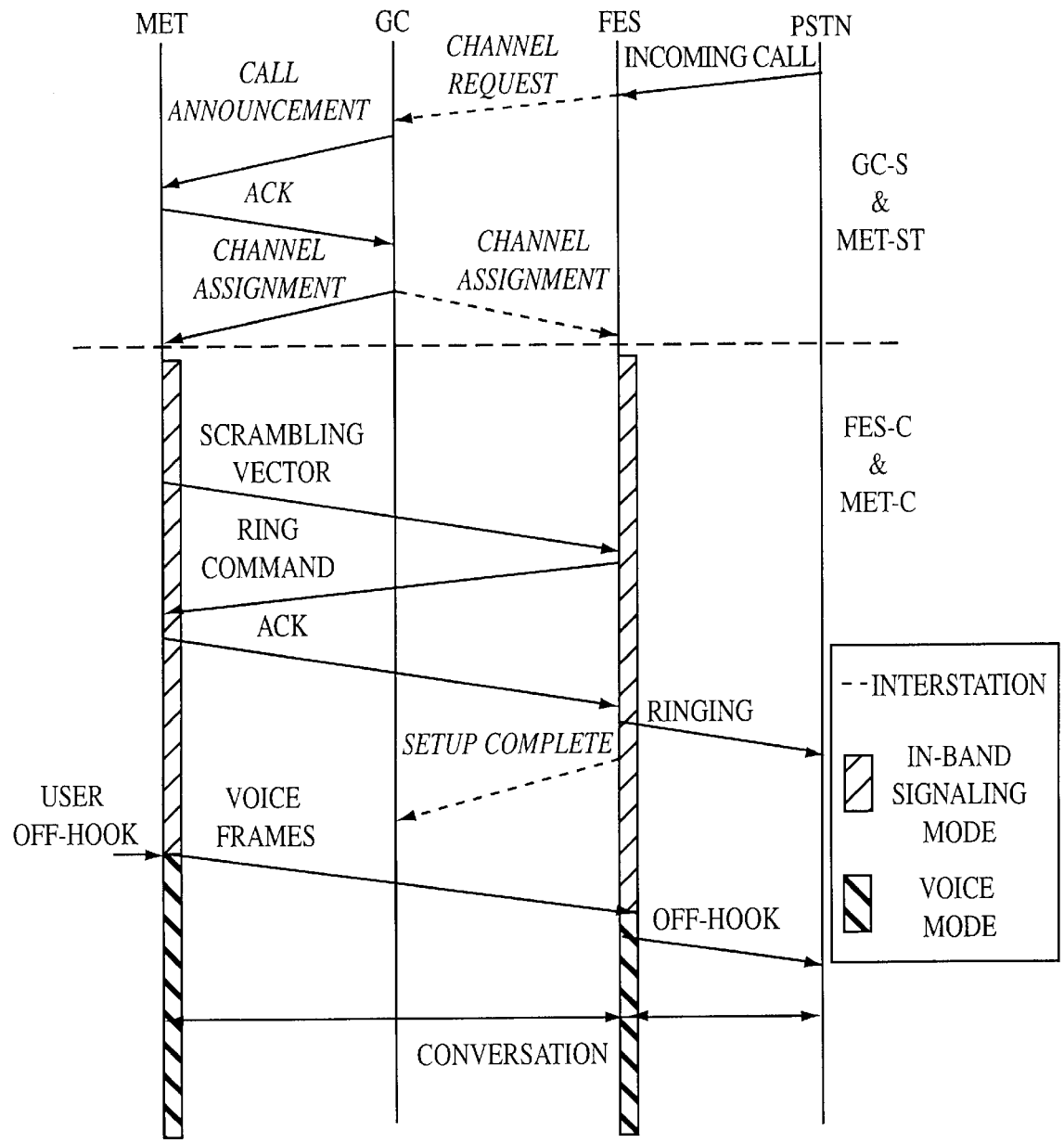
Figure 8:
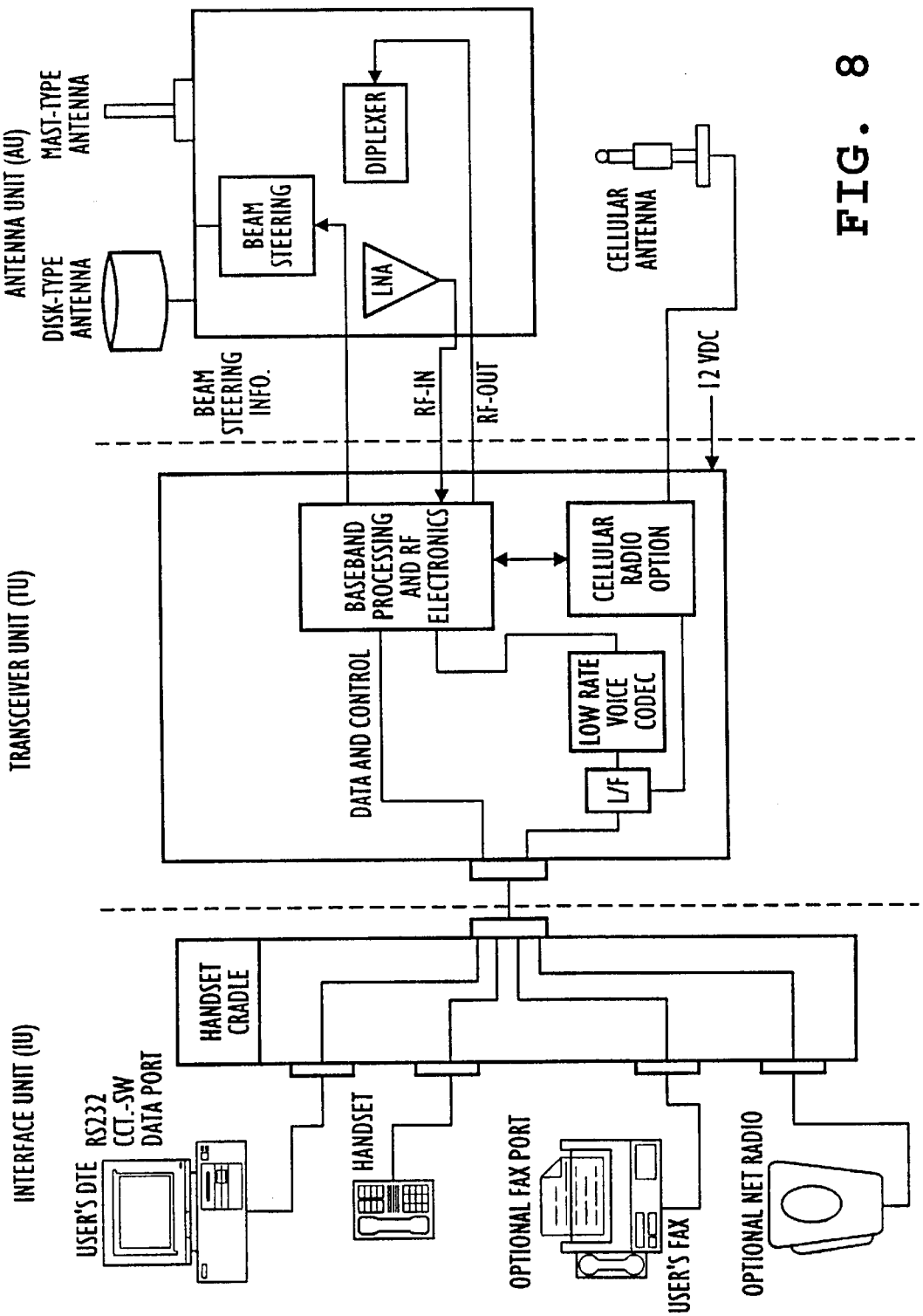
FIG. 8 is a basic block diagram of the physical architecture of the mobile earth terminal.
Figure 9:
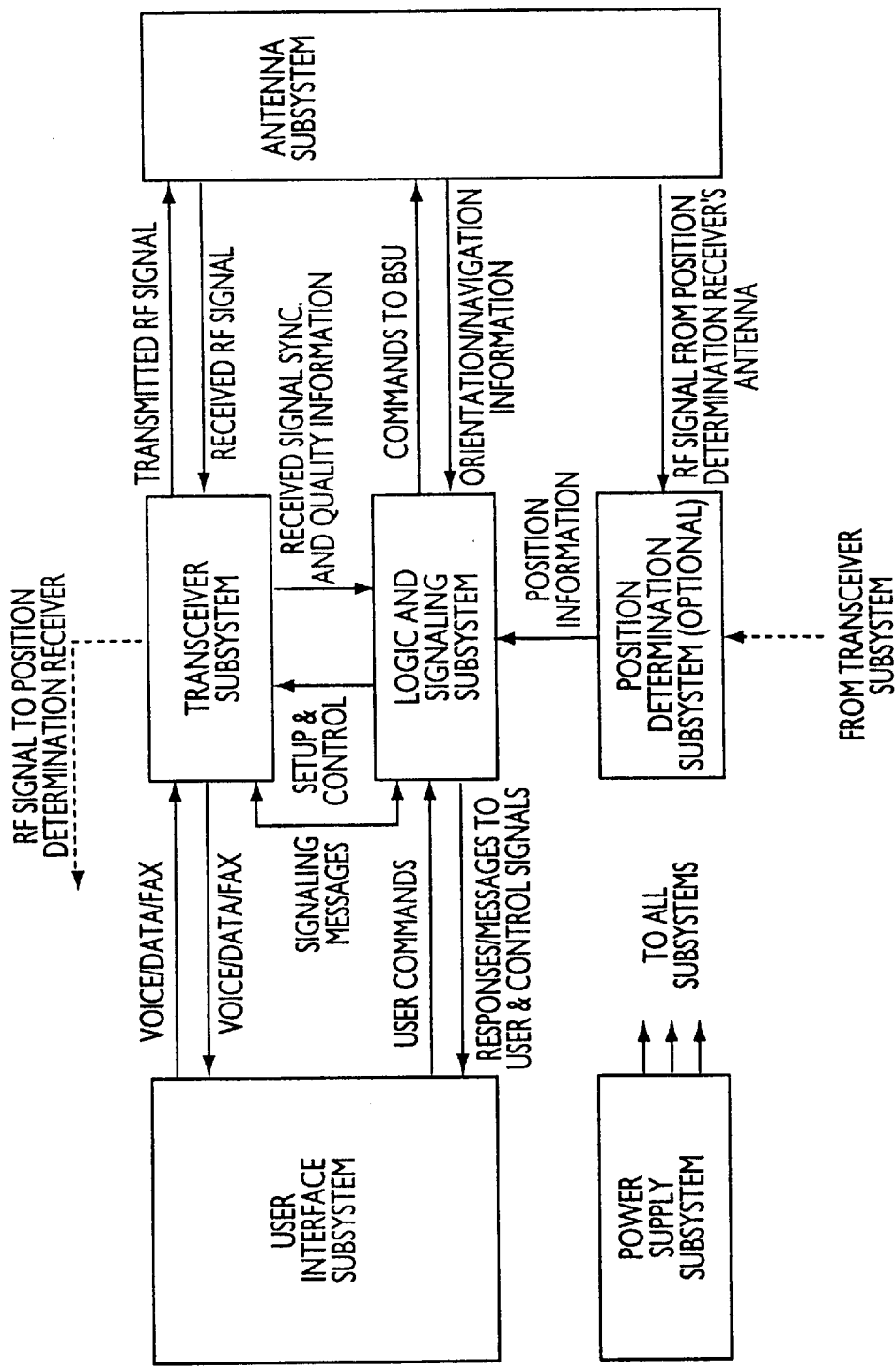
FIG. 9 is a basic block diagram of the functions of the mobile earth terminal.

The MET includes all of the communication and control functions necessary to support communications from a vehicle or fixed remote site using the resources of the satellite network system. FIGS. 8 and 9 are basic block diagrams of the physical architecture and functions of the mobile earth terminal. The basic functional diagram of FIG. 9 is implemented by baseband processing and RF electronics of FIG. 8. A standard voice coder/decoder receives coded messages from the baseband processing and RF electronic system and decodes the message received from the satellite antenna unit for delivery to the interface unit that includes standard user interfaces. Baseband processing and RF electronics receive satellite communications responsive with low noise amplifier (LNA: and output signals for transmission using the diplexer of the antenna unit. Baseband processing and RF electronics also outputs signals for use with beam steering antennas as will be discussed below. Advantageously, the mobile earth terminal is functional with antennas that are either steerable or nonsteerable.

The functional subsystems comprising the MET are shown in FIG. 9 and include the user interface, transceiver, antenna, logic and signaling, power supply subsystems, and Position Determination subsystem. The baseline MET will have a low gain directional antenna in the antenna subsystem. The satellite network system supports communications with METs using omnidirectional and higher gain directional antennas.

The user interface subsystem provides the user interfaces through which the user has access to the services supported by the satellite network system. Depending on the service(s) the MET will be equipped with one or more of the devices or ports. The transceiver subsystem consists of a receiver and a transmitter. The transmitter accepts voice, data, fax and signaling signals and converts them to a modulated RF signal. The transmit RF signal is routed to the antenna subsystem. The transmitter typically consists of the high power amplifier (HPA), the upconverter with its associated frequency synthesizer, the modulators and the modules for voice, Fax, or data encoding, multiplexing, scrambling, FEC encoding, interleaving and frame formatting.

Figure 12:
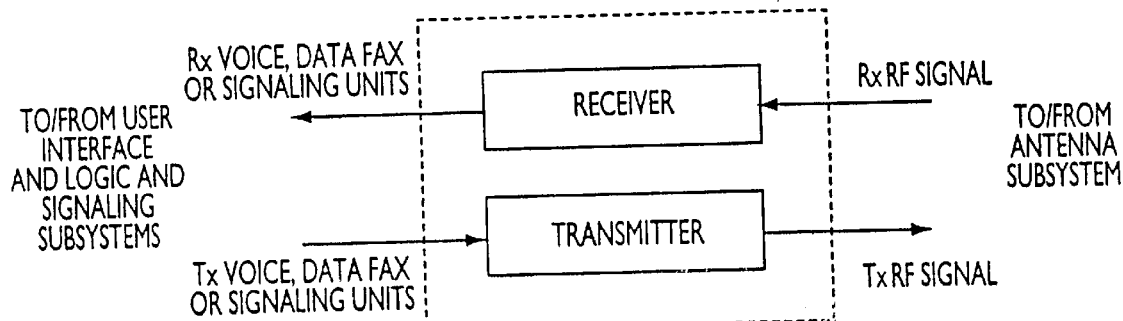
FIGS. 10–12 are diagrams of different transceiver configurations.
Figure 10:
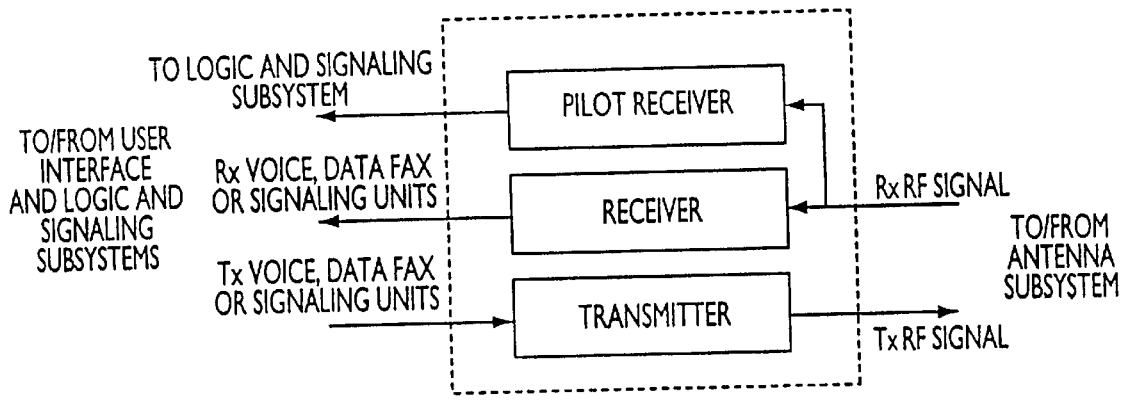
Figure 11:
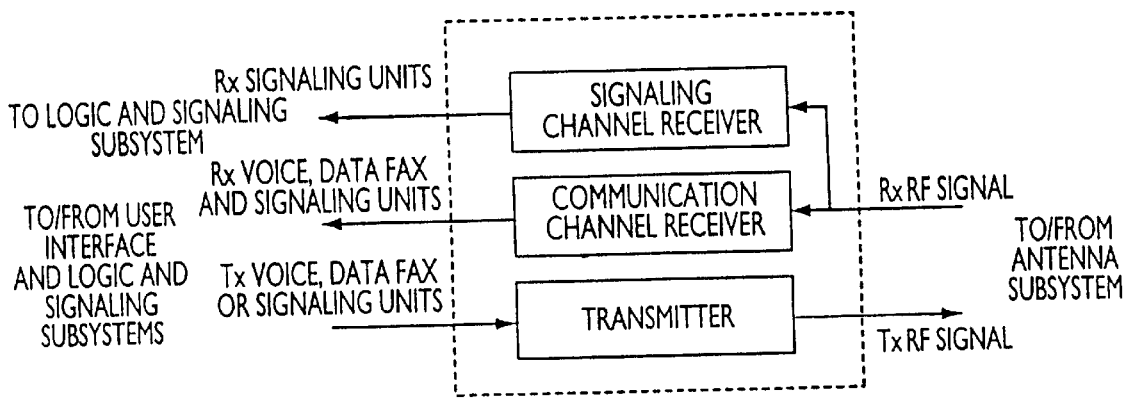

The receiver accepts modulated RF signals from the antenna subsystem and converts them into voice, data, fax or signaling signals as appropriate. The voice, data and fax signals are routed to the user interface subsystem. The receiver typically consists of the downconverter with its associated frequency synthesizer, the demodulator, and the modules for frame de-formatting, de-interleaving, FEC decoding, descrambling, demultiplexing and voice, Fax, or data decoding. The transceiver communicates over one channel in each direction at any one time. Thus, the transceiver subsystem will typically consist of only one receiver and one transmitter. However, the MET may also incorporate a pilot receiver for antennas and frequency tracking purposes, or a complete receiver dedicated to the continuous reception of the signaling channel from the Group Controller. Three different transceiver/receiver configurations are illustrated in FIGS. 10–12.

The antenna subsystem provides the MET interface to the satellite network and is responsible for receiving the RF signal from the satellite and transmitting the RF signal generated by the MET towards the satellite. The subsystem typically includes an antenna which may be either directional or omnidirectional, a diplexer, a low noise amplifier (LNA), an optional beam steering unit (BSU) if a directional antenna is used, a device such as a compass or an inertial sensor for the determination of the orientation of the vehicle, and an antenna for the position determination receiver.

The logic and signaling subsystem acts as the central controller for the MET. Its basic functions are to initialize the MET by performing a self test at power up and control, based on a resident system table, the acquisition of one of the METs assigned outbound signaling channels from which updated system information and commands and messages from the GC are derived. The logic and signaling subsystem sets up and configures the transceiver for the reception and transmission of voice, data, fax or signaling messages as appropriate. The logic and signaling subsystem also handles the protocols between the MET and the FES and between the MET the GC via signaling messages, and checks the validity of the received signaling messages (Cyclic Redundance Check (CRC)) and generates the CRC codes for the signaling message transmitted by the MET.

The logic and signaling subsystem also interprets the commands received from the local user via the user interface subsystem (e.g. on/off hook, dialled numbers, etc.) and take the appropriate actions needed, and generates, or commands the generation, of control signals, messages and indications to the user through the user interface subsystem. The logic signaling system also controls the beam steering unit (if any) in the antenna subsystem, and monitors and tests all the other subsystems. In case of fault detection, it informs the user about the failure and take the appropriate measures needed to prevent harmful interference to the satellite network or other system.

The power supply subsystem provides power to all other subsystems. The external voltage source to which this subsystem interfaces depends on the type of vehicle on which the MET is mounted (e.g. 12/24 Volts DC for land vehicles).

A standard receiver such as a GPS or a Loran-C receiver is also provided for the determination of the position of the vehicle. This information is used by the logic and signaling subsystem for beam steering (if used) or for applications such as position reporting. The position determination system is implemented externally to the MET and interfaced through a dedicated data port in the user interface subsystem.

The function of the Remote Monitor System is to continuously monitor the activity on each GC-S channel and to monitor the activity within the downlink L-band spectrum in the beam in which it is located. An RMS will be located in every beam carrying satellite network traffic. An RMS may be a stand alone station or collocated with the NCC or an FES. The RMS is controlled by the NOC and communicates via leased lines or the interstation signaling channels if collocated with an FES. The RMS detects anomalous conditions such as loss of signal, loss of frame sync, excessive BER, etc. on the GC-S channels and generates alarm reports which are transmitted to the NOC via the leased line interface. In addition, it monitors BER on any channel and power and frequency in any band as instructed by the NOC.

The primary functions of the System Test Stations (STS) is to provide commission testing capability for every channel unit in a FES and to provide readiness testing for the Off-Line NCC. The STS is collocated with and controlled by the NOC and will comprise one or more specifically instrumented METs. The STS provides a PSTN dial-up port for making terrestrial connections to FESs to perform MET to terrestrial end-to-end testing. The STS also provides a LAN interconnection to the NOC to provide access to operator consoles and peripheral equipment.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553–1989 "Cellular System Mobile Station—Land Station Compatibility Standard"; EIA/TIA-557; EIA/IS-54B.

The MSS signaling system provides the communications capability between network elements required to set up and release communications circuits, provide additional enhanced services, and support certain network management functions. The network elements discussed above include group controllers (GCs), feederlink earth stations (FESs), and mobile earth terminals (METs). The seven different channel types are:

| | |
|---|---|
| GC-S | Outbound TDM signaling channel from the GC to the METs. |
| MET-ST | Inbound TDMA signaling channel from the MET to the GC. |
| MET-SR | Inbound random access signaling channel from the MET to the GC. |
| FES-C | Outbound communications and inband signaling channel from a FES to a MET. |
| MET-C | Inbound communications and inband signaling channel from a MET to a FES. |
| GC-I | Interstation signaling channel from the GC to an FES. |
| FES-I | Interstation signaling channel from an FES to the GC. |

Figure 14A:
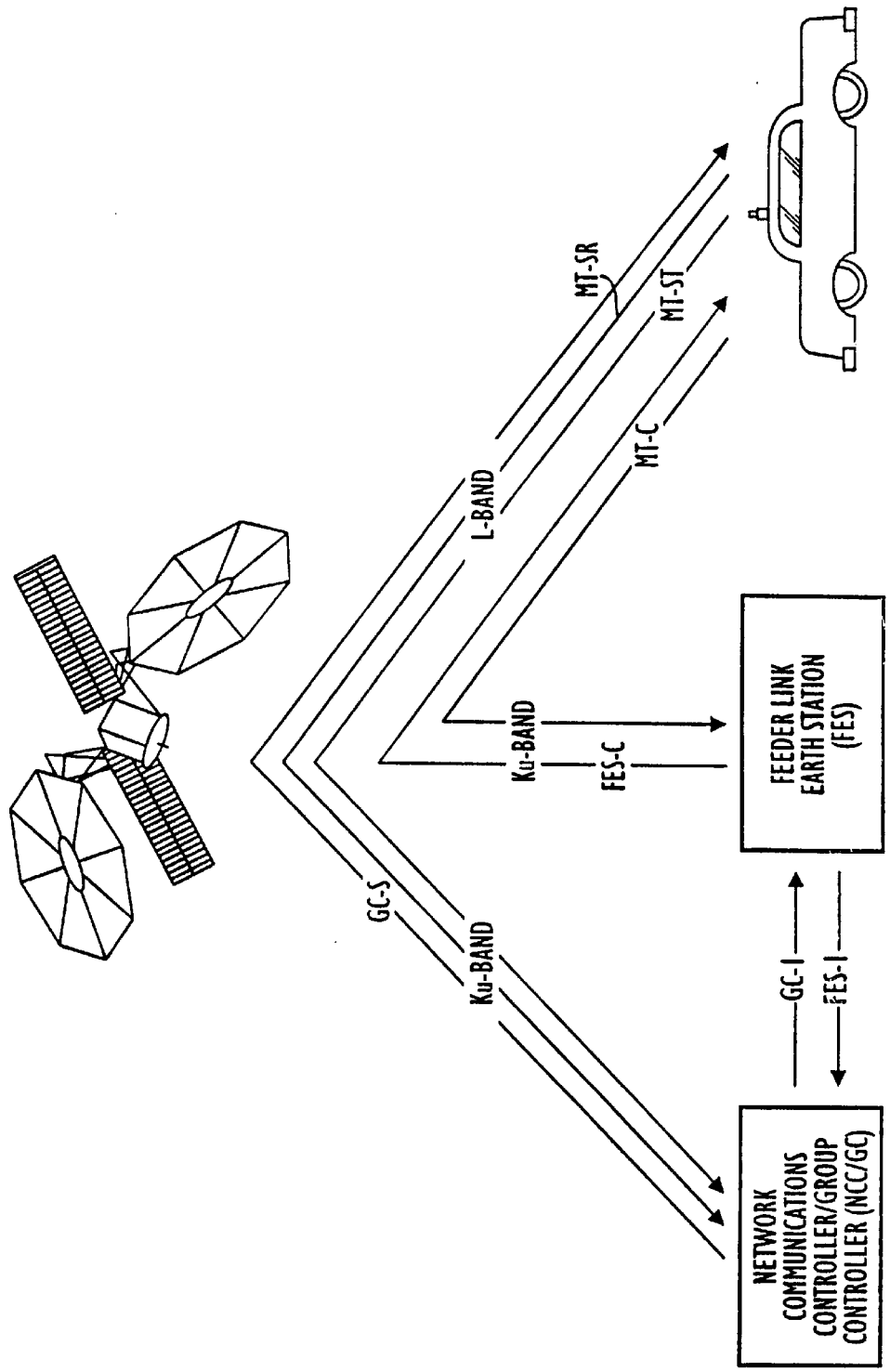
FIGS. 14a–14c illustrate the basic signalling architecture in the satellite communication system.
Figure 14B:
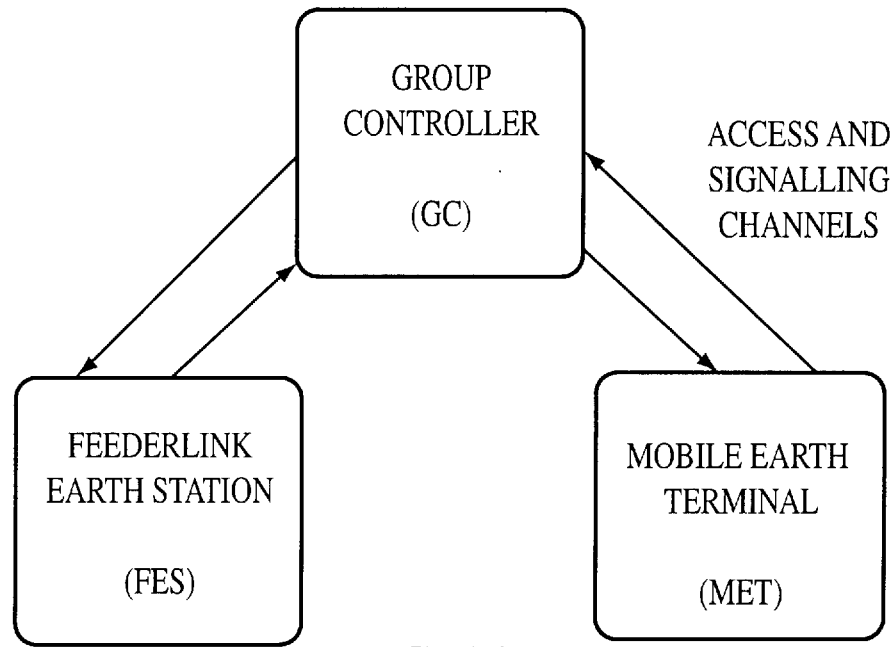
Figure 14C:
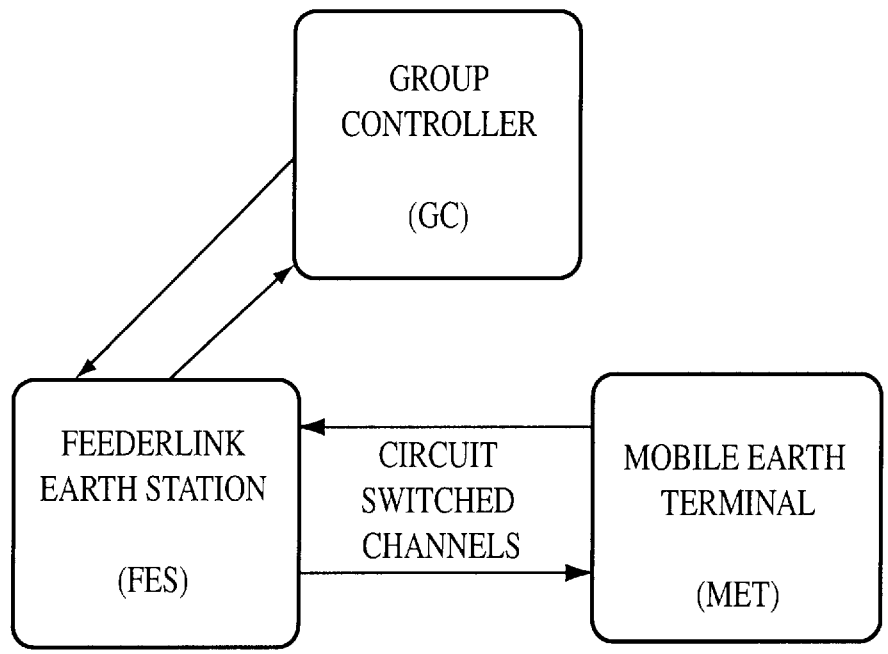

FIGS. 14a–14c illustrates the basic signalling architecture in the satellite communication system. FIG. 14b illustrates the signalling architecture before call setup, and FIG. 14c illustrates the signalling architecture after call setup.

Figure 13:
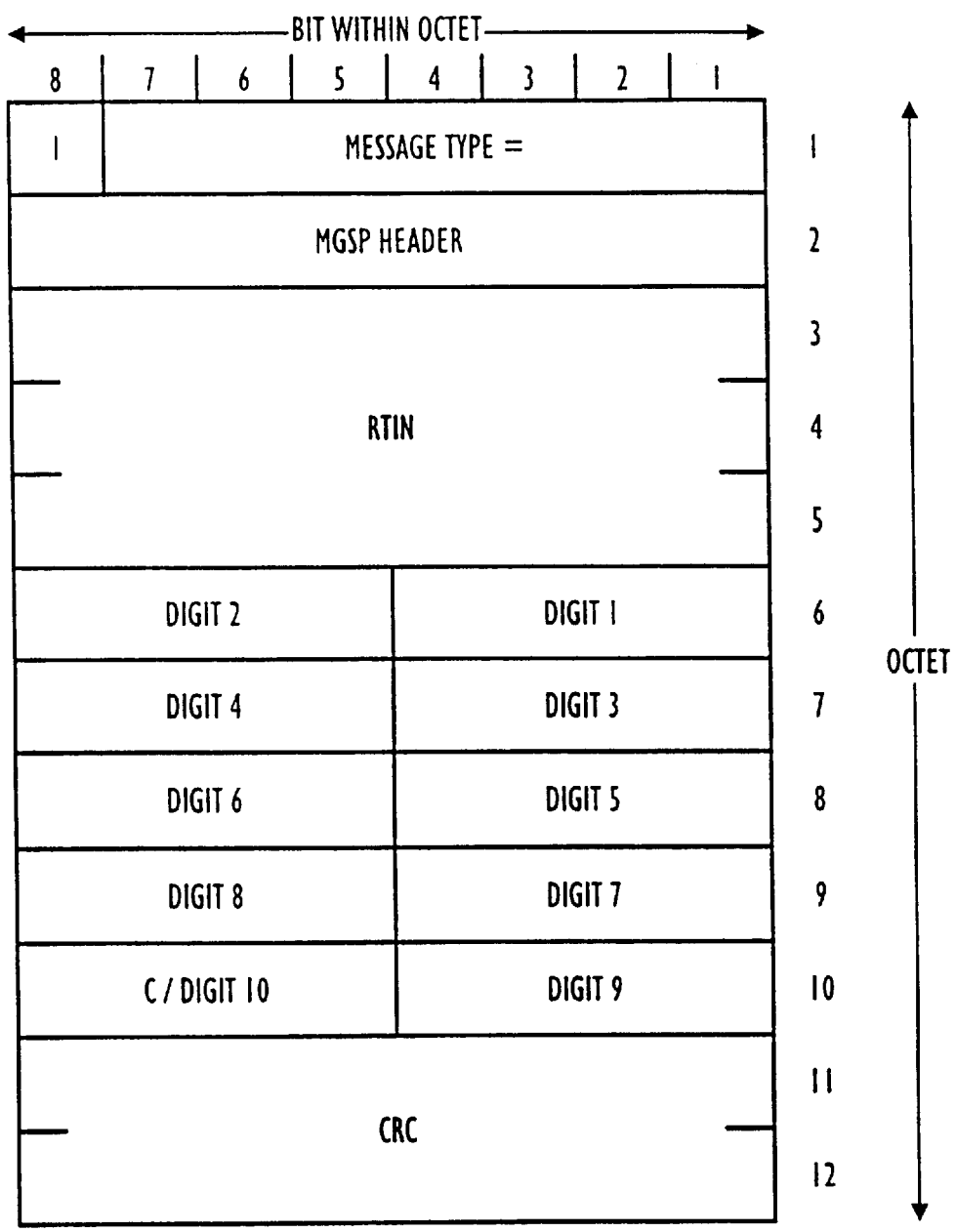
FIG. 13 is a diagram of the format of a typical signalling unit.

The basic element of communication for signaling and control for the MSS signaling system is the Signaling Unit (SU). The SU consists of 96 bits organized in 12 octets of 8 bits each. The first 80 bits comprise the message, and the last 16 a parity check, computed using the CCITT CRC-16 algorithm. The SU itself may take a variety of forms, depending on its use. The format of a typical SU, in this case a MET request for access, is shown in FIG. 13. For transmission, the SU is convolutionally encoded at either rate 3/4 or 1/2, adding an additional 32 or 96 bits respectively.

For the example given in FIG. 13, the meanings of the various fields are as follows:

Message type: A 7 bit code which identifies the meaning of the SU; in this case a request for access to the MSS system for call placement.

MET-GC Signaling Protocol (MGSP) Header: A 8 bit field comprised of several sub-fields giving particular information related to the protocol: message type (command, response, message), message reference identification, and the number of times the message has been retransmitted.

RTIN: Reverse Terminal Identification Number—the MET's Electronic Serial Number, by which it identifies itself in transmissions on the MET-SR channel.

Digits 1–10: The first 10 digits of the addressed telephone number in the PSTN or private network, in hexadecimal. If the 10th digit is set to "C", an address of greater than 10 digits is indicated.

CRC: The 16-bit error detection code (Cyclic Redundancy Code).

The frame formats used in the GC-S, MET-SR and MET-ST channels are closely related, and are based on a common 360 millisecond superframe established on the GC-S channel. The frame formats and relationships of the out of band signaling channels are shown in FIG. 15.

Figure 15:
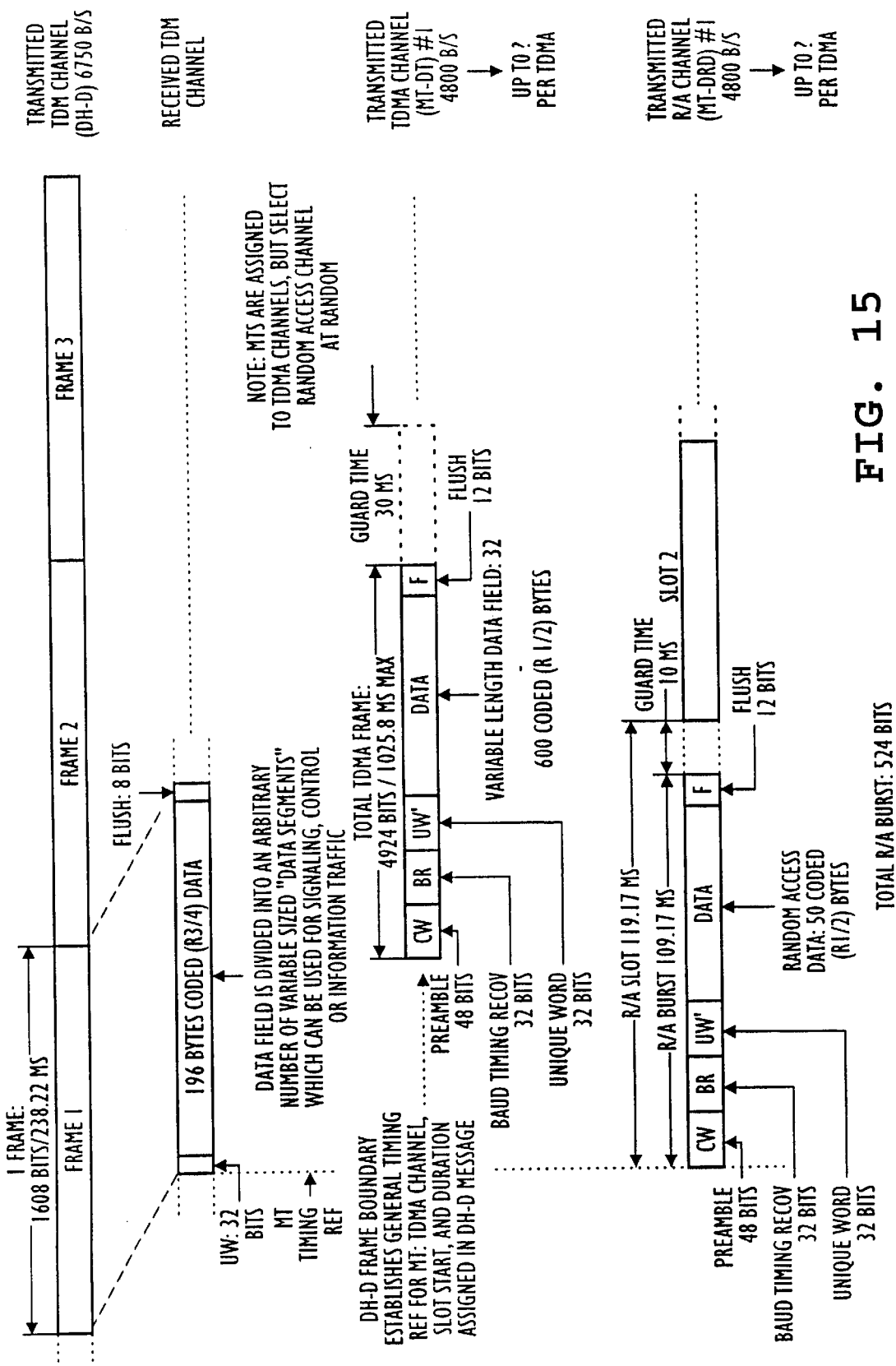
FIG. 15 is a diagram of the frame formats and relationships of the out of band signaling channels.

In FIG. 15, all timing relationships in the MSS system signaling scheme are determined from the GC-S frame structure. The GC-S is operated in the QPSK mode at an aggregate rate of 6750 b/s. The stream is divided into superframes of 360 ms, comprising three 120 ms frames. Each frame is in turn comprised of a 24-bit unique word (UW), six SUs, eight flush bits and 10 unused bits, for a total of 810 bits and 120 ms. The first frame of a superframe is identified by inversion of the UW.

Mobile terminals throughout the area covered by any beam receive GC-S channels with a total uncertainty of approximately 32 ms, primarily due to their geographical locations. The received superframe boundary establishes the four 90 ms "slots" in the MET-SR random access channels, which operate in the BPSK mode at 3375 b/s. The actual random access burst is comprised of a 24-bit preamble, a 32-bit UW, a 128-bit SU (96 bits rate 3/4 coded), and eight flush bits, for a total of 192 bits in 56.9 ms. This allows a 33.1 ms guard time between bursts. Mobile Terminals select a MET-SR channel and slot at random from among the permitted choices.

The MET-ST TDMA channels, which also operate in the BPSK mode at 3375 b/s, are comprised of bursts which are equal in length to the GC-S frame, and which are also timed on the received frame boundary. The TDMA burst is made up of a 24-bit preamble, a 32-bit UW, a 192-bit SU (96 bits rate 1/2 coded), and eight flush bits. The total length of the TDMA burst is 256 bits in 75.9 ms, which allows a guard time of 44.1 ms. Mobile Terminals always respond to commands received on the GC-S on a MET-ST channel which corresponds in number to the position of the command SU in the TDM frame. For example, the MET will respond to a command in SU slot 2 on MET-ST channel 2, and so forth. The response is always transmitted in the second frame time after receipt of the command, so that there is a minimum of 120 ms in which the MET can prepare its response.

The initial phase of establishing a call is handled by out-of-band signaling on the GC-S, MET-SR and MET-ST channels. This phase culminates in assignment of a pair of communication channels to the MET and FES. When these elements receive and tune to the communication channels, further signaling and control functions are accomplished using inband signaling. The communication channels, FES-C and MET-C, use a variety of related TDM formats which are determined by the intended use of the link, i.e., voice, data, or facsimile and one of three possible primary modes: call setup (entirely signaling), communication (no signaling), or in-band signaling (an occasional subframe of 128 bits is used for signaling/control).

Figure 16:
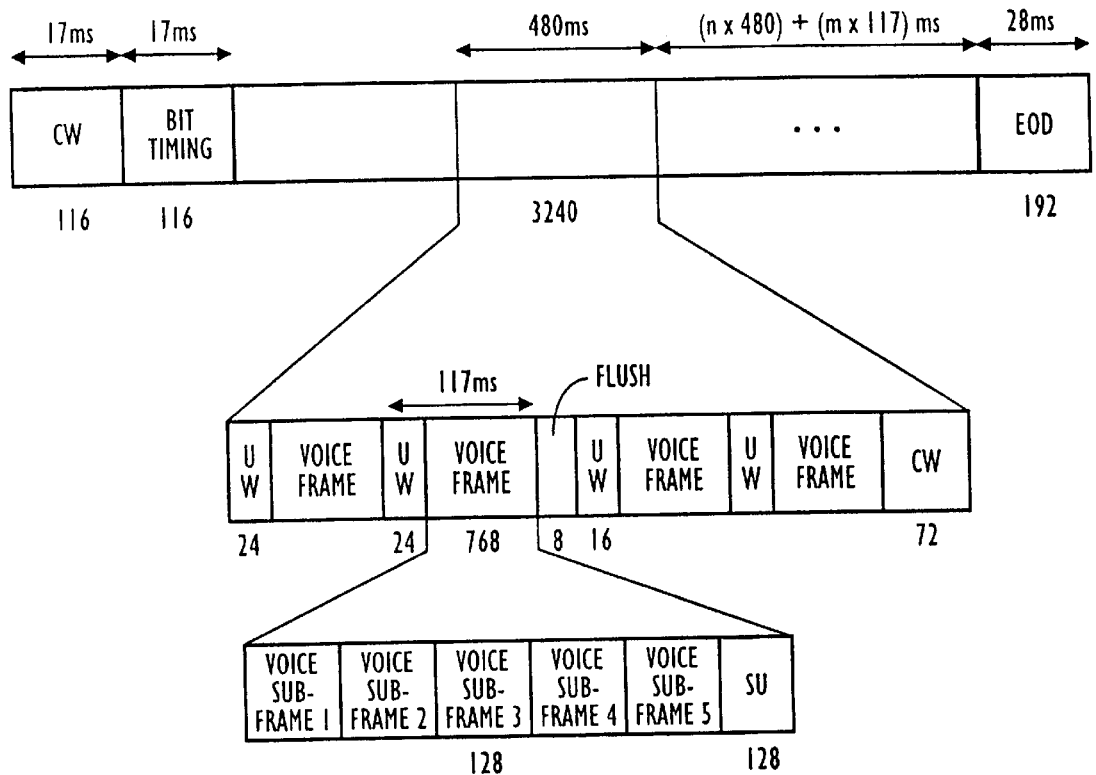
FIG. 16 is a diagram of a typical example of a communication channel format, in this case voice mode in-band signaling.

The same 96-bit SU described above is used to accomplish in-band signaling. A typical example of a communication channel format, in this case voice mode in-band signaling is shown in FIG. 16.

The outbound TDM, inbound TDMA, and inbound random access channels provide signaling between the GC and each of the METS in the associated control group. All communications on these channels will be passed in the form of 96 bit (12 octet) messages known as signaling units. Each signaling unit will begin with a 1-octet messages type field and end with a two-octet cyclic redundancy check. The MET to GC Signaling Protocol (MGSP) serves as the layer two protocol for these channels.

Communications from the group controller (GC) to the mobile terminals is provided by the Outbound TDM or GC-S channel. The primary function of this channel is to carry frequency assignments from the GC to individual METs. In addition, the Outbound TDM channel carries network status information which is received by all METs in a particular beam and control group. The outbound TDM channel operates at a rate of 6750 bits/s with rate 3/4 FEC. QPSK modulation and nominally 6.5 kHz channel spacing (other spacings are under investigation) is employed. These parameters are identical to those of the communications channel and were chosen to reduce MET complexity.

Inbound TDMA (MET-ST) channels are used by the MET to respond to actions initiated by the GC, such as responding to the call announcement issued by the GC to check a MET's availability to receive a PSTN originated or MET to MET call. The Inbound Random Access (MET-SR) channels are used by METs to request frequency assignments and for other MET initiated actions. The inbound random access and TDMA channels each operate at a rate of 2400 bits/s with rate 3/4 FEC. DPS modulation and nominally 7.5 kHz channel spacing is employed. This modulation scheme has been selected because of its robust performance in the presence of frequency offset and timing errors. It also exhibits superior performance relative to conventional BPSK in the presence of band-limiting and hard-limiting.

Each control group has associated with it a number of L-band beams over which it operates. In each of these L-band beams a control group has associated with it a distinct set of outbound TDM, inbound TDMA, and inbound random access channels. The number of signaling channels of each type in each set is determined based on the level of signaling traffic flowing between the GC and the METs in that control group in that L-band beam. As signaling traffic levels change, new signaling channels of each type are allocated to or deallocated from a particular set of channels. The frequencies used for outbound TDM, inbound TDMA, and inbound random access channels are included in the status information carrier in the bulletin board signaling units transmitted on the outbound TDM channel.

Each MET is assigned to one of the outbound TDM channels in the control group and beam to which it belongs. Each control group supports up to 16 outbound TDM channels in each beam. Each outbound TDM channel has associated with it up to 6 inbound TDMA channels. An inbound TDMA channel will only carry messages that are responses to messages received on the outbound TDM channel with which it is associated inbound random access channels will not associated with a particular outbound TDM channel. A MET chooses a inbound random access channel at random from among those associated with its control group and beam each time a message is to be transmitted. Each control group can support up to 64 inbound random access channels in each beam. Up to 64 of these channels may be used system wide to meet the signaling requirements of a fully loaded system supporting 5000 circuits.

Inband signaling channels (FES-C and MET-C) are provided between the FES and the MET. These channels are used to provide signaling for call setup and call release, and also provide the capability to pass other signaling information while a call is in progress. The FES-C and MET-C channels are operated in two separate modes in "call setup mode" only signaling messages are carried by the channel. In voice mode voice frames are carried by the channel, but the capability to inject signaling messages by occasionally dropping voice subframes exists. Frames containing inband signaling messages employ a unique word different from that used for frames containing only voice subframes.

Interstation signaling channels (GC-I and FES-I) are used to pass signaling information between the GC and each of the FESs. These channels operate at a rate of 9.6 to 64 kbit/s and are implemented using either the available 5 MHz Ku-band satellite capacity or terrestrial links. The LAP-F protocol will be employed on those links to ensure reliable transfer of variable length signaling and network management messages.

When a MET is idle (powered on and ready to receive a call) it will continuously receive an Outbound TDM channel in order to receive call announcements associated with incoming calls and obtain status information from bulletin board signaling units. Each MET will be capable of transmitting signaling information to the GC on any of the inbound random access channels or on any of the inbound TDMA channels associated with the outbound TDM channel that it is receiving. During a call a MET will receive and transmit all signaling information via the In-Band signaling channels. No signaling information will be sent to a MET via the outbound TDM channel during a call. Any signaling messages from the GC to the MET will be sent to the MET via the FES through the GC-I and FES-C channels.

Each group controller supports at least one outbound TDM channel in each of its associated L-band beams. Each outbound TDM signaling channel is continuously transmitted and carries frequency assignments and networks status information from the GC to the METs. The outbound TDM channels are also used to poll idle METs to see if they can accept incoming calls. As this channel is the only way to signal information to a MET not engaged in communications, it must be as robust as possible under harsh fading and shadowing conditions.

Another key element in the MSS system is the need for the METs to be as inexpensive as possible. Towards this end, the outbound TDM channel will have the same rate and modulation as the communications channels. This will maximize the commonality of the receive chain of the MET for communications and signaling. Note that as the demodulation process is much more complex than the modulation process, the inbound random access and inbound TDMA channels do not really require this level of commonality with the communications channel.

The number of outbound TDM channels assigned to each set of signaling channels is determined by the traffic supported by the group controller in that L-band beam. Assignment of METs to outbound TDM channels is made based on a special identifier assigned to each MET as commissioning. This identifier is called the GC-S Selector Identifier code (GSI). The MET selects the outbound TDM channel to be used by dividing the GSI by the total number of outbound TDM channels available in the given beam. The number of TDM channels available is given in the BB of each TDM channel. The remainder of the four bit binary division process will form the number of the channel to be used. Each MET will receive only the outbound TDM channel assigned to it. This method allows METs in the same logical grouping to be assigned to the same outbound TDM channel as is needed for the Net Radio Service provided by the MSS System. It also allows the load on the outbound TDM channels to be redistributed quickly if a channel fails or a new channel is added.

The 120 ms frame length was chosen because it would support 6 messages per frame and correspond to the slot size requirement (>120 ms) of the inbound TDMA channel. This allows a direct correspondence between outbound TDM frames and inbound TDMA slots for the purposes of TDMA synchronization and scheduling responses to outbound messages. Eight flush bits are included at the end of each frame to allow the decoder to reset to a known state at the beginning of each frame. This allows more rapid reacquisition following channel fade events. The modulation scheme and transmission rate for this channel will be the same as for the transmission channel, namely QPSK modulation at a transmission rate of 6750 bps. Signaling units within each frame will be coded with a rate 3/4 constraint length K=7 convolutional code.

The outbound TDM superframe has a duration of 360 ms and is made up of three outbound TDM frames. The superframe duration is the basic time interval over which message repetitions are done. Repetitions are used to increase the reliability of outbound TDM signaling units. Messages can be repeated in consecutive superframes. Studies by AUSSAT have shown that L-band fade events typically have durations ranging between 10 ms and 100 ms (2). Because the 120 ms frame would not provide adequate separation between message repetitions, the 360 ms superframe is used to reduce the chance of losing two copies of a message during the same L-band fade event. This repetition method is similar to that used in the AUSSAT system. Different numbers of repetitions may be used for different message types to provide different levels of reliability. The number of repetitions used for a particular message type will be a part of the signaling protocols and can be varied by the system operator. In addition to message repetitions, interleaving will be used to protect against burst errors. The interleaving is provided over a TDM frame and provides improved performance in the presence of short burst errors.

The bulletin board is a set of signaling unit (SUs) that are periodically transmitted by the MCC on all outbound TDM channels. The bulletin board contains global information such as current network status, signaling channel frequencies and inbound random access channel congestion control parameters. Every MET processes the information in the bulletin board METs, on startup, and acquires the entire bulletin board before attempting to use the MSS system. At least one bulletin board SU is transmitted in every outbound TDM frame. Bulletin board SUs are also sent as "filler" SUs, i.e., sent when there are no other SUs pending on the outbound TDM channels. Bulletin board SUs do not occupy any fixed position in the outbound TDM frame.

Bulletin board SUs are grouped into pages of related SUs. Each Bulletin Board page has an update number associated with it, which will be sent with each SU of that page. This number will be incremented by the NCC whenever the information in that page is updated. METs are required to build a local data structure that contains the contents of the bulletin board. Whenever a change in update number is detected for any page, the MET will update the entire data structure for that page with the contents of the bulletin board SUs that follow.

The inbound TDMA channel is used by the METs to transmit responses to call announcement messages and for responses to other messages received on the outboard TDM channel. Each of the inbound TDMA channels is assigned to a particular outbound TDM channel. The number of inbound TDMA channel assigned to a particular outbound TDM channel depends on the traffic supported by that outbound TDM channel and is selectable by the network operator. The TDMA channel is divided into slots of 120 ms duration. Inbound messages consist of 96 bits before coding and 128 bits after rate 3/4 convolutional coding. The resulting burst will occupy 80 ms of the slot, allowing 40 ms of guard time.

This guard time arises due to the uncertainty in round trip transmission time between the satellite and a mobile terminal. Mobile terminals derive their inbound frame timing (for both the TDMA and random access channels) from the outbound TDM frames. Inbound TDMA slots have the same duration as an outbound TDM frame. At a MET each TDMA slot boundary occurs at an outbound TDM frame boundary. If MET A is nearer to the satellite than MET B, MET A will receive the outbound TDM channel $\Delta t$ sooner than MET B, where $\Delta t$ corresponds to the difference in propagation times to the satellite for the two terminals. As a result, if both METs synchronize their transmit timing to their reception of the outbound TDM channel, MET B's responses to messages will take $2\Delta t$ longer to reach the satellite than MET A's responses. As additional guard time of 1 symbol time also must be included to account for the $\pm 1/2$ symbol synchronization uncertainty in the MET. This results in a total guard time requirement of $2\Delta t \pm 1$ symbol time.

TDMA scheduling is done using a fixed relationship between outbound TDM channel time slots and inbound TDMA channels and slots. The response to a message received in the nth slot of the outbound TDM frame is transmitted on the nth TDMA channel assigned to that outbound TDM channel. The frequencies of the assigned inbound TDMA channels are contained in one of the bulletin board signaling units periodically transmitted in the outbound TDM channel. The response to an outbound message is transmitted in the TDMA time slot that begins 120 ms after the end of the TDM frame in which the outbound message was received. This should provide adequate time for message processing in the MET.

The inbound random access channel is used by the METs to transmit call requests to the GC. It is also used to carry other inbound messages for MET originated actions. The number of inbound random access channels assigned to a particular control group in a particular L-band beam depends on the traffic supported by that control group in that beam and is selectable by the network operator. To provide reasonable call setup times and call loss probabilities these channels are typically be operated at a throughput of approximately 25% or less. As the random access channel is operating at a relatively low efficiency, one of the prime goals in its design is that it be bandwidth efficient.

The frequencies used for the random access channels, are transmitted in the bulletin board signal units. For each transmission, METs choose at random among the inbound signaling channels assigned to their control group. After transmitting a message, the MET waits a given amount of time for a response. If no response is received within this amount of time, the MET retransmits in a slot selected at random over some given number of slots. This procedure is repeated until either a response is received or a maximum number of transmissions is reached. The bursts on the random access channel are identical to those on the TDMA channel (i.e., modulation, coding, preamble, etc.).

The MET-GC Signaling Protocol (MGSP) procedures send signaling units between GCs and METs via the GC-S, MET-ST and MET-SR channels. This protocol encapsulates functions such as channel selection, channel access, slot timing, error recovery and congestion control. Higher layer functions, such as call processing, use the protocol for communicating among themselves between the METs and GCs.

Figure 17:
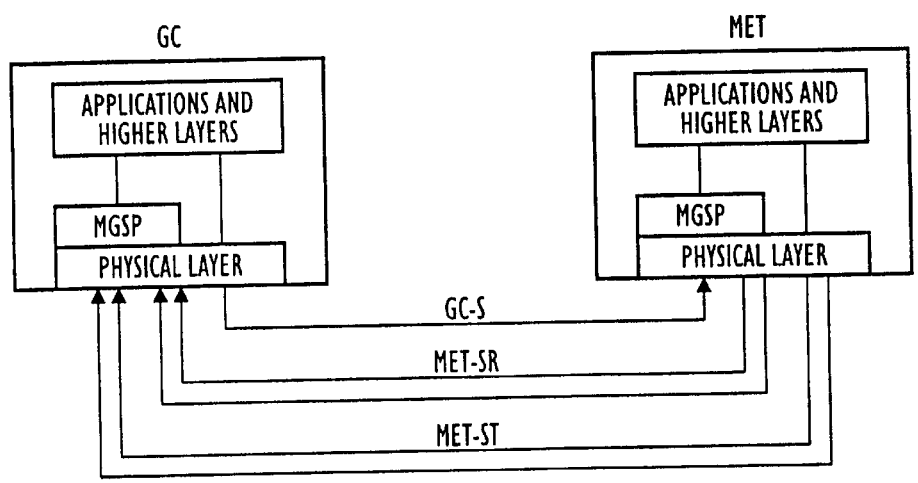
FIG. 17 is a diagram of the relationship of MGSP to other signaling layers in the GC and the MET.

The relationship of MGSP to other signaling layers in the GC and the MET is shown in FIG. 17. A transaction consists of a command message that is sent from an originating application to a destination application, to which the destination application replies with a response message. Each command and response consists of a signaling unit. The MGSP performs functions such as channel selection, error recovery using retransmission, and repetition of SUs to improve channel reliability. The MGSP at a MET also implements congestion control procedures for the MET-SR channels. Only one outstanding transaction exists between a MET and a GC in a given direction. However, two simultaneous transactions, one in each direction, are supported between a GC and a MET. MGSP also provides a only-way message service, that does not require a response from the receiver.

Figure 18A:
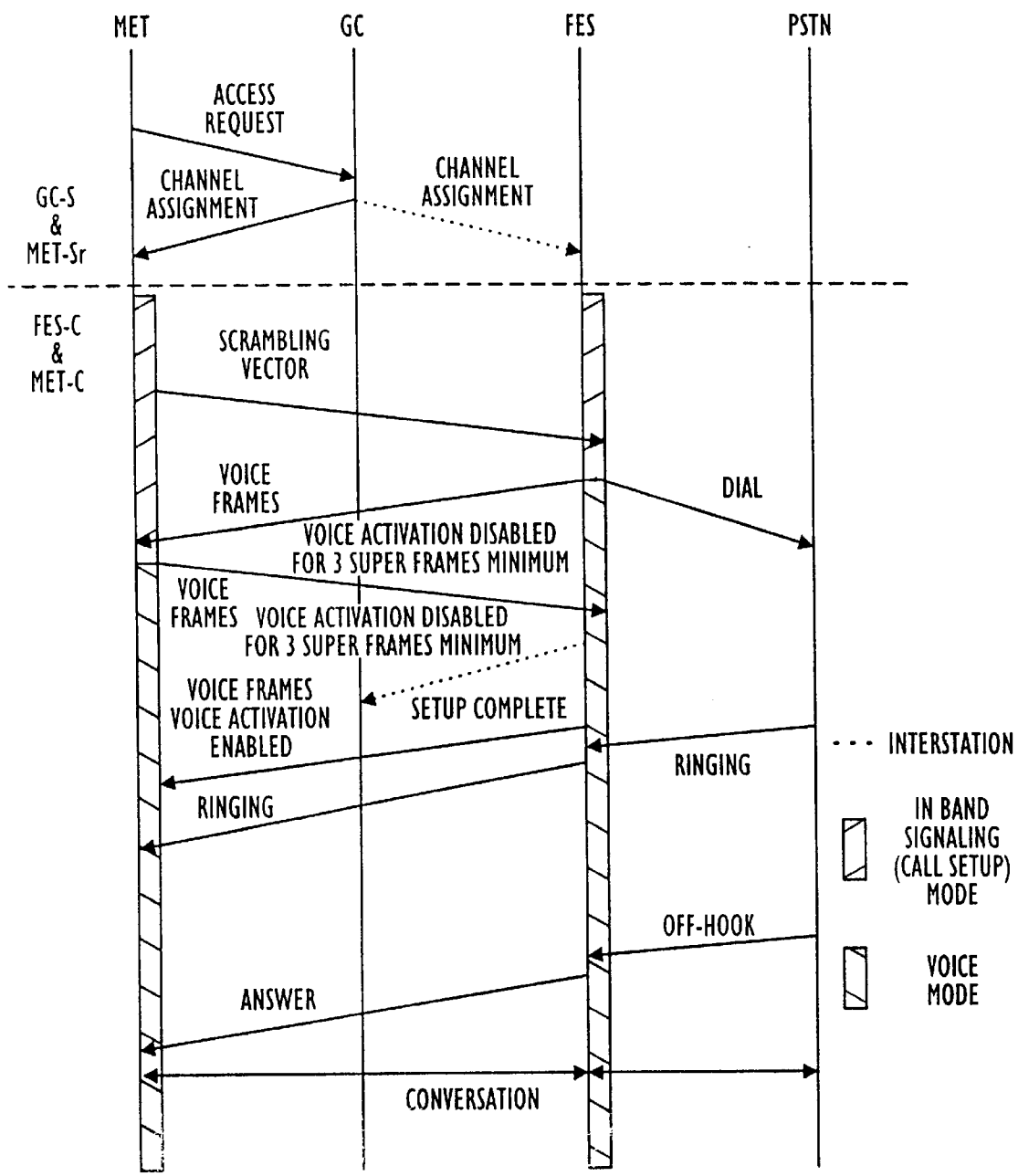
FIGS. 18a–18b are diagrams of the improved call setup protocol used to establish a MET originated voice call.
Figure 18B:
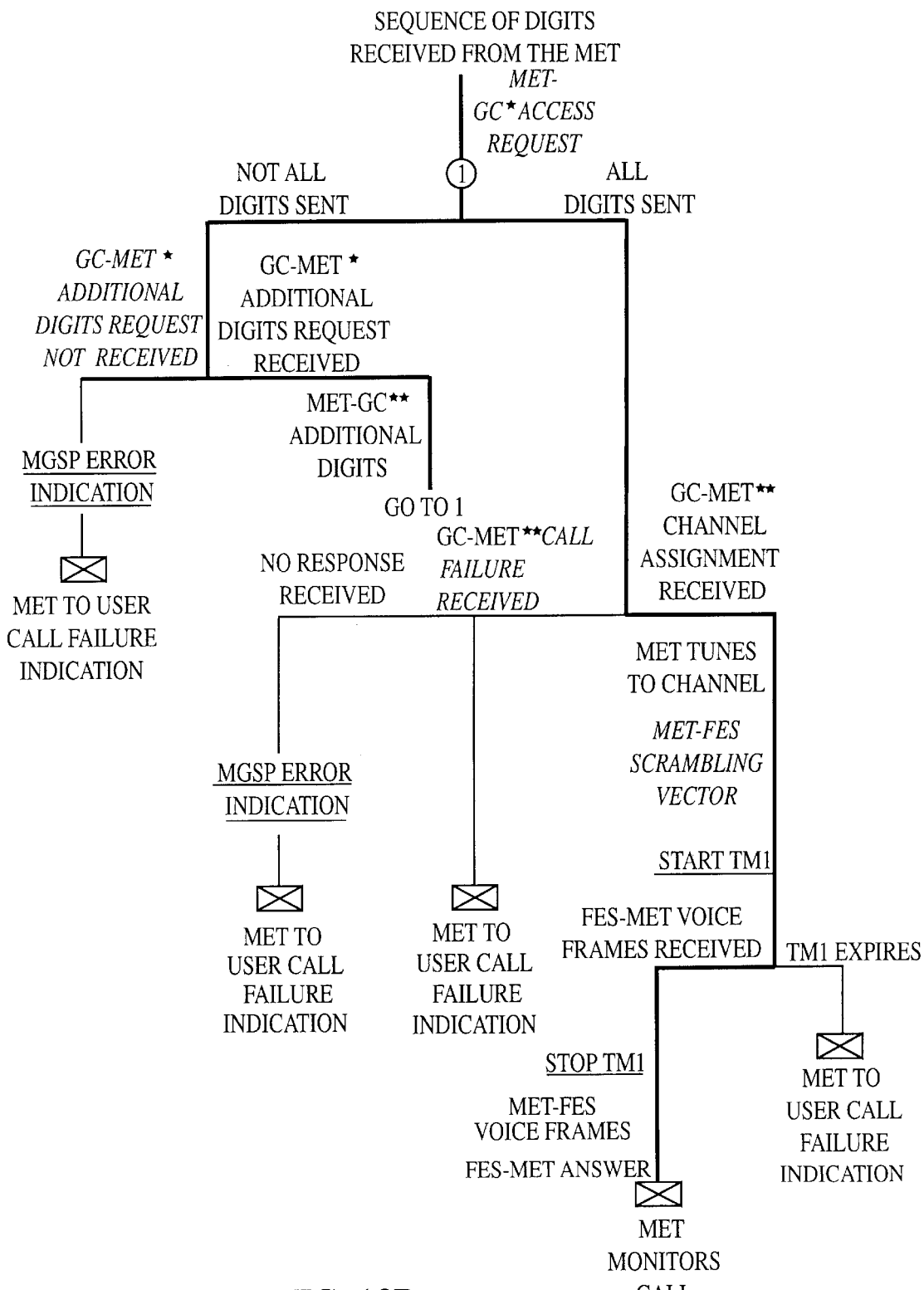

The improved call setup protocol used to establish a MET originated voice call is shown in FIGS. 18a–18b. When a MET user initiates a call, the MET formats and transmits an access request message via a random access channel. This message includes the call type and the destination phone number. The group controller chooses an FES to handle the call and sends frequency assignments to the MET via the TDM channel and to the FES via the interstation signaling channel. The FES frequency assignment also includes the call type, the destination phone number to allow the FES to complete the call, and an access security check field used to verify the METs identity. The access security check field is generated by the group controller using the MET frequency assignment and the MET key which is known only to the MET and the group controller.

After the MET receives the frequency assignment, it transmits a scrambling vector message to the FES. This message contains the initial vector to be preloaded into the FES scrambler at the beginning of each voice channel frame. Letting the MET randomly pick this vector provides some degree of privacy on the Ku to L-band link. The scrambling vector message also contains an access security check field generated by the MET using its frequency assignment and its key. The FES compares this field with that received from the group controller to verify the identity of the MET. When the FES receives the scrambling vector, the FES will check the validity of the METs identity. If the check fails, the FES will initiate a call release.

After receiving the scrambling vector message and successful authentication of the MET (see U.S. application Ser. No. 08/565,036, filed Nov. 30, 1995, entitled FRAUD DETECTION AND USER VALIDATION SYSTEM FOR MOBILE EARTH TERMINAL COMMUNICATION DEVICE," incorporated herein by reference), the FES and the MET switch from call setup mode to voice frame mode and the FES completes the call to the terrestrial network user. The FES transmits voices frames to the MET to effectuate voice communication. We have discovered that the coder/decoder which is used in the MET imposes certain constraints described below that require the signalling architecture to be adapted thereto.

Specifically, we have determined that the voice coder/decoder performs the following functions that impact on the signalling architecture in the context of our mobile satellite system. The voice coder/decoder receives coded messages from the baseband processing and RF electronic system and decodes the message received from the satellite antenna unit for delivery to the interface unit that includes standard user interfaces. The voice coder/decoder processes speech to produce 6400 bps output. The inherent speech coding rate is 4150 bps, to which 2250 bps of error correction and detection is added. The coder/decoder encodes 160±4 samples of speech and converts it to 128 bits. The encoding function is called approximately every 20 ms to produce the 6400 bps bit stream. The coder/decoder decodes 128 bits of speech and produces 160±4 samples of speech. The encoder/decoder also performs voice activity detection.

In accordance with the coder/decoder functions and operations, the coder/decoder includes a voice activation timer or synchronizer that is used to determine and insure that a caller is present during the call setup process. The encoder determines that the voice communication is active when valid data appears at the output within two sub-frames or approximately 40 ms. The encoder determines that the voice communication is not active when no voice activity occurs for 3 sub-frames or approximately 60 ms. The decoder sets the voice activity to active when voice activity is detected, and to inactive when no voice activity is detected.

In accordance with the above constraints of the coder/decoder, we have determined that the protocol used by the mobile satellite system must be adapted for use with the standard encoder/decoder used for voice communication. In particular, we have determined that the inherent delays in the mobile satellite system are incompatible with the voice activation timer used in the coder/decoder. In this connection, we have determined that it is beneficial to eliminate usage of the voice activity timer during the voice mode prior to completion of call setup. Once call setup has been completed, the voice activity timer can then be re-enabled and used for its intended purpose, i.e., to determine whether the call is still active or whether the call has terminated, thereby freeing up satellite resources more expediently.

Accordingly, once voice frames have been transmitted from the FES to the MET in the voice mode, and once the FES transmits the destination number to the PSTN, the FES also transmits a voice activation disable signal to the MET to disable the voice activation timer in the MET. The voice activation timer is then disabled for at least 3 super frames. After the FES has completed call setup with the GC, the FES transmits a signal to re-enable the call activation timer in the MET.

The PSTN provides ringing tones to the FES indicating that the call is being placed to the destination, and the FES in turn transmits the ringing tones to the MET. When the destination telephone answers the MET originated call, an off-hook signal is transmitted from the PSTN to the FES, and the FES in turn transmits same to the MET indicating that the call has been answered by a user connected to the PSTN. Voice communication between the MET and the PSTN destination via the FES is then commenced until either party terminates the MET originated call.

Figure 19A:
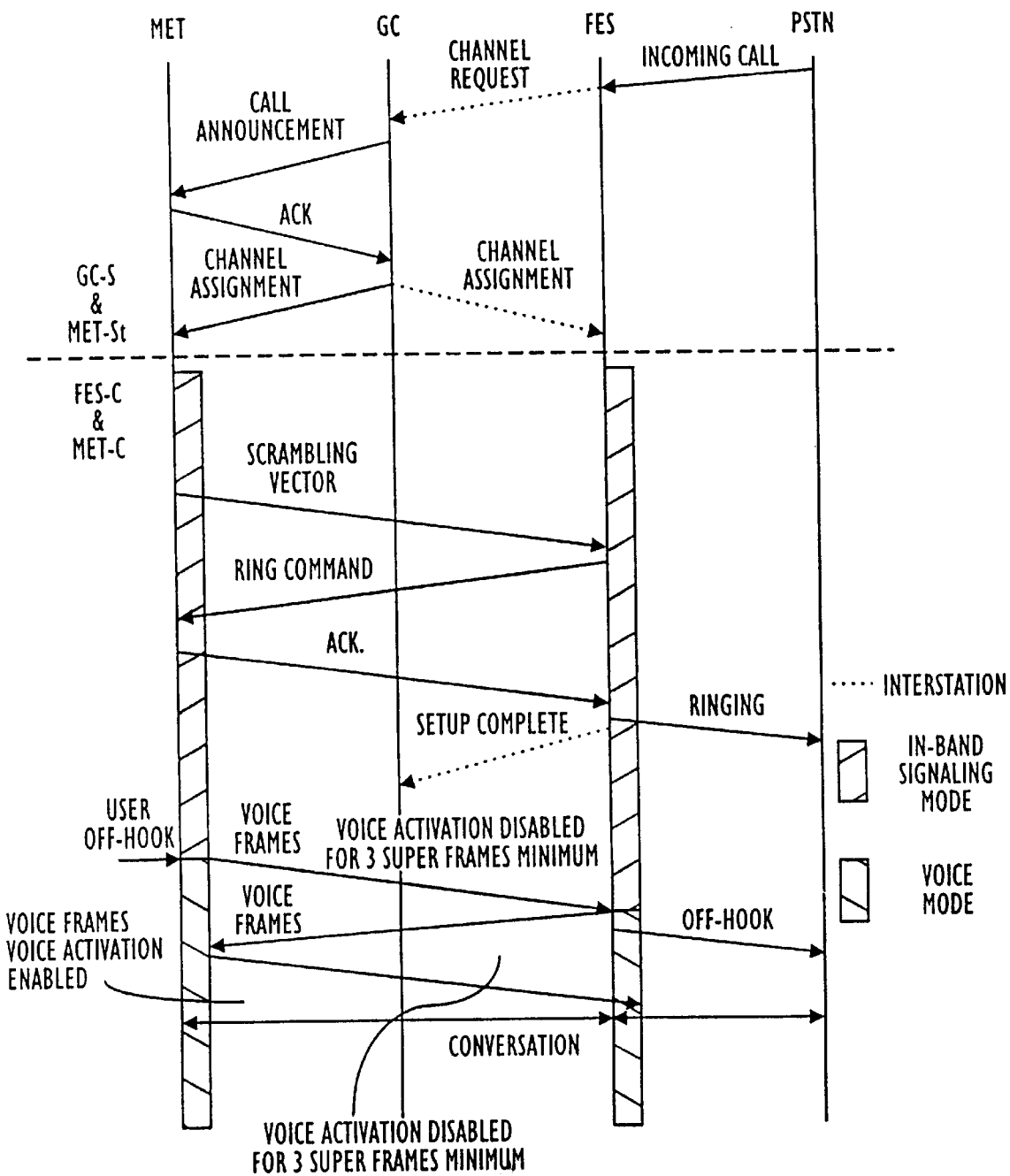
FIGS. 19a–19b are diagrams of the improved protocol used for PSTN originated calls.
Figure 19B:
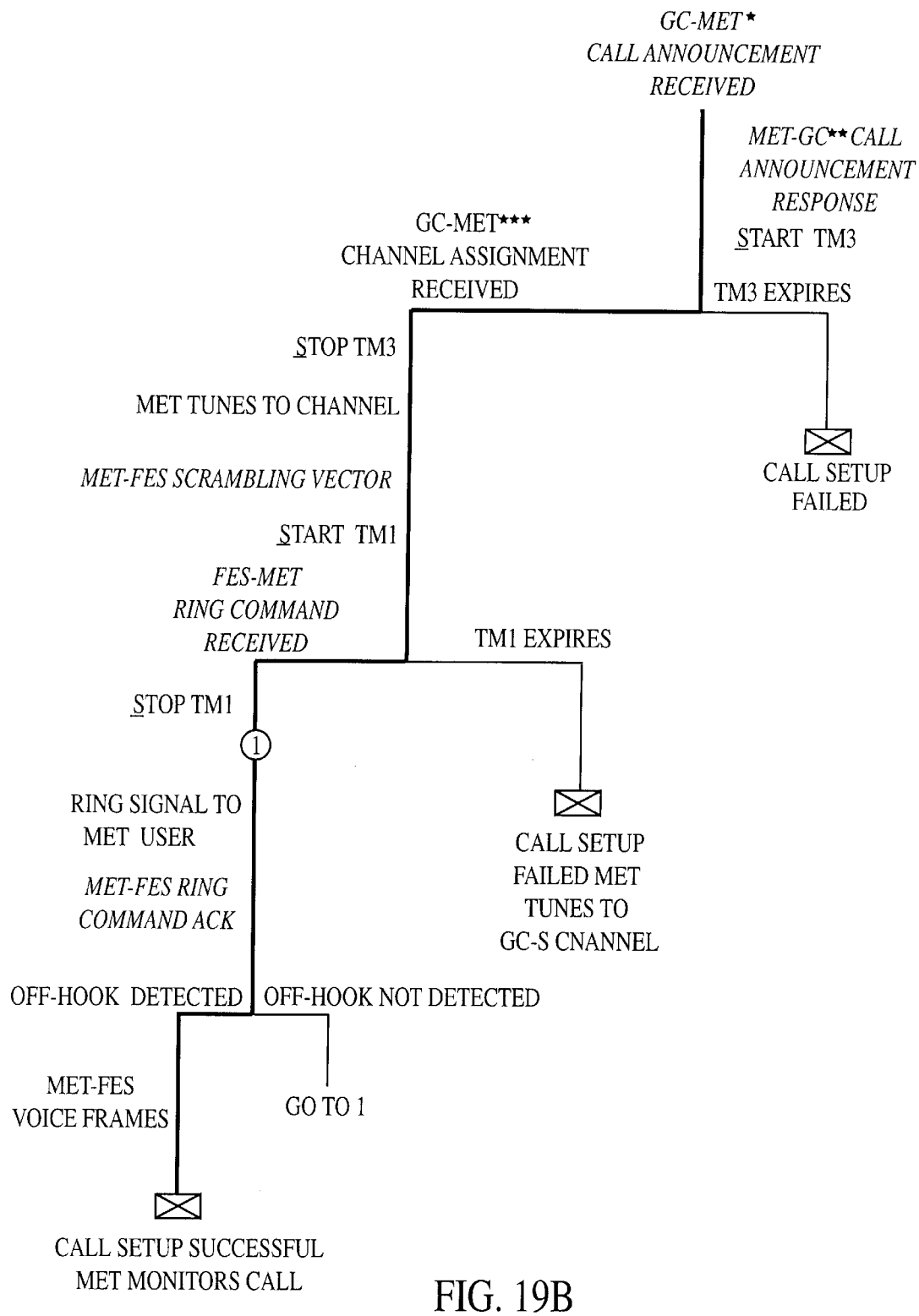

The improved protocol used for PSTN originated calls is shown in FIGS. 19a–19b. When a call from a terrestrial network user arrives at an FES, the FES makes a channel request using interstation signaling. This request contains the phone number received from the terrestrial network user. The group controller determines the MET identity based on the phone number and transmits a call announcement via the TDM channel. The MET acknowledges this announcement via the TDMA channel. This exchange allows the group controller to verify that the MET is available before assigning bandwidth to the call. Frequency assignments are then made and the scrambling vector is transmitted by the MET once the MET tunes to the assigned frequency.

Upon successful reception of the scrambling vector, the FES checks the validity of the MET's identity. If the check fails, the FES initiates a call release procedure. If not, the FES transmits the ring command to the MET. Upon reception of the ring command by the MET from the FES, the MET generates a ringing signal to the MET user and transmits a ring command acknowledgement. The ring command acknowledgement is repeated by the MET until the MET is taken off-hook by the MET user or until the call is cleared. Upon receipt of the acknowledgement from the MET and once the call setup is complete, the MET begins transmitting voice frames to the FES and also transmits a voice activation disable signal as described in connection with MET originated call setup procedure. Once the MET is taken offhook the MET switches to the voice frame mode. Upon detection of the MET switching to the voice frame mode, the FES stops transmitting null signal units, switches to the voice mode, transmits a voice activation enable signal and commences voice communication between the MET and PSTN.

MET to MET calls are set up using a double hop connection through an FES. These calls are set up by the group controller and the FES as a MET to PSTN call setup concatenated with a PSTN to MET call setup. As a result, the METs require no additional call processing for MET to MET calls. That is, the procedures at the MET for receiving a MET-MET call are the same as procedures for reception of PSTN-MET calls, and the procedures at the MET for originating a MET-MET call are the same as procedures for origination of MET-PSTN calls.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553-1989"Cellular System Mobile Station - Land Station Compatibility Standard"; EIA/TIA-557; EIA/IS-54B.

MET ROAMING

Figure 20:
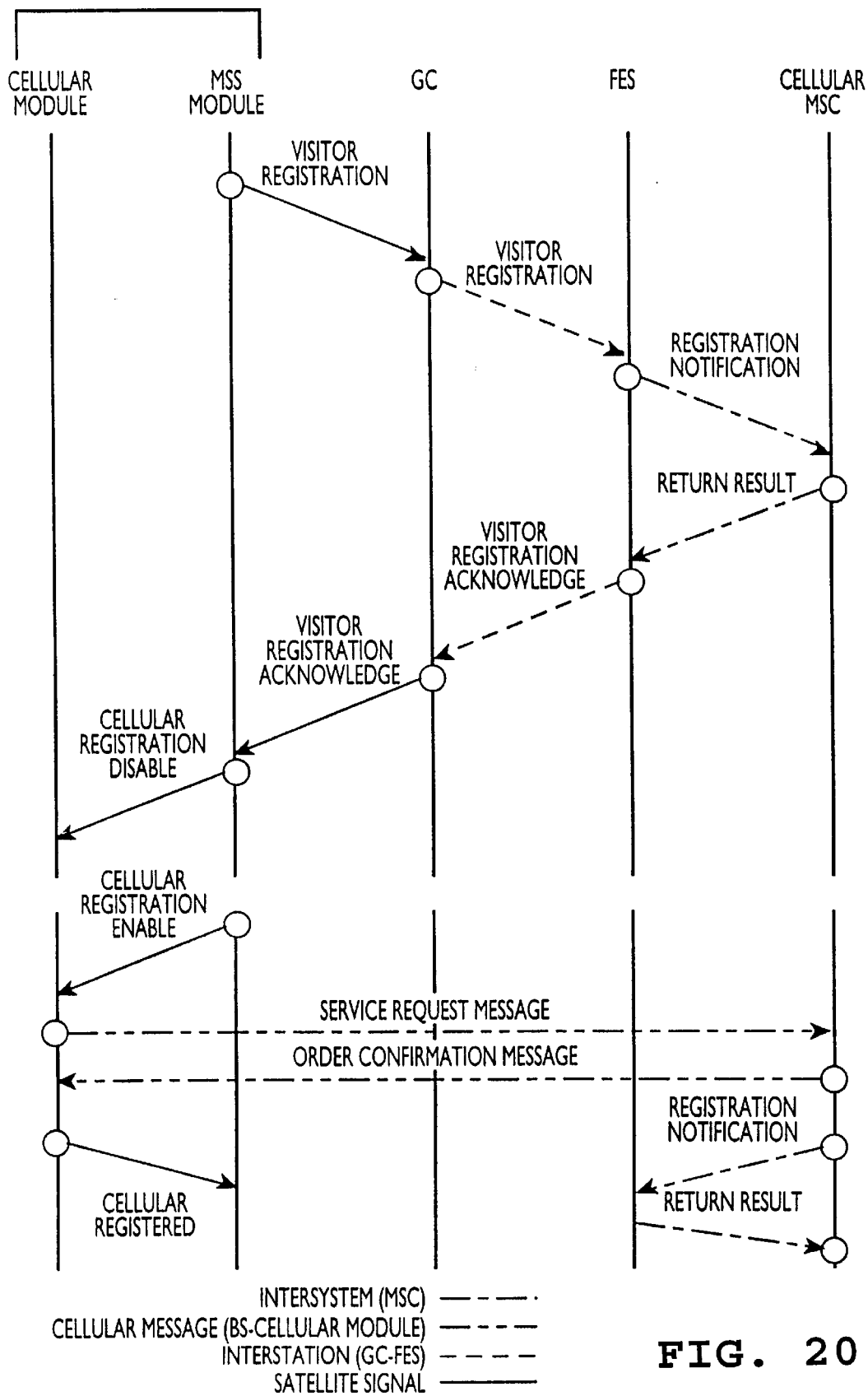
FIG. 20 is a diagram of a visitor registration sequence of the MET.

The Mobile Telephone Cellular Roaming Service (MTCR) supplements cellular service, providing access where there is no cellular coverage. The "home" Mobile Switching Center (MSC) of the multimode MET, as defined in EIA/IS41B, is either the terrestrial cellular mobile carrier (CMC) system or the satellite network system. The MET registers as a "visitor" in either the satellite MSC or a terrestrial cellular system MSC per the requirements of EIA/IS-41B. The visitor registration sequence is provided in FIG. 20. The gateway provides automatic roaming for METs outside the range of terrestrial cellular coverage in accordance with EIA/IS-41B. METs are identified with the same 10-digit telephone number in the terrestrial cellular and satellite networks.

In the idle state, a mobile unit monitors the cellular and satellite signaling channels. The normal cellular procedure is used for terrestrial calls as defined in EIA/TIA 557. Each MET uses the cellular terminal ESN (electronic serial number) and the telephone number for the purposes of identification and registration on the CMC. Upon power up, the MET registers per the requirements of FIG. 21. If unsuccessful, it registers in accordance with the secondary selection, if applicable. If the mobile is in the coverage area of selected preferential service, the MET will not attempt to register as a roamer in another system until the MET detects the absence of preferential coverage. At that time, the MET attempts to register on the secondary coverage system as a roamer.

If the MET is registered in a secondary coverage system as a roamer, and detects the availability of preferential coverage, it attempts to register (reregister) with the preferential system. However, once a call is established on the satellite system, it remains on the satellite system until completion. Reregistration only occurs after a suitable time delay at the MET to avoid constantly switching between networks. For all reregistrations, a suitable time delay is defined as follows. The MET, upon the loss of a primary service (satellite or cellular) waits, for example, a nominal 6 seconds before attempting to register in the alternate service (cellular or satellite). If the primary service is recovered prior to the expiration of the 6 second delay, the mobile will not attempt reregistration. When registered on the alternate service, the MET will wait a nominal 6 seconds, and will then continuously monitor the availability of the primary service. When the primary service becomes satisfactorily available, the MET will attempt to return the registration to the primary service.

If the primary service is subsequently lost again, the MET will wait a nominal 15 seconds before attempting to register in the alternate service. If the primary service is recovered prior to the expiration of the 15 seconds delay, the mobile will not attempt reregistration. When registered on the alternate service, the MET will wait a nominal 15 seconds, and will continuously monitor the availability of the primary service. When the primary service becomes satisfactorily available, the MET will attempt to return the registration to the primary service. If the primary service is subsequently lost again (a third or more times), the MET will wait a nominal 30 seconds before attempting to register in the alternate service. If the primary service is recovered prior to the expiration of the 30 second delay, the mobile will not attempt reregistration When registered on the alternate service, the MET will wait a nominal 30 seconds and will then continuously monitor the availability of the primary service. When the primary service becomes satisfactorily available, the MET will attempt to return the registration to the primary service.

Once the MET has invoked any reregistration, a 5 minute timer will be started. The timer will be reset to 5 minutes for each reregistration. If the 5 minute timer expires, the reregistration delay will be set to a nominal 6 seconds and the cycle will start over again. If both services are lost, the MET will continuously monitor both services, and will attempt to register (reregister) on whichever service becomes satisfactorily available.

MET DATA CALL

Figure 22:
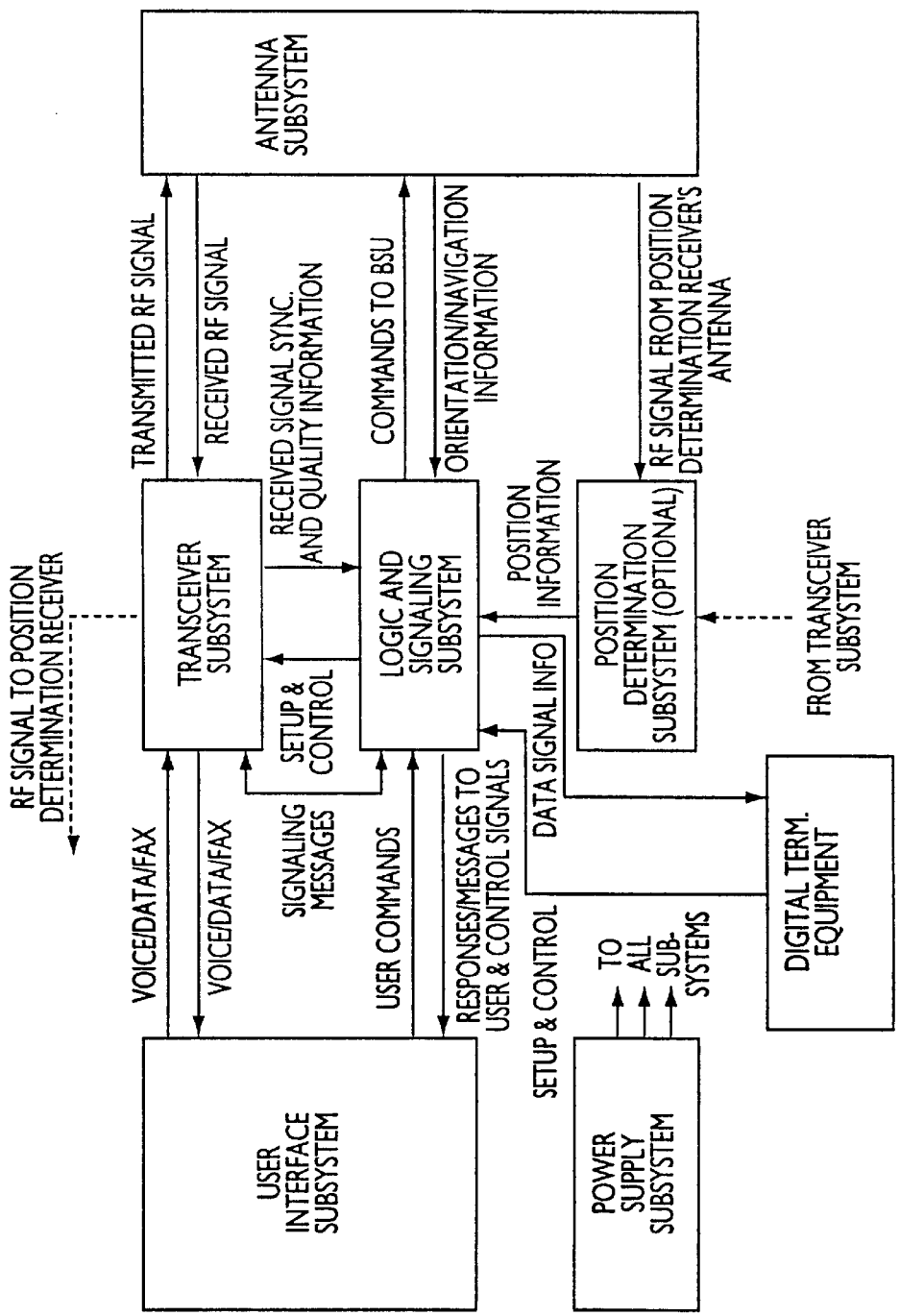
FIG. 22 is a basic block diagram of the functions of the mobile earth terminal including the digital equipment terminal functions.

FIG. 22 is a basic block diagram of the functions of the mobile earth terminal including the digital terminal equipment functions. The calling procedures for MET initiated data calls permit standard data terminal equipments (DTEs) connected to METs to place 2400 bps and 4800 bps data calls to appropriately equipped subscribers of the PSTN or members of private networks, similar to a data call by a standard modem. As discussed below, however, additional functions are required to effectuate the data call in the MET environment. The 2400 bps mode has a fall back rate of 1200 bps. The frame and data field formats for 1200 bps is identical to that for 2400 bps.

Figure 23:
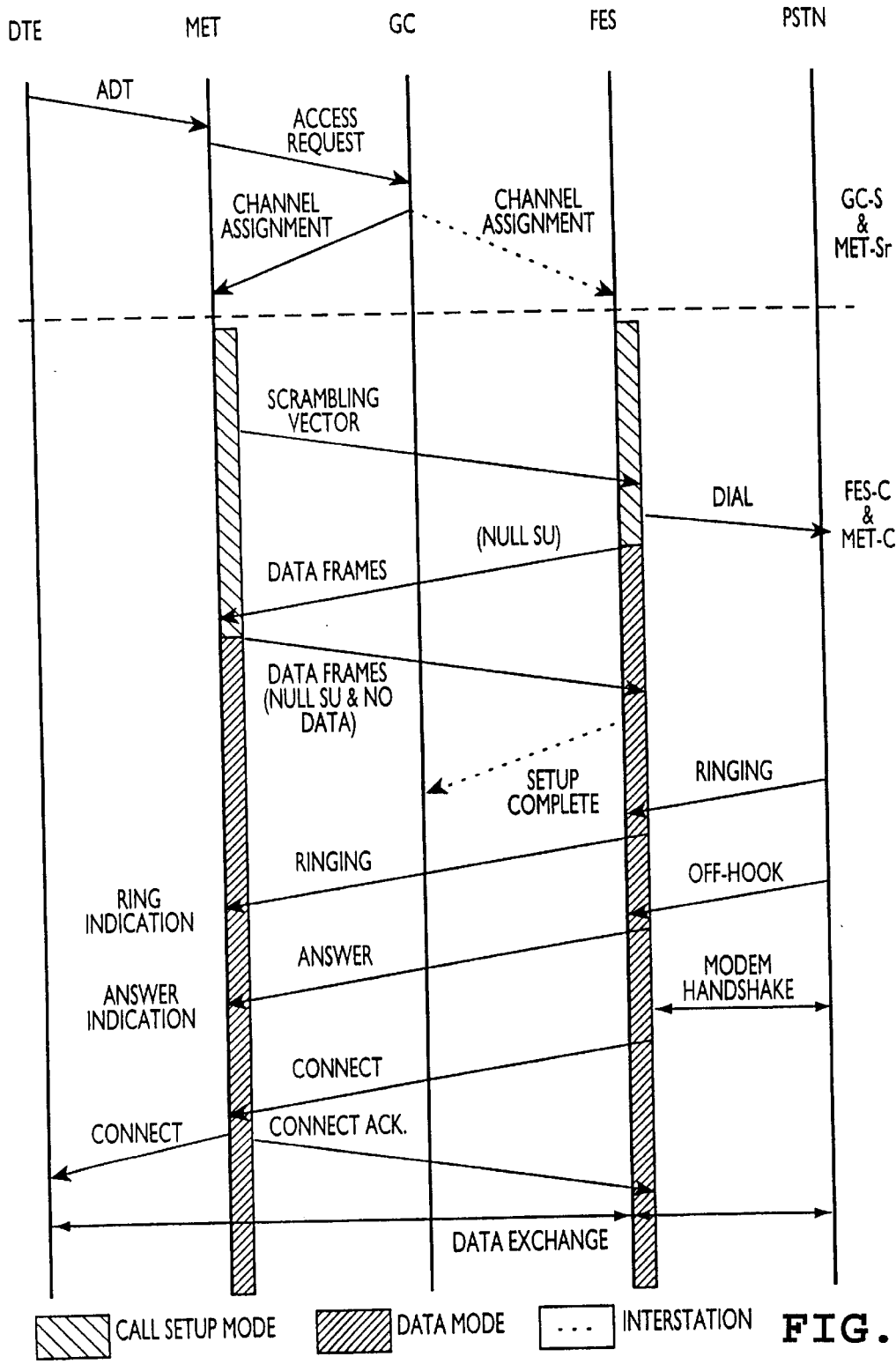
FIG. 23 is a diagram of a data call setup sequence between the MET and a PSTN.
Figure 24:
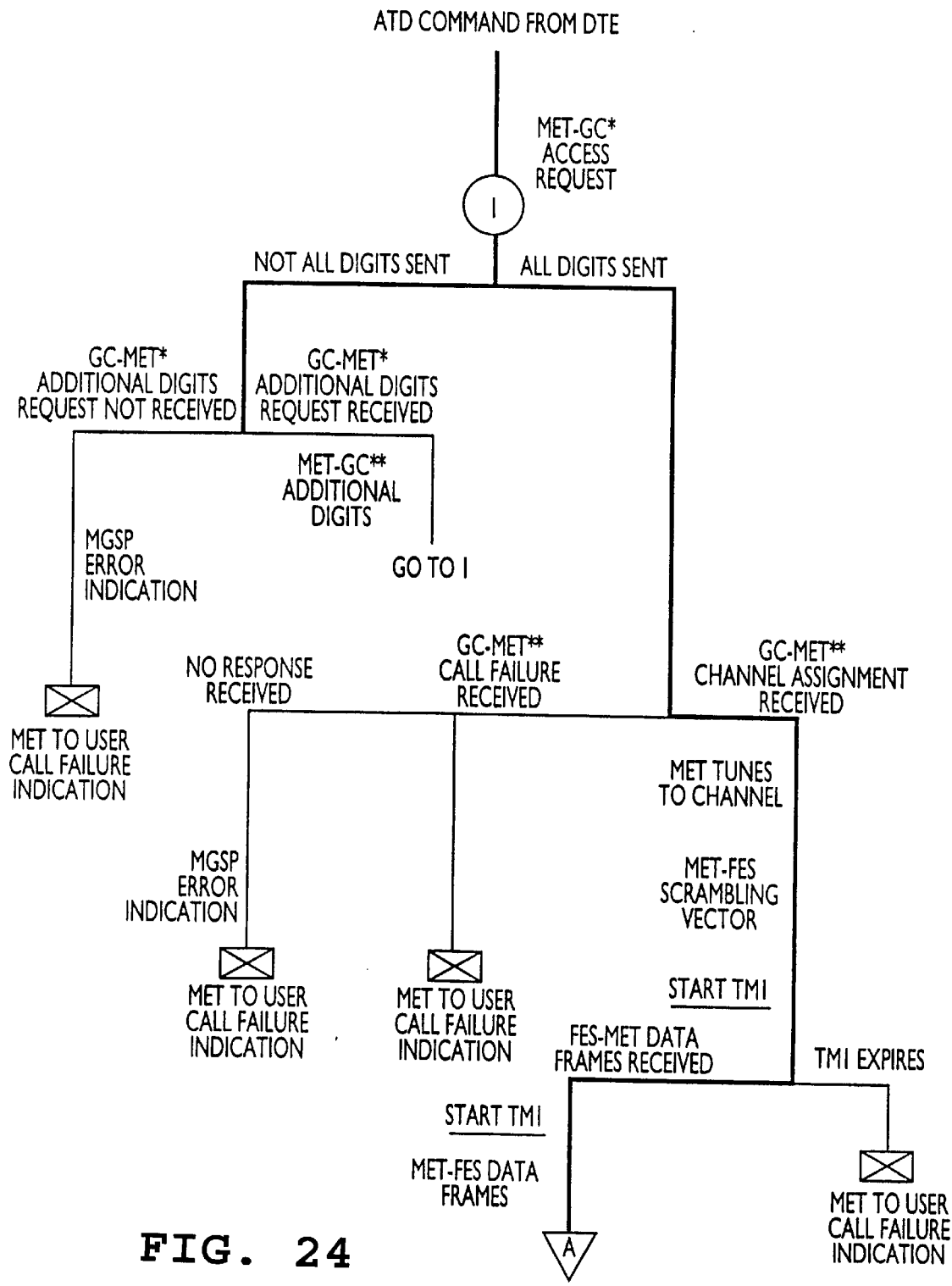
FIGS. 24–25 are event tree diagrams of a call setup sequence between the MET and a PSTN.
Figure 25:
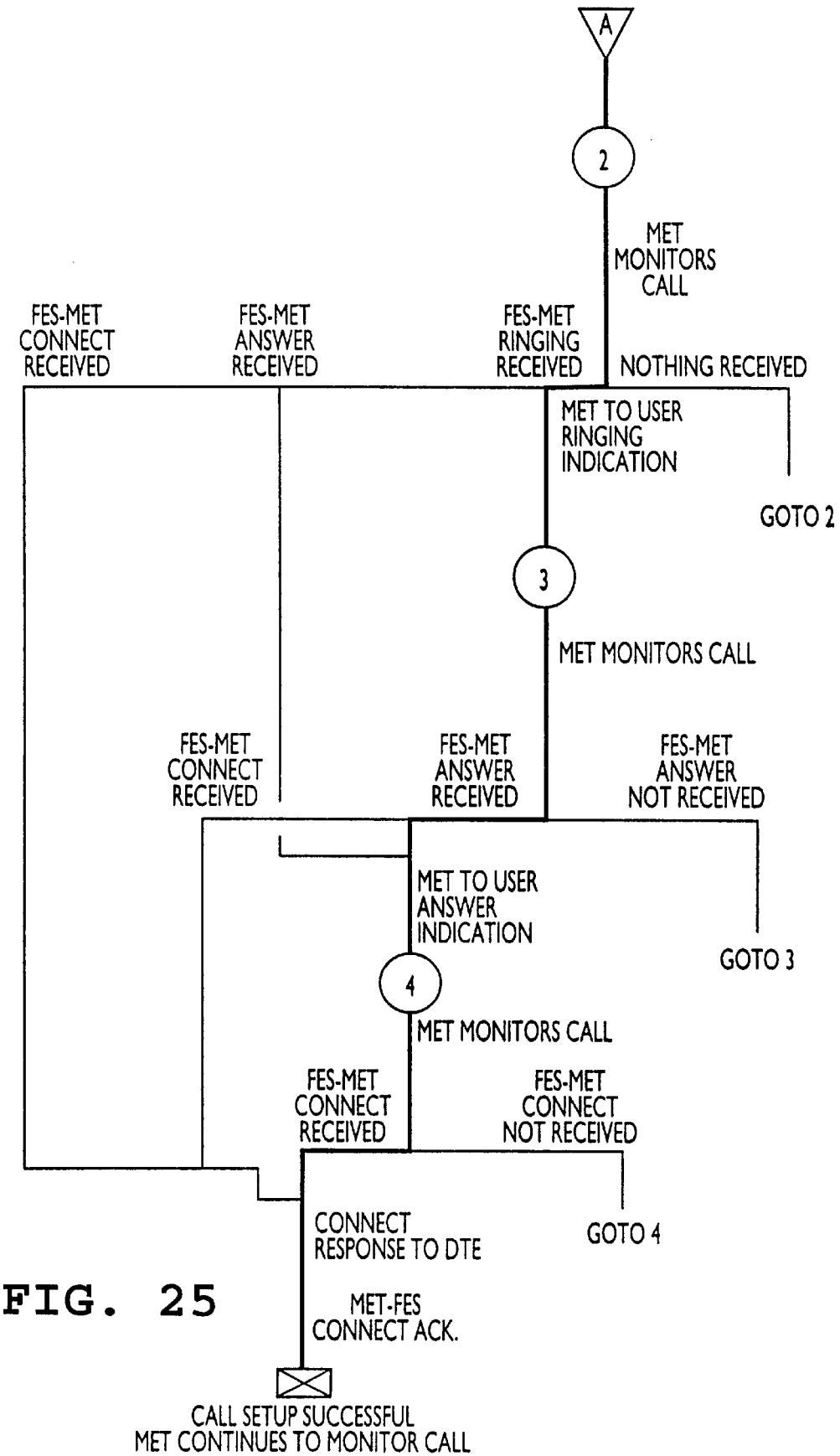

The AT command set is a set of commands commonly used for exchange of control information between DTEs and dial up modems. DTEs connected to the MET use a subset of the AT command set to send commands to the MET and receive responses from the MET. The message sequence shown in FIG. 23 used to establish MET originated data calls. The protocol employed is specified in the event tree given in FIGS. 24–25. A data call is initiated by the transmission of an ATD command from the DTE to the MET. The ATD command contains the telephone number of the destination modem/DTE. The ATD command also contains the desired transmissions speed and the character format to be used.

The message type field of the access request SU indicates that the call is a data call. Upon reception of the MET channel assignment SU, the MET transmits a scrambling vector SU to the FES via the MET-C channel. This message is continuously repeated until data frames are received from the FES. If no response is received after 5 seconds the MET ceases transmission and signals call failure to the user. The scrambling vector SU contains the initial scrambling vector to be used by the FES on the FES-C channel, the access security check field generated by the MET, and the desired character format and line speed for the connection.

Upon successful reception of the scrambling vector SUs, the FES will compare the access security check fields received from the GC and the MET and initiate call release if the fields are not identical. If the access security check fields are identical, the FES will seize a circuit into the PSTN and initiate establishment of the terrestrial portion of the connection. The FES will also switch to data mode and begin transmitting data frames go the MET. Upon reception of the data frames from the FES the MET switches from the call setup frame mode to the data frame mode and continuously transmits data frames to the FES with NULL SUs in the in-band signaling frames until a "connect" SU is received from the FES. For 1200/2400 bps data calls, the MET and FES transmit null SUs in the SU field.

Upon receiving data frames from the MET, the FES will begin transmitting ringing SUs to the MET in the in-band signaling field of the data frames. Upon detection of the PSTN going off-hook, the FES will stop sending ringing SUs and will begin transmitting answer SUs to the MET in the in-band signaling field of the data frames. Upon completion of the handshake and bit rate selection procedures between the FES terrestrial modem and the PSTN user modem, the FES will stop transmitting answer SUs and will begin transmitting "Connect" SUs to the MET. Upon receiving a "Connect" SU from the FES, the MET continuously transmits "Connect Acknowledgment" SUs. Upon receiving a "Connect Acknowledgment" SU from the MET, the FES will cease transmitting connect SUs to the MET.

Figure 26:
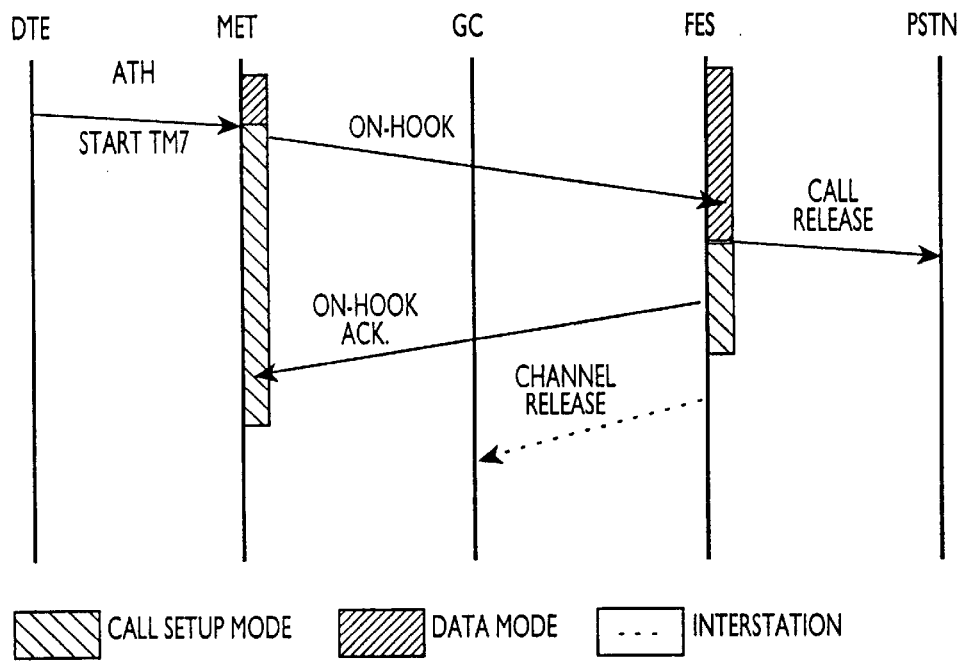
FIG. 26 is a diagram of a call release sequence initiated by the MET.
Figure 27:
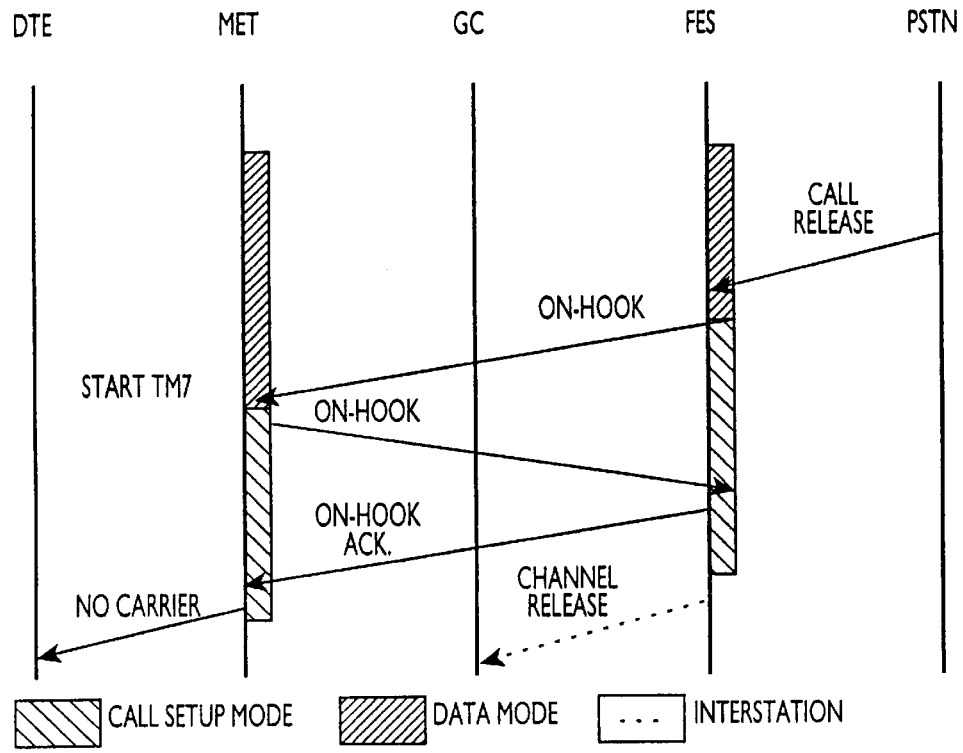
FIG. 27 is a diagram of a call release sequence initiated by the PSTN.

For data calls the DTE must be involved in the call release procedure. In all other respects the call release procedures for both MET and PSTN initiated data call release is the same as those specified for MET initiated calls. MET originated call release occurs when the DTE issues an ATH command to the MET. When PSTN initiated call release occurs the MET issues a NO CARRIER indication to the DTE. The sequences for MET and PSTN initiated data call release are shown in FIGS. 26–27. The MET continuously transmits "On Hook" SUs until it receives an "On-Hook Acknowledgment" SU or until timers TM5 or TM7 expire.

Figure 28:
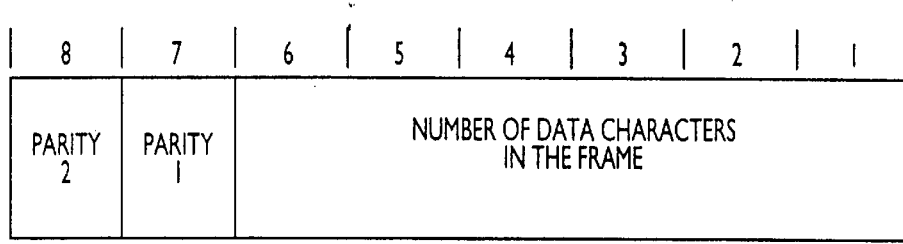
FIG. 28 is a diagram of a data field format.

The data field portion of the data call is used to transport asynchronous data characters as shown in FIG. 28. Each data character byte shall consist of either a 7-bit data character representation with a parity bit or an 8-bit character representation. All data characters are transmitted least significant bit first. If a 7-bit data character representation with a parity bits used, the least significant bit shall contain the parity bit. If a 7-bit data character representation without a variety bits used, the least significant bit contains a 0 bit. Valid data characters are transported in the first L data character bytes of the frame, where L is the value of the length parameter contained in the length indicator bytes. All other data character bytes preferably contain a 10101010 pattern.

Figure 29:
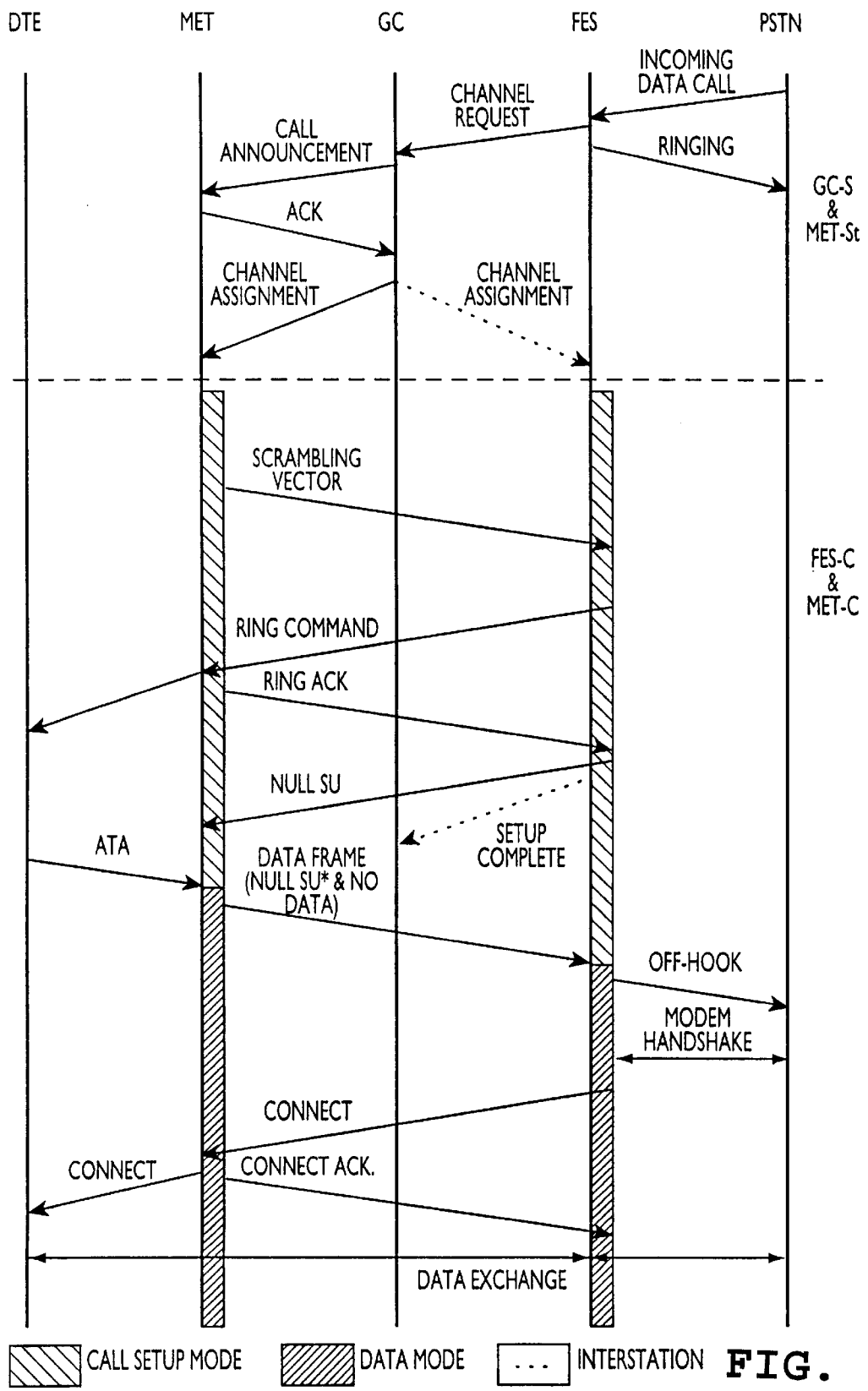
FIG. 29 is a diagram of a call setup sequence between the PSTN and MET.
Figure 30:
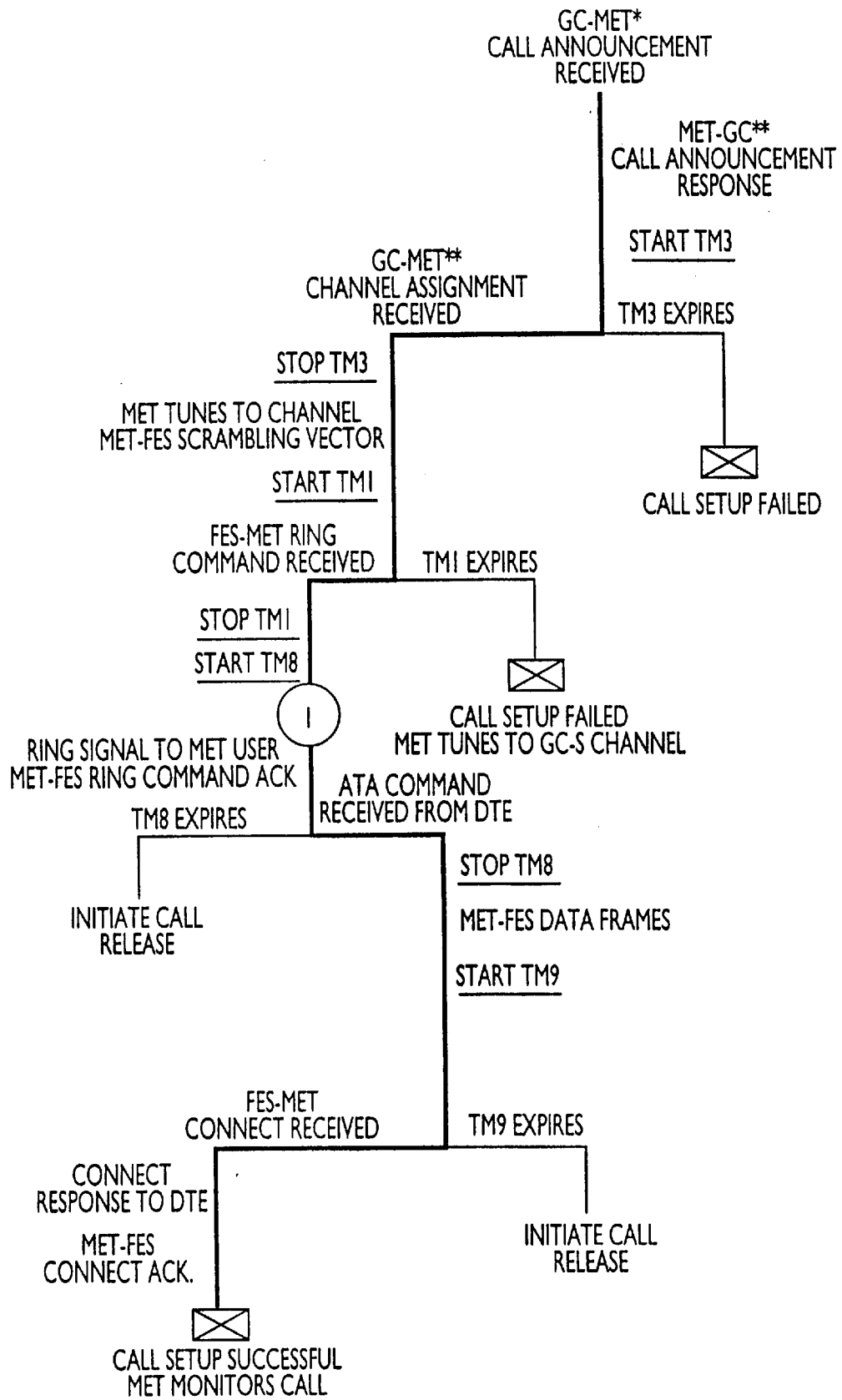
FIG. 30 is an event tree diagram of a call setup sequence between the PSTN and MET.

The format of the length indicator bytes shall be as shown in FIG. 29. The length indicator bytes each contain a 6 bit length parameter that indicates the number of valid data character in the total frame. In addition the length indicator byte contains 2 parity bits used for error detection. The order of transmission of the bits in the length indicator byte is also as indicated in FIG. 30.

For PSTN-originated data calls, channel assignment is as specified for PSTN originated voice calls. The GC will determine that the call is a data call and will indicate this in the call type field of the call announcement and MET channel assignment.

Upon reception of the MET channel assignment SU the MET transmits a scrambling vector SU to the FES via the MET-C channel. This message is continuously repeated until a response is received from the FES. If no response is received after 5 seconds the MET ceases transmission and signal call failure to the user. Upon successful reception of the scrambling vector SUs, the FES will compare the access security check fields received from the GC and the MET and will initiate call release if the fields are not identical. If the access security check fields are identical, the FES will begin transmitting the ring command SU to the MET. Upon reception of the ring command SU from the FES, the MET signals the MET user either by generating an audible ringing sound or by sending a RING response to the DTE, sets Tm8 to 12 seconds and also transmits the ring command acknowledgment SU until the ATA command is issued by the MET DTE, or upon expiration of timer Tm8. Upon receiving the ring command acknowledgment from the MET, the FES will transmit a call setup complete SU to the GC to notify it that the channel has successfully been established, and will begin transmitting null signal units to the MET. If timer TM8 expires, the MET initiates a call release.

When the MET DTE issues the ATA command the MET switches to the data frame mode, stop Tm8, and set timer Tm9 to 20 seconds. Upon detection of the MET switching to data frame mode, the FES will switch to data frame mode and will signal off-hook to the PSTN. The FES will then complete the modem bit rate selection and handshake procedures with the PSTN user modem based on CCITT Recommendation V.22bis. Upon completion of the modem bit rate selection and handshake procedures, the FES will begin continuously transmitting a connect SU to the MET. The FES continues sending the connect SU until a connect acknowledge SU is received from the MET. Upon receiving the connect acknowledge SU, the FES ceases transmitting connect SUs.

Upon receiving the connect SU from the FES, the MET stops timer Tm9 and sends the connect acknowledge SU to the FES. The MET ceases transmitting connect acknowledgement SUs within 2 seconds of the time at which receipt of connect SUs ceases. If timer Tm9 expires, the MET initiates a call release.

MET FACSIMILE CALL

Figure 31:
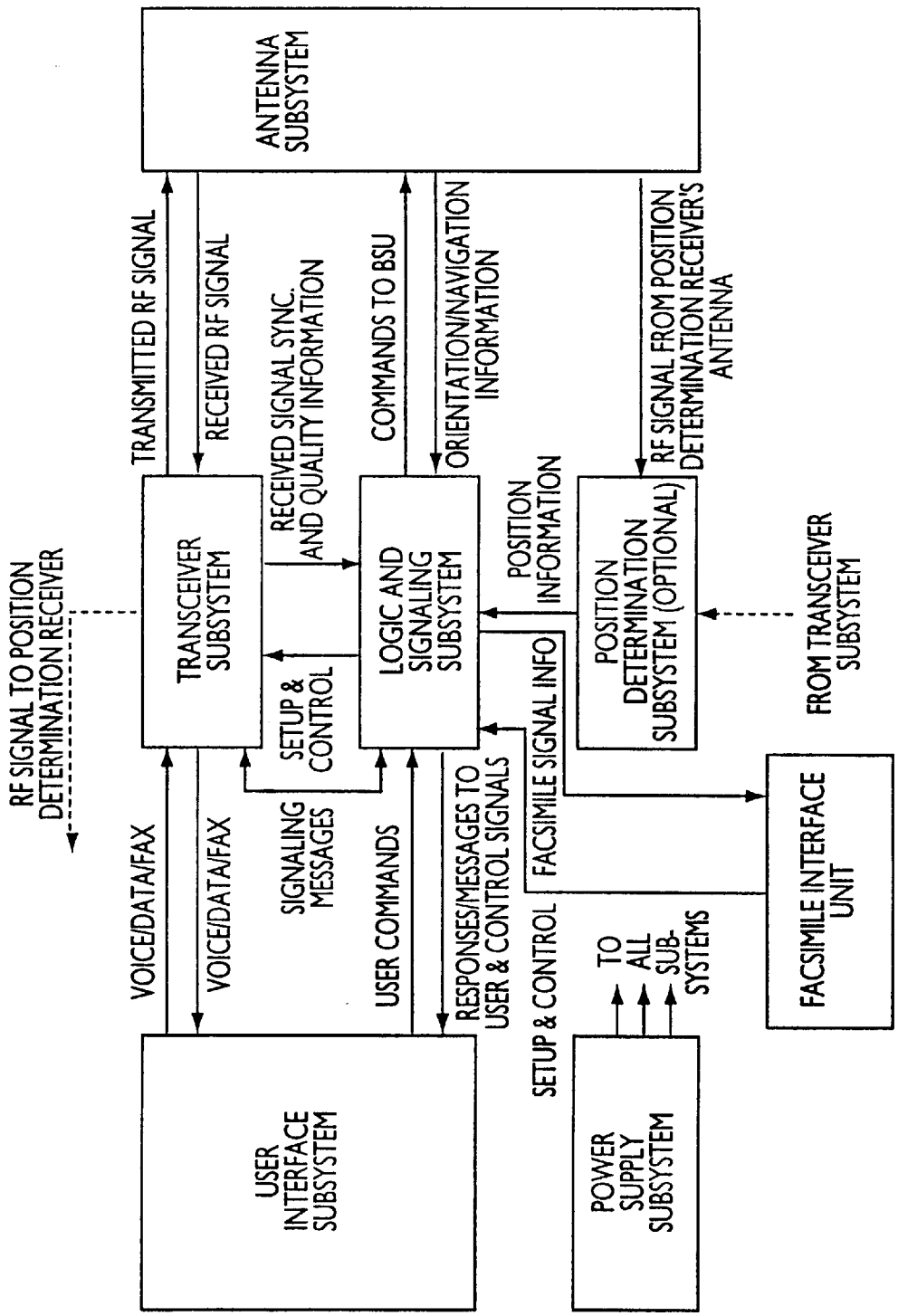
FIG. 31 is a basic block diagram of the functions of the mobile earth terminal including the facsimile interface unit functions.

FIG. 31 is a basic block diagram of the functions of the mobile earth terminal including the facsimile interface unit functions. Facsimile interface units (FIU) are installed in the Feeder Link Earth Stations (FES) and in the MET which communicate with each other by a digital communications channel established in the facsimile data mode. These units enable a terrestrial user's CCITT Group 3 facsimile terminal equipment (FTE) to be interconnected with a MET user's CCITT Group 3 FTE (or between two MET users) via the digital satellite system.

The FIUs perform two basic functions. First, they demodulate the facsimile voiceband signals in the FTE-to-satellite direction (and remodulate the baseband digital signals in the satellite-to-FTE direction). Second, they perform protocol conversions so that the facsimile protocols become compatible with the transport channel constrains of the basic service configuration. To perform these functions, the FIUs consist of several standard elements including Telephone Tone Generators and Detectors; a CCITT V.21Modulator and Demodulator; and Control Logic for baseband message formatting, facsimile process control, facsimile protocol conversation, call establishment, call control, and call clearing.

The physical interface is preferably characterized using an RJ-11 connector, a 600 ohms signal impedance, a Line Supervision (Detection of Off-Hook and On-Hook), a Minus 24 volt, 30 ma nominal DC source for loop (supervisory) current. The interface preferably provides ringing voltage of 86 Vrms and support up to 5ring loads, or provides a source over the linear range from 64 Vrms at 50 ms down to a minimum of 40 Vrms at 100 ma. The required generated signaling tones are:

| | |
|---|---|
| Congestion | [480 + 620 Hz (0.25 sec's on and 0.25 sec's off)] |
| Busy | [480 + 620 Hz (0.5 sec's on and 0.5 sec's off)] |
| Ring-back | [440 + 480 Hz (1 sec on and 1 sec off)] |
| Dial | [Reference CCITT E.180:350 + 440 Hz (continuous) - 10 Dbm0 nominally] |

Figure 32:
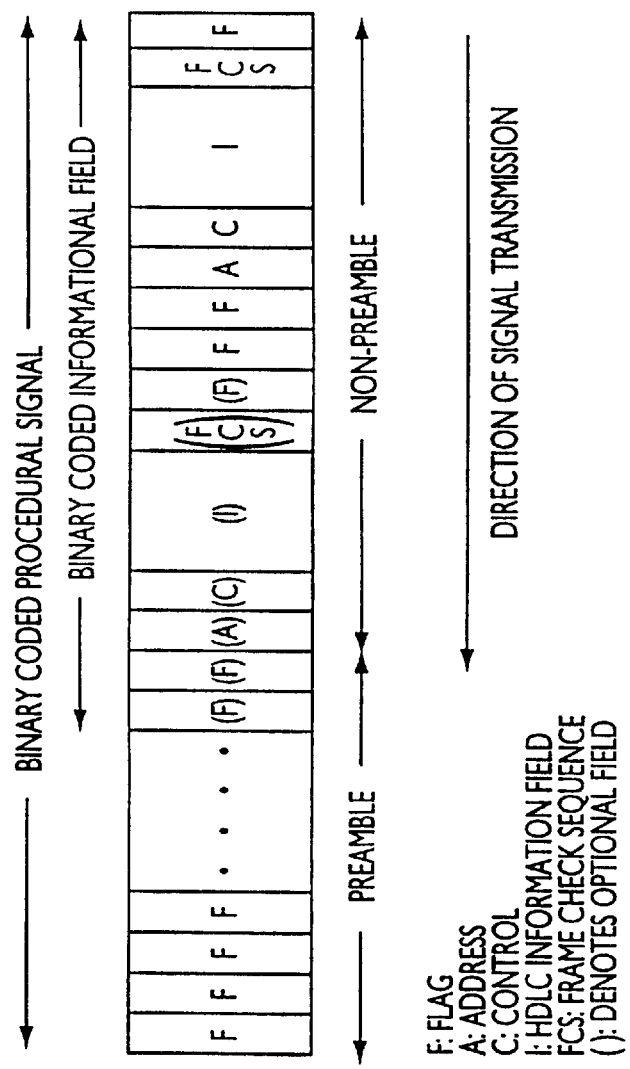
FIG. 32 is a diagram of a binary coded procedural signal.

The FIUs transmit and receive digital signals to an from the satellite 2.4 kbit/ss Data channel in blocks of 288 bits as shown in FIG. 32, which illustrates the sub-field structure of the data channel. In addition, the FIU internally partitions each of the 288-bit data-field into 36, 8-bit data cells. The Digital Facsimile Protocol provides line-state indication by means of the following messages, carried as "line control packets", which are transmitted at full rate (i.e., 2.4 kbit/s) over the data channel. The coding is described below:

| Code | Line state |
|---|---|
| 0001 | Idle |
| 0010 | CED Connection |
| 0100 | Spare |
| 0111 | Binary Coded Signal Connection |
| 1000 | FIU Capabilities Control Packet |
| 1011 | Synchronizing Signal Connection |
| 1101 | Preamble Connection |
| 1110 | Message Connection |

The coding is associated with the voiceband signal states as shown below:

| Indication | Line State |
|---|---|
| Idle | No signal on the telephone circuit |
| CED Connection | 2100 Hz Called Station Identification (CED) signal on the telephone circuit |
| Binary Coded Sig. Connection | 300 bit/s (non-permeable) binary coded procedural signal on the telephone circuit |
| Synch. Signal Connection | Modem synchronizing (or training signal on telephone circuit) |
| Preamble Connection | 300 bit/s binary coded preamble signal on the telephone circuit |
| Message Connection | Facsimile message on the telephone circuit |

The special line state "FIU Capabilities Control Packet" is not associated with an analog line state but with in-band signaling between FIUs.

Line control packets are generated whenever a line state transition occurs, and generally always precede the transmission of information (associated with the new line state) over the digital channel. The indication in the line control packet applies to all associated 8-bit data cells of the satellite channel that immediately follow it until a new line control packet is generated. Hence, these line control packets are used a headers of new information. All non-preamble signals of the 300 bit/s binary coded procedural signalling, which are specified in CCITT Recommendation T.30, are transferred to the re-modulating (distant) FIU in the form of a demodulated baseband digital data stream. A re-modulating (or modulating) FIU is defined as the FIU which is receiving data from the satellite channel for modulation and transmission to the customer FTE. A demodulating FIU is defined as the FIU which is receiving data from the customer FTE for demodulation and transmission to the satellite channel. During a call, an FIU will perform both modulating and demodulating functions, as the signal direction between the end-customer FTEs will change several times.

The facsimile message signal (including the TCF signal) is also transferred to the re-modulating FIU in the form of a demodulated digital data stream. Reception of the modem synchronizing signal on the telephone circuit is indicated by the demodulating FIU to the re-modulating FTU by transmitting the "Synchronizing Signal Connection" line control packet. The FIU at the modulating end generates a modem synchronizing signal according to this indication. Detection of the CED signal on the telephone circuit is indicated by the demodulating FIU to the re-modulating FIU by transmitting the "CED Connection" line control packet. (The actual CED signal cannot be transferred to the re-modulating FIU since it is not digital by nature.)

The tonal signalling procedures defined in CCITT Recommendation T.30 are not generally accommodated by the Digital Facsimile Protocol. The Group 3 procedures recommended by CCITT are generally supported by the FIU. Therefore, the FIU is not required to detect the use of tonal signalling procedures. Eventually a Group 1 or Group 2 FTE should clear the call on the analog circuit when it does not receive proper responses from the FIU.

Line control packets are generated whenever a line state transition occurs, and generally always precede the transmission of information (associated with the new line state) over the digital channel. Because these packets are transmitted in-band over the 2.4 kbit/s data channel, they are generated by the demodulating FIU in the FTE-to-satellite direction and removed by the remodulating FIU in the satellite-to-FTE direction. The first bit of the line control packet must be coincident with a data cell boundary. When generating line control packets these are constructed by utilization of 18 data calls as follows:

The first 9 data calls (72 bits) are comprised of nine repetitions of the "11111111" binary octet and are used as a line control preamble to indicated that the following 9 data cells contain line state transition information. The next 8 data cells (64 bits) are comprised of 16 repetitions of the appropriate 4-bit code for the new line state. The final data cell (8 bits) comprises the unique binary word "11000011" which is used to precisely align the user data associated with the new line state. The new line state indicated by a received line control packet does not become effective until the last bit of the line control packet has been received on the satellite channel. Consequently, since line control packets are 18 data cells long, a line control packet inserted into the satellite data stream effectively adds 60 ms to the length of the previous line state.

This is true for receipt of all line control packets except an "Idle" packet when it has been preceded by either a "Binary Coded Signal Connection" packet or a "Message Connection" packet. In either of those two cases, the "Idle" line control packet must be immediately processed (removed from the satellite data stream) when the first, rather than the last bit of the packet is received, thus avoiding a situation where 60 ms of invalid data would be modulated at either the V.21 or V.27ter mode. To accomplish this "early line control packet detection," the FIU must incorporate a look-ahead buffer between the satellite channel and the FIU software in which it can look ahead 60 ms into the received satellite data stream and identify a valid "Idle" line control packet while in the "Binary Coded Signal Connection" or "Message Connection" line state.

Since, in the special situations, the "Idle" line control packet is removed all at once (instead of removing it over the course of 18 data cell times), the look-ahead buffer will shrink in size as "Idle" line control packets are detected and removed. When the FIU switches from its "modulating" role to its "demodulating" role, the look-ahead buffer may be empty due to the removal of "Idle" line control packets. The buffer must already be filled with satellite data by the time an FIU switches from the "demodulating" role to the "modulating" role. This filling can take place when the FIU is likely to be receiving idle fill over the satellite when it is in the "demodulating" role.

Furthermore, the look-ahead buffer must accommodate two line control packets since, at most, there will be two transitions from "Binary Coded Signal Connection" or "Message Connection" line state to "Idle" line state during a single line turnaround of the half-duplex T.30 facsimile protocol. That is, the buffer must be about 288 bits in size. This will add, at most, 120 ms to the overall delay through the FIU.

The facsimile interface unit (FIU) interworks with a user's CCITT Group 3 facsimile terminal equipment (FTE) through a telephone circuits in accordance with CCITT Recommendation T.30, and with the FIU at the distant end through the satellite channel in accordance with the Digital Facsimile Protocol. To accomplish this, the FIU shall comprise the following standard circuit elements:

CCITT Recommend. V.27 ter [R-27] voice-band data modem;

CCITT Recommendation V.21 [R-28] voice-band data modem;

2100 Hz tone generator and detractor;

1100 Hz interrupted tone generator and detector;

processor/controller; and elastic buffer, multiplexer/demultiplexer, and interface with the satellite channel unit.

After the FIUs have been switched-in by the FES or the MET in a remote-originated mode (FTE at the opposite FIU has originated the call), the FIU generates the CNG signal (a 1100 Hz interrupted tone) and transmits it to the called user. The CNG signal is terminated following the detection of either the CED signal or a 300 bit/s binary coded procedural signal on the incoming telephone circuit: in accordance with the procedures defined in CCITT Recommendation V.25 [R-29]. The characteristics of the CNG signal comply with the relevant requirements specified in CCITT Recommendation T.30.

The called FTE may transmit the CED signal following the connection of the telephone circuit at the called end. The called FIU shall detect the onset and termination of the CED signal on the telephone circuit and shall inform the calling FIU of this event by inserting the "CED Connection" line control packet in the satellite channel. The CED signal detector response threshold and times shall be in accordance to CCITT Recommendations T.4, T.30, and V.25 [R.29]. The insertion of the "CED Connection" line control packet in the data channel occurs in the first data-cell to be transmitted after the CED detector output has changed from OFF to ON.

The "CED Connection" line state is changed to "Idle" by transmissions of the "Idle" line control packet in the data channel as soon as the ON-to-OFF transition of the CED signal is detected and a data-cell boundary becomes available, but subject to the restriction that a "Idle" signal gap of 75±20 ms must be inserted (i.e. 22±6 data cells) between the CED signal termination and the following signal (DIS) which is encoded according to the V.21 modulation scheme. That is, there must be at least one data cell between the "Idle" line control packet and the subsequent "Preamble Connection" line control packet (since transmission of the "Preamble Connection" packet contributes 60 ms to the length of the "Idle" line state). It is the responsibility of the FIU to be aware of the (possibly different) on-to-off and off-to-on signal detect times for CED and V.21 Preamble and adjust the generated satellite line control packets accordingly so as to insure a 75±20 ms idle time between different signals.

The called FTE transmits the CED signal following the connection of the telephone circuit at the called end. The called FIU detects the onset and termination of the CED signal on the telephone circuit and informs the calling FIU of this event by inserting the "CED Connection" line control packet in the satellite channel. The CED signal detector response threshold and times are in accordance to CCITT Recommendations T.4, T.30, and V.25 [R-29]. The insertion of the "CED Connection" line control packet in the data channel occurs in the first data-cell to be transmitted after the CED detector output: has changed from OFF to ON.

The "CED Connection" line state shall be changed to "Idle" by transmission of the "Idle" line control packet in the data channel as soon as the ON-to-OFF transition of the CED signal is detected and a data-cell boundary becomes available, but subject to the restriction that a "Idle" signal gap of 75±20 ms must be inserted (i.e. 22 ±6 data cells) between the CED signal termination and the following signal (DIS) which is encoded according to the V.21 modulation scheme. That is, there must be at least one data cell between the "Idle" line control packet and the subsequent "Preamble Connection" line control packet (since transmission of the "Preamble Connection" packet contributes 60 ms to the length of the "Idle" line state). The FIU detects the (possibly different) on-to-off and off-to-on signal detect times for CED and V.21 Preamble and adjusts the generated satellite line control packets accordingly so as to insure a 75±20 ms idle time between different signals.

A CED signal is generated by the called FTE after the telephone circuit has been connected between the called FIU and the called FTE. The onset and termination of the CED signal on the telephone circuit are detected by the called (demodulating) FIU and signalled to the calling (re-modulating) FIU by means of line control packets. The calling FIU shall generate a CED signal (2100 Hz tone) and shall transmit it to the calling FTE when the line control packet indicates "CED Connection", The OFF-to-ON instruction to the tone generator shall occur only after the entire "CED Connection" line control packet has been received.

The ON-to-OFF instruction to the tone generator occurs when a new line control packet has been detected by the called FIU. Ideally, the "Idle" line control packet will be received following the "CED Connection" packet, but errors on the satellite channel may corrupt the "Idle" packet so that the "Preamble Connection" packet may be the next one detected. The characteristics of the generated 2100 Hz tone shall comply with the relevant requirements for the CED signal specified in CCITT Recommendations T.30, T.4, and V.25.

The FIU receives and demodulates the binary coded procedural signals which are defined in CCITT Recommendation T.30 and which appear on the incoming telephone circuit. The binary coded procedural signals (except the TCF signal) are modulated at 300 bit/s in accordance with the CCITT Recommendation V.21 modulation system and are preceded by the preamble (sequence of repeated flags) specified in CCITT Recommendation T.30. The TCF signal is modulated at 2.4 kbit/s in accordance with CCITT Recommendation V.27 ter and is preceded by the modem synchronizing signal. The data is transmitted over the satellite channel in the same order as received over the telephone circuit (i.e., the first bit received over the telephone circuit by the demodulating FIU is the first bit to be sent over the satellite channel to the re-modulating FIU).

Figure 33:
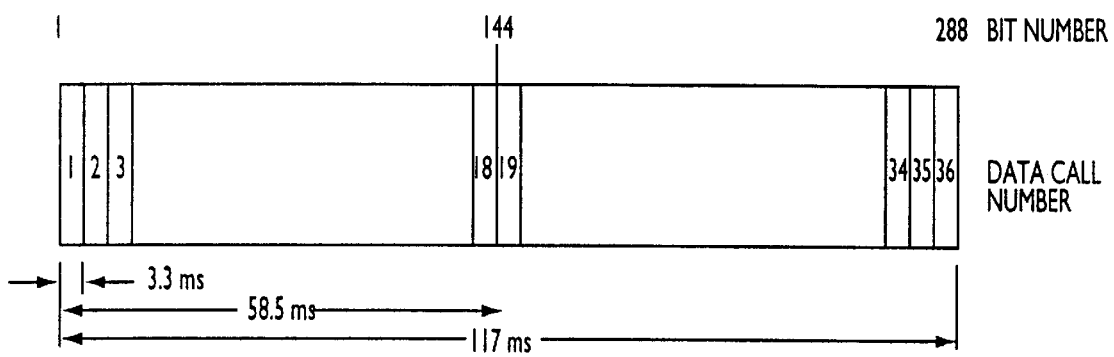
FIG. 33 is a diagram of a data field format at 2400 bit/s.

The non-preamble portion of the V.21 modulated 300bit/s binary coded procedural signal is defined as the portion of this signal which begins with the first non-Flag octet and ends with the last Flag received after the last HDLC frame. The preamble portion of the 300 bit/s binary coded procedural signal is defined as the portion of the V.21 modulated signal which begins with the first Flag and ends with the last Flag preceding the non-preamble portion (i.e. ends with the Flag preceding the first non-Flag octet of the binary coded information field). This definition is illustrated in FIG. 33.

The demodulated data stream of the non-preamble portion of the 300 bit/s binary coded procedural signal is transmitted to the re-modulating FIU regardless of the error state of the signal. The binary coded Address, Control, and HDLC information fields of the demodulated data (with the exception of the NEF, DIS, and DTC signals) are not generally manipulated by the demodulation process and the FCS field indicates an error condition, the regenerated FCS sequence must be such that it will result in an error condition being detected by the distant FTE, assuming subsequent error-free transmission. Transmission of the data shall be immediately preceded by the transmission of the "Binary Coded Signal Connection" line control packet.

When the demodulating FIU manipulates the DIS, DTC and DCS signals in the manner described in the preceding paragraphs, a new Frame Checking Sequence (FCS) must be computed. However, if the original (prior to manipulation) signal indicates an FCS error, the sequence computed must be such that it will result in an error condition being detected by the distant FTE assuming subsequent error-free transmission. The demodulated, non-preamble data stream of the 300 bit/s signal is transmitted to the re-modulating FIU over the satellite channel, preceded by the "Binary Coded Sequence Connection" line control packet. The line control packet is delayed by the same amount as that introduced in the preamble in paragraph 10 above and is further aligned to make the first bit of the line control packet coincident with the first bit of a data cell. When reception of the 300 bit/s signal ceases, an "Idle" line control packet shall be inserted in the satellite channel starting at the next available data cell. The response time for the Synchronizing/TCF signal detection is in accordance to CCITT Recommendations T.4, and V.27 ter.

The onset of the synchronizing portion of the synchronizing/TCF signal is signalled to the distant FIU by transmitting the "Synchronizing Signal Connection" line control packet. The transmission of the "Synchronizing Signal Connection" line control packet, signifying the transition from the "Idle" to the "Synchronizing Signal Connection" line state, occurs in the first data cell of the satellite data channel after a period of 75±20 ms of idle activity has been transmitted over the satellite channel following the end of the previous (DCS) signal which was originally encoded according to the V.21 modulation scheme. That is, there must be at least one data cell between the "Idle" line control packet and the subsequent "Synchronizing Signal Connection" line control packet (since transmission of the "Synchronizing Signal Connection" packet contributes 60 ms to the length of the "Idle" line state. The FIU detects the (possibly different) on-to-off and off-to-on signal detect times for V.27 ter and V.21 and adjusts the generated satellite line control packets accordingly so as to insure a 75±20 ms idle time between different signals.

When the line control packet indicate "Synchronizing Signal Connection", the data stream sent to the distant FIU includes a binary all "zero" sequence irrespective of the demodulated sequence. The "Synchronizing Signal Connection" line state continues until local V.27 ter modem training is complete and the first bit of TCF data is demodulated by the local V.27ter modem. The signal activity detector does not detect Segment 2 of the V.27ter training sequence ("No transmitted energy") as the end of the modem Turn-On sequence. Thus, the Synchronizing Signal Connection line state will apply for at least 225 ms (regardless of the signal activity detector output state).

The demodulated and unscrambled TCF signal (originally a series of binary "zeros") is transmitted to the re-modulating FIU over the satellite channel, preceded by transmitting the "Message Connection" line control packet. To compensate for the possibility that the demodulating V.27ter modem interprets the end of the modern Turn-On sequence as TCF data, the FIU insures that the first 6 data cells (48 bits) of the TCF data transmitted over the satellite consist of binary "zeros", no matter what was actually demodulated by the V.27ter modem. The "Message Connection" line control packet and subsequent TCF data is delayed by the same amount as that introduced to the "Synchronizing Signal Connection" line control packet defined in paragraph 17 above, and is further aligned to make the first bit of the line control packet coincident with the first bit of the data cell.

The end of the TCF signal is determined by the FIU, and the tail of the signal is discarded if the number of bits is insufficient to fill the data cell. An "Idle" line control packet shall then be transmitted to the distant FIU in the following data cell.

The re-modulating FIU receives the data stream for the 300 bit/s binary coded procedural signals or the TCF signals (preceded by the "Binary Coded Signal Connection" or "Message Connection" line control packet, respectively) which are transmitted over the satellite by the demodulating FIU. The re-modulating FIU generates the voice-band data signals for the non-preamble portions of the binary coded procedural signals based on the data stream and the relevant line control packet, and transmits them to the FTE on the outgoing telephone circuit. In generating the modulated signals, no manipulation of the data is performed by the re-modulating FIU. If a new Frame Checking Sequence (FCS) is regenerated, and the original signal indicates an FCS error, the sequence computed must be such that it will result in an error condition being detected by the FTE, assuming subsequent error-free transmission.

The modulation applied to the data which have been preceded by the "Binary Coded Signal Connection" line control packet are at 300 bit/s and in accordance with the CCITT Recommendation V.21 modulation system (as specified in CCITT Recommendation T.30). The entire data, after removal of the line control packet, are transmitted to the FTE. The transmission of the 300 bit/s modulated binary coded signal preamble commences immediately after reception of a valid "Preamble Connection" line control packet and continues for as long as no new line state transition in the form of a valid line control packet is received. The Demodulating FIU makes sure that there is at least a 75±20 ms gap between the "Preamble Connection" line state and the preceding line state. The re-modulating FIU must insure that the length of the "Idle" line state indicated on the satellite is correctly reproduced on the analog circuit. If, due to channel errors, the "Preamble Connection" line control packet was not preceded by an "Idle" packet, then the re-modulating FIU must insure that there is 75±20 ms of idle analog line state before the flag sequence begins.

The transmission of the non-preamble 300 bit/s modulated binary coded (non-preamble procedural signals is initiated following the recognition of a line state change from "Preamble Connection" to "Binary Coded Signal Connection" signalled by the reception of a valid "Binary Coded Signal Connection" line control packet from the satellite data channel. The transmission of the non-preamble portion of the 300 bit/s modulated binary coded procedural signals follow the termination of the preamble with no interruption of signal energy on the outgoing telephone circuit. Furthermore, in order to preserve the octet integrity of the preamble being transmitted the 300 bit/s modulated binary coded procedural signals may additionally be delayed by a period of up to 8 data cells.

The transmission of the non-preamble 300 bit/s modulated signals continues until a valid "Idle" line control packet is received from the satellite channel. The FIU "looks ahead" in the received satellite data stream to identify the "Idle" line control packet as soon as its first bit has been received. The "Idle" line control packet, once so identified, will be immediately removed from the satellite data stream and will not contribute an additional 60 ms of time to the existing "Binary Coded Signal Connection" analog line state. In generating the TCF signal, the modulation shall be in accordance with CCITT Recommendation V.27ter.

When the most recently received line control packet indicates "Synchronizing Signal Connection", a modem synchronizing signal (the long sequence with protection against talker echo as specified in CCITT Recommendation V.27 ter) shall be generated by the re-modulating FIU. Transmission of the modem synchronizing signal is initiated only after the line state change from "Idle" to "Synchronizing Signal Connection" has been detected by the reception of a valid "Synchronizing Signal Connection" line control packet. If the Synchronizing Signal has been preceded by a signal encoded according to the V.21 modulation scheme in the same direction of transmission(i.e. DCS), the demodulating FIU has made sure that the duration of the "Idle" line state between the last flag of the "DCS" message and the start of the "Synchronizing Signal Connection" line state is at least: 75±20 ms. The re-modulating FIU must insure that the duration of this "Idle" line state is accurately reproduced on the analog circuit. If, due to channel errors, the "Synchronizing Signal Connection" line control packet was not preceded by an "Idle" packet, then the remodulating FIU insures that there is 75±20 ms of idle analog line state before the flag sequence begins.

The synchronizing signal is followed, without an interruption of signal energy, by a signal modulated by the received TCF data (after removal of the "Message Connection" line control packet which will take an additional 60 ms). The received data is delayed as appropriate, to allow the first effective bit of data preceded by the "Message Connection" indication to coincide with the first bit which follows the synchronizing signal in the modulated signal. Ideally, the FIU will insure that data consisting of binary "zeros" is modulated in the event that v.27ter modem training completes before the "Message Connection" line control packet is received over the satellite. This situation could occur because of the tolerance allowed in V.27ter for the modem Turn-On sequence. Once the "Message Connection" line control packet is received, TCF data is modulated without modification by the FIU.

The TCF signal is almost immediately terminated upon reception of a valid "Idle" line control packet from the satellite channel. The FIU "looks ahead" in the received satellite data stream to identify the "Idle" line control packet as soon as its first bit has been received. The "Idle" line control packet, once so identified, will be almost immediately removed from the satellite data stream and will not contribute an additional 60 ms of time to the existing "Message Connection" analog line state.

The demodulating FIU receives and demodulates facsimile message signals modulated at 2400 bit/s using the CCITT Recommendation V.27 ter modulation system, as defined in CCITT Recommendation T.4. Each transmission of a message is preceded by the modem synchronizing signal specified in the CCITT V.27 ter. The onset of the synchronizing signal portion of the synchronizing facsimile message signal on the incoming telephone circuit is detected by the demodulating FIU and signalled to the re-modulating FIU by transmitting the "Synchronizing Signal Connection" line control packet over the satellite data channel in the first available data cell.

When CCITT V.27ter modem training has completed, the demodulating FIU inserts a "Message Connection" line control packet in the satellite data stream as soon as the first bit of valid demodulated data is available. Transmission of the demodulated data over the satellite is preferably in the same bit order as it was received on the analog circuit. The demodulated facsimile message is not generally manipulated in any way by the demodulating FIU. The tail of the facsimile message signal is detected by the demodulating FIU. The "Idle" line control packet is: then transmitted to the re-modulating FIU. The "Idle" line control packet is transmitted to the re-modulating FIU in the data cell following the last bit of the last HDLC frame containing the last bit message data. If insufficient data is demodulated to fill a complete satellite data cell, it will be padded with binary "zeroes" in order reach a data cell boundary.

The re-modulating FIU receives the facsimile message data stream which is transmitted over the satellite channel by the demodulating FIU, preceded by a "Message Connection" line control packet. When the most recently received line control packet indicates "Synchronizing Signal Connection" the long modem synchronizing sequence with protection against talker echo specified in CCITT Recommendation V.27ter is generated by the re-modulating FIU. The re-modulating FIU generates a voice-band data signal for the facsimile message signal, based on the received data stream, and transmits it to the FTE using 2.5 kbit/s modulation in accordance with CCITT Recommendation V.27ter.

The synchronizing signal is followed, without an interruption of signal energy, by a signal modulated by the received data, which is introduced by the "Message Connection" line control packet. Modulation of this data may be delayed to allow the first bit of data to coincide with the first bit which follows the modem synchronizing signal. It may also happen that local modem V.27ter training takes less time than that experienced at the demodulating FIU, as indicated by the local V.27ter modem completing its synchronizing phase before the arrival of the "Message Connection" line control packet. In this case, the FIU insures that binary data consisting of all "ones" should be inserted in the modulated data stream as fill until the arrival of the "Message Connection" line control packet. Then, insertion of fill will cease and the relevant data cells received over the satellite will be modulated on the analog circuit starting with the next available bit position in the modulated data stream.

The Message signal is almost immediately terminated on completion of the last bit of data as indicated by receipt of the "Idle" line control packet. The FIU "looks ahead" in the received satellite data stream to identify the "Idle" line control packet as soon as its first bit has been received. The "Idle" line control packet, once so identified, will be immediately removed from the satellite data stream and will not contribute an additional 60 ms of time to the existing "Message Connection" analog line state.

The FIUs, in the course of performing the processing tasks (e.g. signal detection, elastic buffering, signal buffering, line control packet generation and "look ahead") may introduce additional delays along the signal path from one FTE to another. The total throughout delay introduced by each FIU is implementation dependent but must not be greater than 1 second end-to-end. That is, the sum of the delay through the originating FIU plus the delay through the destination FIU must not exceed this value in either direction of data flow. This figure includes delays associated with the modulator and demodulator, the FIU itself and the FIU-to-modem interface. It does not include satellite transmission delay or delay through the PSTN network.

Delays due to satellite transmission and PSTN transmission should not exceed 0.5 seconds. This may require the selection of low-delay PSTN connections at the FES. The total delay, therefore, between FTEs should not exceed 1.5 seconds in either direction of data flow.

When the FES detects that a facsimile call is in progress, it will "switch-in" the FES FIU and signal to it whether this is a fixed or mobile-originated call. When the FES FIU has been switched-in with a fixed-originated call, it may receive a CNG tone from the FTE but this is ignored. It may also eventually receive a V21 message from the FTE containing a DCN frame in the event that the FTE times out while waiting for a message from the MET FTE. Primarily, the FES FIU will be awaiting a signal from the MET FTU. When the FES FIU has been switched-in with a mobile-originated call, it will start generating CNG tone on the analog circuit to the FTE. It will also be prepared to detect either CED tone or the onset of V.21 preamble. In either case, it will cease generation of the CNG tone as soon as either of these two signals has been detected.

The FES will "switch-out" the FES FIU when it detects that the satellite or PSTN call has cleared. The FIU will immediately cease operations both on the satellite and analog connections. Since there maybe significant buffering of satellite or analog data both inside and outside the FIU, the FES will delay implementing the switch-out operation until it is certain that all buffered data has been delivered to the appropriate channel (and thus to either the MET or the analog FTE).

When the MET detects that a facsimile call is in progress, it will "switch-in" the MET FIU and signal to it whether this is a fixed or mobile-originated call. When the MET FIU has been switched-in with a mobile-originated call, it may receive a CNG tone from the FTE but this is ignored. It may also eventually receive a V.212 message from the FTE containing a DCN frame in the event that the FTE times out while waiting for a message from the FES FTE. Primarily the MET FIU will be awaiting a signal from the FES FIU. When the MET FIU has been switched-in with a fixed-originated call, it will start generating CNG tone on the analog circuit to the FTE. It will also be prepared to detect either CED tone or the onset of V.21 preamble. In either case, it will cease generation of the CNG tone as soon as either of these two signals has been detected.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

DICTIONARY ITEMS AND DEFINITIONS

Actual GSI

Definition: Current GSI based on TDM changes during MET operation. This field is populated by the NOC based on actions on the CGS. The CMIS cannot create or update this field.

Call Barring Inbound/Outbound Flag

Definition: Describes the call barring entry as applying to incoming or outgoing calls. If the Call Barring List is flagged as Inbound, it applies to calls the MET is receiving. If the Call Barring List is flagged as Outbound, it applies to calls the MET is making.

Call Barring Include/Exclude Flag

Definition: Describes the call barring entry as an included (legal) call or an excluded (illegal) call. When a Call Barring List is flagged as Include, the MET may only make calls to the numbers or NPAs on the list. Any other call would be denied. Conversely, if a Call Barring List is flagged as Exclude, the MET may make calls to any number or NPA except those on the list.

Call Barring List Value

Definition: Numbering plan area or phone number in the call barring list. The values that appear in the list are the phone numbers or NPAs that the MET's restriction apply to.

The types of restrictions are dictated by the flags for Include/ Exclude and Inbound/Outbound Call Barring.

Call Trap Flag

Definition: Indicates call trapping has been initiated for the MET. The GC will trap MET states as they change during MET CGS activity. This information will be provided to the CMIS on a call record.

Call Type

Definition: Service available on the MET. There are four service types: voice data (2400 or 4800 baud), fax, and alternate voice data (avd). For each service the mobile is registered, a service record is created with a single call type indicated. This call type in turn has a unique mobile identification number (min) associated with it.

Carrier

Definition: Name of preferred IXC carrier. This field is a switch field used to support equal access to long distance carriers.

Cellular ESN

Definition: 32 bit ESN that is used by the switch. For dual mode cellular/satellite phones it is the ESN for the cellular portion of the phone and would match the ESN used by the home cellular carrier to identify that mobile terminal.

CGS Time Stamp

Definition: Time stamp was created/modified. Part of the notification of success or failure of CGS action. Not created or updated by CMIS.

Channel Spacing

Definition: Multiple of frequency step size. This element is a characteristic of the MET Class. CMIS will only have the MET Class ID that a particular METs equipment maps to. NE originates this and other data that describes the MET Class and sends it to the NOC.

Check String

Definition: Constant used by the GC to validate the encryption/decryption algorithm. This element is related to the ASK.

Commanded GSI

Definition: Set by CMIS this is the original GSI stored as a NVRAM (non-volatile RAM) parameter by the MET. Required for each new MET registered for service. This element is used by the MET to tune to a GC-S channel during commissioning on the CGS. Without the GSI the MET is incapable of logging on to the CGS.

Configuration File

Definition: A file containing the contents of a working configuration that has been saved to disk under a unique name.

Current Configuration

Definition: The set of resources that exist in the configuration most recently sent to or received from the NOC. This is assumed to be the actual configuration of the traffic bearing network at any given time.

Commit a Resource

Definition: Explicit engineer action to add a fully provisioned interim resource to the working configuration.

Control Group ID

Definition: The CGS is divided into Control Groups that contain circuit pools, signaling channels, bulletin boards, METs, and VNs. A MET may only belong to one Control Group. The control Group assignment is based on the virtual network membership. All VNs a MET is a member of must be in the same control group.

Cust Group

Definition: Identifier for a specialized routing information used at the switch (e.g., 1024 available cust groups per MSR). Dialing plans will be implemented for groups of customers through a Customer Group (Cust Group).

Data Hub Id

Definition: Used to route messages during PSTN to IVDM call setup to the proper data hub. This is only applicable for METs that are participating in the Mobile Packet Data Service.

Date Last Tested

Definition: Time stamp of most recent commissioning test. This field is populated by the NOC and cannot: be created or updated by CMIS.

Default VN

Definition: VN selected if user does not specify VN during dialing. For METs that belong to only one VN, this can be populated with the VN ID the MET is assigned to by default.

EIRP

Definition: Equivalent Isotropic Radiated Power—power level required for a MET to receive a satellite signal. This element is a characteristic of the MET Class. CMIS will only have the MET Class ID that a particular METs equipment maps to. NE/SE originates this and other data that describes the MET Class and sends it to the NOC.

Event Argument Id

Definition: Part of the Event Record received from the NOC. CMIS has no part in creating or updating events-they arrive unsolicited from the NOC.

Event Argument Type

Definition: Part of the event Record received from the NOC. CMIS has no part in creating or updating events-they arrive unsolicited from the NOC.

Event Argument Value

Definition: Part of the Event Record received from the NOC. CMIS has no part in creating or updating events-they arrive unsolicited from the NOC.

Event Argument VMS Type

Definition: Part of the Event Record received from the NOC. CMIS has no part in creating or updating events-they arrive unsolicited from the NOC.

Event Code

Definition: Part of the Event Record received from the NOC. CMIS has no part in creating or updating events-they arrive unsolicited from the NOC.

Event Severity

Definition: Network impact assessment of the trouble event.

Event Time

Definition: Time the event occurred within the network.

Event Type

Definition: Part of the Event Record received from the NOC. CMIS has no part in creating or updating events-they arrive unsolicited from the NOC.

External Date Time Stamp

Definition: CMIS generated time stamp used for CMIS audit purposes in exchanging messages with the CGS.

External Transaction Id

Definition: CMIS generated transaction id used for CMIS audit purposes in exchanging messages with the CGS.

Feature Set

Definition: Identifies MET features within a specific VN. Fixed features are set up during order processing and require no action by the MET user to invoke a feature. MET activated features must also be set up during order processing but will only be available through some action on the part of the MET use during call process.

FIXED FEATURES include
  Calling Line Id Presentation (CLIP)—display the calling party's number to a MET.
  Calling Line Id Restriction (CLIR)—prohibition from displaying the METs number when it is calling another party.

Connected Line Id Presentation (COLP)—display the number the calling MET is connected to.

Connected Line Id Restriction (COLR)—prohibit display of the connected MET's number to the calling party.

Sub-addressing (SA)—allows one or more attachments to the MET to be addressed. This is being accomplished through unique phone numbers for service types requiring different equipment.

Call Waiting (CW)—notification to a MET engaged in the call that another call is waiting. MET may accept the other call or ignore it.

Call Barring (CB)—restricts the MET user's from making or receiving one or more types of calls.

Operator intervention (OI)—allows an operator to break into a call in progress for the MET.

Operator Assistance (OA)—allows the MET to access an MSAT operator to receive assistance Call Priority (CP)—used in conjunction with the system's call queuing function (trunk access priority) presence of this feature gives a MET access to channels at times of congestion ahead of MET's with lower priority. Priority applies only to MET initiated calls.

MET ACTIVATED (dynamic) FEATURES include

Call Transfer (CT)—allows sa MET user to transfer an established call to a third party.

Call Forwarding Unconditional (CFU)—permits a MET to have all calls forwarded to another MET or PSTN number.

Call Forwarding Busy (CFB)—permits a MET to have all incoming calls attempted when the MET is busy to another MET or PSTN number.

Call Forward Congestion (CFC)—permits the MET to have all incoming calls attempted when the signaling channels are congested answered with a recorded announcement intercept.

Call Forward No Reply (CFN)—permits a MET to have all incoming calls attempted when the MET is not answering to another MET or PSTN number. This applies if the MET is blocked, turned off or not answering.

Call Holding (CH)—allows a MET to interrupt call communication on an existing connection and then re-establish communications.

Alternate Voice Data Operation (AVD)—allows a MET user to toggle between voice and data mode during a call. Requires that the call be initiated in voice mode. Only the MET user may toggle between voice and data. This requires a special service type in addition to the activation at set-up of the feature.

Conference calling (CC)—allows a MET to communicate with multiple-parties including METs and PSTN concurrently.

Three Party Service (3PS)—allows a MET to who is active on a call to hold that call, make an additional call to a third party, switch from one call to the other (privacy being provided between the calls) and/or release one call and return to the other.

Malicious Call Trace (MCT)—enables an MSAT operator to retrieve the complete call record at a MET's request for any terminated call in real-time. The operator can then identify the calling party to the MET and take appropriate action.

Voice Mail (VM)—allows call forwarding to a voice mail box and retrieved of messages by the MET.

Alternate Accounts Charging (ACC)—allows the MET user to enter in an account code to charge the call to after entering the dialed digits Fully Provision
Definition: Supply values to all attributes of a resource Frequency Step Size
Definition: Minimum tuning increment acquired for a MET to tune in an assigned channel. CMIS will only have the MET Class ID that a particular MET's equipment maps to. NE originates this and other data that describes the MET Class and sends it to the NOC.

From MET Call Barring Flags
Definition: Describe actions available to a user originating a call from a MET. These call Barring flags relate to specific types of calls at an aggregate level to indicate if the MET can make or receive a call of a particular type. When this list indicates that an Inclusion or Exclusion to particular numbers or area codes is allowed, the values for those restrictions are indicated on a Call Barring List.

FTIN
Definition: Forward Terminal Identification Number—Downloaded to MET from NOC during commissioning. Used for MET to GC signaling.

Internal Data Time Stamp
Definition: NOC generated time stamp used for NOC audit purposes.

Internal Transaction Id
Definition: NOC generated transaction is used for NOC audit purposes.

Interim resource
Definition: The resource currently being modified by the engineer. Changes made to an interim resource are not added to the working configuration until the resource is committed to the working configuration L Band Beam
Definition: Current beam MET is logged into. Determined by the GC during commissioning. CMIS has no role in creating or updating this field.

LCC
Definition: Line Class Code—type of phone, required by the switch.

MCC Class Id
Definition: Part of the Event Record received from the NOC. CMIS has no part in creating or updating events—they arrive unsolicited from the NOC.

MCC Instance
Definition: Part of the Event Record received from the NOC. CMIS has no part in creating or updating events—they arrive unsolicited from the NOC.

MCC Instance Id
Definition: Part of the Event Record received from the NOC. CMIS has no part in creating or updating events—they arrive unsolicited from the NOC.

MCC Instance Type
Definition: Part of the Event Record received from the NOC. CMIS has no part in creating or updating events—they arrive unsolicited from the NOC.

Message Status 1
Definition: Used in the message initiated by the NOC to acknowledge success or failure of a previously transmitted CMIS request. Used by the DM.

Message Status 2
Definition: Used in the message initiated by the NOC to acknowledge success or failure of a previously transmitted CMIS request. Will be used by the DM.

Message Verb
Definition: Action required at the NOC on data passed in a message from CMIS. This field is in the message relaying the results of a CMIS request.

Modulation Scheme
   Definition: Non-standard modulation schemes. CMIS will only have the MET Class ID that a particular MET's equipment maps to. NE/SE originates this and other data that describes the MET Class and sends it to the NOC.
MSA
   Definition: Mobile Servicing Area—identifies the last call's servicing area. Atomic data element within MSR. Transient data maintained in call processing not on the cellular switch table. Same as MSR.
MSR
   Definition: Mobile Servicing Region id (table) contains multiple MSA assignments for the MET. For a roamer, the operator will in-put the MSR for temporary assignment. Allows up to 1024 cust groups—At CGS startup there will be 1 MSR.
MET ASK
   Definition: Access Key MET must match during call setup/validation.
MET Class ID
   Definition: Identifies the operating characteristics of the MET. Associated to MET by CMIS during registration from data supplied by NE/SE. The technical characteristics the MET Class ID encompasses are not needed by CMIS. These are stored on a table in the NOC and referenced by having the ID on the MET Information record. This ID applies to MET level regardless of how many services, etc. the MET has tied to it.
MET Commanded State
   Definition: Current CGS status of MET.
MET Fraud Flag
   Definition: Indicates fraud has been detected on the MET. Updated by GC and CMIS only. This field is set at the MET level regardless of the number of services, etc. the MET has.
MET ID
   Definition: CMIS assigned unique MET identifier. This can be a unique random number assigned to each MET registered for service. This is a MET level characteristic set once for the MET regardless of how many services, etc. the MET has. The MET ID is used by the NOC to identify METs. It does not have to be used within CMIS as a key field. MET ID cannot be updated once it has been assigned. A MET that requires a new MET ID for any reason would have to go through the registration process anew.
MET Signaling Code
   Definition: Dialed digits from MET that identifies VN selection. Signaling codes would be assigned when a MET has multiple Virtual Network memberships. After the MET user enters the destination phone number, the pound key is hit and then the signaling code is entered if the caller wants to associated the outbound call with a particular virtual network. When no signaling code is entered, implies default VN be associated with the call.
Net Radio Monitor Code
   Definition: Controls MET responses to specific channels after hang time limit is exceeded. A NR Net selection is made at the MET by the user.
Net Radio MET Directory Number
   Definition: Net radio MET directory number. Assigned during registration.
Net Radio Net Id
   Definition: Net ID
Net Radio MET Directory Number
   Definition: Tag number on the MET equipment that identifies a particular net radio net.
Pending NVRAM Init Flag
   Definition: Instructs the GC to download/initialize parameters for a MET.
Pending PVT Flag
   Definition: This flag indicates that a PVT is required following next MET access. If CMIS requests a PVT to help diagnose customer troubles, an update would be sent to NOC with the Flag set to Perform PVT after Next MET access (1).
Picsel
   Definition: Flag indicating if user has asked for a preferred IXC carrier. Carrier name is contained in CARRIER field.
Record Type
   Definition: Type of record defined by object. Part of the Update Results Record.
Remote
   Definition: Remote user—not required by the switch for MSAT Application.
Recent Configuration Event
   Definition: This is a serial list of events received from the NOC that pertain to configuration database changes.
Referential Integrity
   Definition: Database "key field" relationships that bind record within the databases, and create dependencies for additions and deletions of table instances.
RF Pin
   Definition: Remote feature personal identification number. A user is prompted for a pin when attempting to use a remote feature.
Roam
   Definition: Roam Capable—not required by the switch for MSAT Application.
RTIN
   Definition: Reverse Terminal Identification Number which is also the satellite electronic serial number on satellite only and dual mode cellular/satellite METs. This is a unique identifier assigned by manufacturer for each piece of equipment. Within CGS processing the RTIN is used by the GC to signal the MET.
Satellite Id
   Definition: Satellite Id of current L-band beam. The NOC populates this field based on MET commissioning. CMIS does not ever create or update this field.
SCM
   Definition: Station Class Mark.
Secure Disable Flat
   Definition: Channel Unit security check flag. Setting this flag to bypass security would disable ASK verification during call processing for a MET. CMIS cannot change this flag.
Signaling Priority
   Definition: Number of MET signaling requests to the GC during network congestion. Assigned at the MET level—each MET may have only one signaling priority regardless of the number of VN memberships it has. The highest priority level is 0 and the lowest is seven.
TDM Change Enable Flat
   Definition: Restriction on MET from changing TDM (TDM is the GSI)
Telephone Number
   Definition: Phone number associated with a call type (voice, data, fax, avd) in a given virtual network.
Template
   Definition: An initial set of default attribute values for each resource being added.
To MET Call Barring Flags
   Definition: Describes actions available to a user receiving a call at their MET.

Trunk Access Priority

Definition: Satellite trunk queuing priority used during network congestion. Determines access to channels.

Virtual Network Id

Definition: Identifies the Virtual Network that the service and feature profiles relate to. Within a single VN a MET may have one voice, data, fax and/or avd service type. Features and restrictions for those services are defined on the basis of the METs membership in that VN. If the MET required an additional instance of a service that it already subscribed to, (e.g. a second voice number), a second virtual network assignment would be required. Features and restrictions for that second membership can be defined with no relation to the existing VN membership, but all elements that relate to the MET level cannot change without a ripple effect to the other services.

VMS Instance Type

Definition: Part of the Event Message

Vocoder Id

Definition: Vocoder version currently installed in the MET. CMIS will only have the MET Class ID that a particular METs equipment maps to. NE/SE originates this and other data that describes the MET Class and sends it to the NOC.

Working Configuration

Definition: The set of resources currently being modified by the engineer. This may be an existing, complete configuration which the engineer is modifying, or may be a new, partial (or initially empty) configuration.

What is claimed is:

1. In a mobile satellite system including a satellite communication switching office (SCSO) having a satellite antenna for receiving/transmitting a satellite message via a satellite from/to a mobile communication system (MCS), a central controller receiving/transmitting the satellite message from/to the satellite communication switching office issued from the MCS via the satellite to another party, a method of performing a call setup procedure in the mobile satellite system from a call initiated by the MCS to a destination served by a public switched telephone network (PSTN), said method comprising the steps of:

(a) initiating the call by the MCS;

(b) the MCS formatting and transmitting an access request message via a random access channel, the access request message including call type and destination number;

(c) receiving by the central controller the access request message, and transmitting frequency assignments to the MCS via a time division multiplex (TDM) channel and to the SCSO via an interstation signaling channel, the frequency assignment including the call type, and the destination phone number, and an access security check field used to verify the MCS's identity;

(d) receiving by the MCS the frequency assignment, and transmitting a scrambling vector message to the SCSO via the single channel per carrier (SCPC) communication channel;

(e) verifying by the SCSO the identity of the MCS responsive to the scrambling vector;

(f) upon successful verification in said verifying step (e), switching by the SCSO and the MCS from call setup mode to voice mode;

(g) transmitting by the SCSO voice frames to the MCS to disable voice activation in the MCS for at least 3 super frames after which voice activation is re-enabled in the MCS, and transmitting a destination number to the PSTN; and (h) establishing voice communication between the PSTN and the MCS.

2. In a mobile satellite system including a satellite communication switching office (SCSO) having a satellite antenna for receiving/transmitting a satellite message via a satellite from/to a mobile communication system (MCS), a central controller receiving/transmitting the satellite message from/to the satellite communication switching office issued from the MCS via the satellite to another party, a method of performing a call setup procedure in the mobile satellite system from a call initiated by a destination served by a public switched telephone network (PSTN) to the MCS, said method comprising the steps of:

(a) receiving by the SCSO a call from the destination served by the PSTN;

(b) transmitting by the SCSO to the central controller a channel request using interstation signaling, the channel request including a destination number;

(c) determining by the central controller an identity of the MCS responsive to the destination number, and transmitting a call announcement via a time division multiplex (TDM) channel;

(d) acknowledging by the MCS the call announcement via the time division multiple access (TDMA) channel to the central controller;

(e) transmitting frequency assignments to the MCS via the TDM channel and to the SCSO via an interstation signaling channel, the frequency assignment including the call type, and the destination phone number, and an access security check field used to verify the MCS's identity;

(f) receiving by the MCS the frequency assignment, and transmitting a scrambling vector message to the SCSO via the single channel per carrier (SCPC) communication channel;

(g) verifying by the SCSO the identity of the MCS responsive to the scrambling vector;

(h) upon successful verification in said verifying step (g), transmitting by the SCSO a ring command to the MCS;

(i) receiving by the MCS of the ring command, generating a ringing signal to a MCS user, and transmitting a ring command acknowledgement to the SCSO;

(j) receiving by the SCSO the ring command acknowledgement from the MCS;

(k) once the call setup is complete and the MET user has acknowledged the ringing signal by going off-hook, transmitting by the MCS voice frames to the SCSO and disabling voice activation in the MCS for at least 3 super frames;

(l) upon detection of the MCS switching to a voice mode, switching by the SCSO to the voice mode, and re-enabling voice activation by the MCS; and (m) establishing voice communication between the PSTN and the MCS.

3. In a mobile satellite system including a satellite communication switching office (SCSO) having a satellite antenna for receiving/transmitting a satellite message via a satellite from/to a mobile communication system (MCS), a central controller receiving/transmitting the satellite message from/to the satellite communication switching office issued from the MCS via the satellite to another party, a method of performing a call setup procedure in the mobile satellite system from a call between first and second MCSs, said method comprising the steps of:

(a) originating by the first MCS the call in accordance with the method of claim 1; and (b) receiving by the first MCS the call initiated by the second MCS in accordance with the method of claim 2.

4. In a mobile satellite system including a satellite communication switching office (SCSO) having a satellite antenna for receiving/transmitting a satellite message via a satellite from/to a mobile communication system (MCS), a central controller receiving/transmitting the satellite message from/to the satellite communication switching office issued from the MCS via the satellite to another party, a method of performing a call setup procedure in the mobile satellite system from a call initiated by the MCS to a destination served by a public switched telephone network (PSTN), said method comprising the steps of:

(a) initiating the call by the MCS;

(b) the MCS formatting and transmitting an access request message including call type and destination number;

(c) receiving by the central controller the access request message, and transmitting frequency assignments to the MCS and to the SCSO, the frequency assignment including the call type, and the destination phone number, and a security field used to verify the MCS's identity;

(d) receiving by the MCS the frequency assignment, and transmitting an identification message to the SCSO;

(e) verifying by the SCSO the identity of the MCS responsive to the identification message;

(f) upon successful verification in said verifying step (e), switching by the SCSO and the MCS from call setup mode to voice mode;

(g) transmitting by the SCSO a disable signal to the MCS to disable voice activation in the MCS for a predetermined time period after which voice activation is re-enabled in the MCS, and transmitting a destination number to the PSTN; and (h) establishing voice communication between the PSTN and the MCS.

5. The method according to claim 4, wherein said formatting step (b) further comprises the step of the MCS formatting and transmitting the access request message via a random access channel.

6. The method according to claim 4, wherein said receiving step (c) further comprises the step of receiving by the central controller the access request message, and transmitting the frequency assignments to the MCS via a time division multiplex (TDM) channel and to the SCSO via an interstation signaling channel.

7. The method according to claim 4, wherein the security field comprises an access security check field used to verify the MCS's identity.

8. The method according to claim 4, wherein said receiving step (d) further comprises the step of receiving by the MCS the frequency assignment, and transmitting the identification message to the SCSO via a single channel per carrier (SCPC) communication channel.

9. The method according to claim 4, wherein the identification message comprises a scrambling vector.

10. The method according to claim 9, wherein said verifying step (e) further comprises the step of verifying by the SCSO the identity of the MET responsive to the scrambling vector.

11. The method according to claim 9, wherein said transmitting step (g) further comprises the step of transmitting by the SCSO the disable signal including voice frames to the MCS for at least 3 super frames to disable voice activation in the MCS for a predetermined time period after which voice activation is re-enabled in the MCS.

12. In a mobile satellite system including a satellite communication switching office (SCSO) having a satellite antenna for receiving/transmitting a satellite message via a satellite from/to a mobile communication system (MCS), a central controller receiving/transmitting the satellite message from/to the satellite communication switching office issued from the MCS via the satellite to another party, a method of performing a call setup procedure in the mobile satellite system from a call initiated by a destination served by a public switched telephone network (PSTN) to the MCS, said method comprising the steps of:

(a) receiving by the SCSO a call from the destination served by the PSTN;

(b) transmitting by the SCSO to the central controller a channel request including a destination number;

(c) determining by the central controller an identity of the MCS responsive to the destination number, and transmitting a call announcement;

(d) acknowledging by the MCS the call announcement to the central controller;

(e) transmitting frequency assignments to the MCS and to the SCSO, the frequency assignment including the call type, and the destination phone number, and a security field used to verify the MCS's identity;

(f) receiving by the MCS the frequency assignment, and transmitting an identification message to the SCSO;

(g) verifying by the SCSO the identity of the MCS responsive to the identification message;

(h) upon successful verification in said verifying step (g), transmitting by the SCSO a ring command to the MCS;

(i) receiving by the MCS of the ring command, generating a ringing signal to a MCS user, and transmitting a ring command acknowledgement to the SCSO;

(j) receiving by the SCSO the ring command acknowledgement from the MCS;

(k) once the call setup is complete and the MCS user has acknowledged the ringing signal by going off-hook, transmitting by the MCS a disable signal to the SCSO and disabling voice activation in the MCS for a predetermined period of time;

(l) upon detection of the MCS switching to a voice mode, switching by the SCSO to the voice mode, and re-enabling voice activation by the MCS; and (m) establishing voice communication between the PSTN and the MCS.

13. A method of performing a call setup procedure in a mobile satellite system from a call initiated by a mobile communication system (MCS) to a destination, said method comprising the steps of:

(a) initiating the call by the MCS, the MCS formatting and transmitting an access request message;

(b) receiving by a central controller in the mobile satellite system the access request message, and transmitting frequency assignments to the MCS and to a satellite communication switching office (SCSO) in the mobile satellite system;

(c) verifying by the SCSO the identity of the MCS, and upon successful verification, switching by the SCSO and the MCS from call setup mode to voice mode;

(d) transmitting by the SCSO voice frames to the MCS to disable voice activation in the MCS for at least 3 super frames after which voice activation is re-enabled in the MCS; and (e) establishing voice communication between the MCS and the destination.

14. A method of communication in a mobile satellite system from a call initiated by a mobile communication system (MCS) to a destination, said method comprising the steps of:
 (a) receiving by a central controller in the mobile satellite system an access request message from the MCS, and transmitting frequency assignments to the MCS and to a satellite communication switching office (SCSO) in the mobile satellite system;
 (b) switching by the SCSO and the MCS from call setup mode to voice mode;
 (c) transmitting by the SCSO voice frames to the MCS to disable voice activation in the MCS for at least 3 super frames after which voice activation is re-enabled in the MCS; and
 (d) establishing voice communication between the MCS and the destination.

15. A method of communication in a mobile satellite system from a call initiated by a mobile communication system (MCS) to a destination, said method comprising the steps of:
 (a) receiving by a central controller in the mobile satellite system an access request message from the MCS, and transmitting frequency assignments to the MCS and to a satellite communication switching office (SCSO) in the mobile satellite system;
 (b) transmitting by the SCSO disable information to the MCS in a voice mode to disable voice activation in the MCS for a predetermined period of time after which voice activation is re-enabled in the MCS; and
 (c) establishing voice communication between the MCS and the destination.

16. A method of communication according to claim 15, wherein the disable information comprises voice frames.

17. A method of communication according to claim 15, wherein the predetermined period of time comprises at least 3 super frames.

18. A method of communication according to claim 15, further comprising the step of transmitting by the SCSO a re-enable signal to the MCS to re-enable voice activation.

* * * * *